US006633514B1

(12) United States Patent
Awano et al.

(10) Patent No.: US 6,633,514 B1
(45) Date of Patent: Oct. 14, 2003

(54) MAGNETO-OPTICAL REPRODUCING METHOD USING A PLURAL OF DIFFERENT REPRODUCING BEAMS

(75) Inventors: Hiroyuki Awano, Noda (JP); Katsusuke Shimazaki, Toride (JP); Hiroki Takao, Kitasouma-gun (JP); Norio Ohta, Tsukuba-gun (JP); Akiyoshi Itou, Matsudo (JP); Katsuji Nakagawa, Edogawa-ku (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 09/601,196

(22) PCT Filed: Jan. 29, 1999

(86) PCT No.: PCT/JP99/00392

§ 371 (c)(1),
(2), (4) Date: Aug. 16, 2000

(87) PCT Pub. No.: WO99/39341

PCT Pub. Date: Aug. 5, 1999

(30) Foreign Application Priority Data

Jan. 30, 1998 (JP) .......................................... 10-034030
Mar. 31, 1998 (JP) .......................................... 10-105805

(51) Int. Cl.$^{7}$ ................................................ G11B 11/00

(52) U.S. Cl. .................................. 369/13.28; 369/13.41

(58) Field of Search ............................ 369/13.28, 13.1, 369/13.07, 13.06, 13.05, 13.08, 44.37, 116, 44.38, 275.1, 94; 428/64.3, 694 ML, 694 MM

(56) References Cited

U.S. PATENT DOCUMENTS 4,807,204 A * 2/1989 Mizutani et al. .............. 369/13
5,197,049 A * 3/1993 Wehrenberg ................. 369/13
5,923,625 A * 7/1999 Shimazaki et al. ........... 369/13
5,995,472 A * 11/1999 Fujii et al. .................. 369/110
6,388,954 B1 * 5/2002 Awano et al. ............ 369/13.02

FOREIGN PATENT DOCUMENTS

| | | |
|---|---|---|
| JP | 1-155533 | 6/1989 |
| JP | 2-289948 | 11/1990 |
| JP | 6-295479 | 10/1994 |
| JP | 8-7350 | 1/1996 |
| JP | 8-129784 | 5/1996 |
| JP | 8-212607 | 8/1996 |
| JP | 9-171644 | 6/1997 |
| JP | 10-21595 | 1/1998 |
| JP | 11-39737 | 2/1999 |
| WO | WO98/09283 | 3/1998 |

OTHER PUBLICATIONS

N. Saito et al., *Multi–Valued Magneto–Optical Recording in TbFe/SiO Compositionally Modulated Films*, Proceeding of 13$^{th}$ Congress of Applied Magnetics Society, pp. 63.

N. Saito et al., *Multi–Valued Magneto–Optical Recording in TbFe/SiO Compositionally Modulated Films*, Japanese Journal of Applied Physics, vol. 28, (1989), pp. 343–347.

Y. Murakami et al., *Super Resolution Readout of a Magneto–Optical Disk with an In–Plane Magnetization Layer*, Proceedings of Magneto–Optical Recording International Symposium, (1993), pp. 201–204.

* cited by examiner

*Primary Examiner*—Tan Dinh
(74) *Attorney, Agent, or Firm*—Oliff & Berridge, PLC

(57) ABSTRACT

A magneto-optical recording medium has magneto-optical recording layers (11, 12, 13) and reproducing layers (21, 22, 23). The information recorded in the reproducing layers are reproduced by means of reproducing light beams (31, 32, 33) of different wavelengths, respectively. In reproduction, magnetic domains (4) recorded in the recording layers are transferred in the reproducing layers formed on the respective recording layers, the transferred magnetic domains (5) are enlarged with an external magnetic field, and the information is reproduced. Since information is recorded and reproduced for each recording layer, the recording density is improved. Further since the reproduction signals are amplified by the magnetic domain enlargement, the C/N is improved.

10 Claims, 56 Drawing Sheets

1 0 1 0 0 1 1 0 0 1 0 1 0
1 1 0 0 1 0 1 0 0 1 0 1 0

1 1 1 0 0 1 0 0 1 0 0 1 1 1 0 0 0 0 1 1 0 0 1 1 0
Fig. 8(c) TIMING CHART
①Clock
②Data
③ ①̄ and②
④ ① and②̄
⑤ ③
⑥ ④
⑥x2−⑤
Fig. 8(d) EXTERNAL MAGNETIC FIELD
H3
H2
H1
H0
Fig. 8(e) LIGHT PULSES
Fig. 8(f) MAGNETIC DOMAIN FORM

SECOND RECORDING LAYER
FIRST RECORDING LAYER

S1 SIGNAL REPRODUCED
S2 AT 780nm

SIGNAL REPRODUCED
S3 AT 443nm

SIGNAL TWO-VALUED AT SLICE S1 (1)

SIGNAL TWO-VALUED AT SLICE S2 (2)

SIGNAL TWO-VALUED AT SLICE S3 (3)

(2) − (3) + (1)

SECOND RECORDING LAYER
FIRST RECORDING LAYER

SIGNAL REPRODUCED AT 780nm
S1

SIGNAL REPRODUCED AT 443nm
S2

SIGNAL TWO-VALUED AT SLICE S1

SIGNAL TWO-VALUED AT SLICE S2

1 SUBSTRATE
3 DIELECTRIC FILM
8 AUXILIARY MAGNETIC FILM
9 NON-MAGNETIC FILM
10 MAGNETO-OPTICAL RECORDING FILM
7 PROTECTIVE FILM $T_1 < T < T_{comp}$ $T_{comp} < T < T_{co}$ 1 SUBSTRATE
3 DIELECTRIC FILM
24 SECOND AUXILIARY MAGNETIC FILM
29 NON-MAGNETIC FILM
28 FIRST AUXILIARY MAGNETIC FILM
10 MAGNETO-OPTICAL RECORDING FILM
7 PROTECTIVE FILM 9 SiN PROTECTIVE LAYER
10 $Pt_{92}Co_8$ RECORDING AUXILIARY LAYER
12 $Tb_{34}Fe_{55}Co_{11}$ SECOND RECORDING LAYER
84 SiN FOURTH DIELECTRIC LAYER
22 $Gd_{24}Fe_{66}Co_{13}$ SECOND REPRODUCING LAYER
83 SiN THIRD DIELECTRIC LAYER
11 $Tb_{20}Fe_{67}Co_{13}$ FIRST RECORDING LAYER
82 SiN SECOND DIELECTRIC LAYER
21 $Gd_{25}Fe_{68}Co_7$ FIRST REPRODUCING LAYER
81 SiN FIRST DIELECTRIC LAYER
7 POLYCARBONATE SUBSTRATE

REPRODUCING MAGNETIC FIELD
FOR MAGNETIC DOMAIN MAGNIFICATION (INITIAL MAGNETIZATION CURVE)

REPRODUCING MAGNETIC FIELD
FOR MAGNETIC DOMAIN REDUCTION

MAGNETO-OPTICAL REPRODUCING METHOD USING A PLURAL OF DIFFERENT REPRODUCING BEAMS

TECHNICAL FIELD

The present invention relates to a magneto-optical recording medium and methods for recording information on and reproducing information from magneto-optical recording media. In more particular, the invention relates to a magneto-optical recording medium on which it is possible to carry out multi-valued recording by providing a plurality of magnetic layers in the medium or high density recording by recording information on each layer. The invention also relates to recording and reproducing methods and apparatuses for such a medium. The invention further relates to a magneto-optical recording medium suitable for high density recording which makes it possible to perform reproduction by magnifying a minute recording magnetic domain extremely smaller than a reproducing light spot. The invention also relates to a reproducing method for such a medium.

BACKGROUND ART

It is possible to rewrite the information recorded on magneto-optical recording media, which are large in storage capacity and highly reliable. Therefore, magneto-optical recording media begin to be practically used as computer memories etc. In view of an increase in amount of information and downsizing of devices and/or apparatuses, however, higher density recording and reproducing techniques are demanded. Various methods are suggested for producing high density magneto-optical recording media. One of the methods is called the multi-layer recording or multiple recording method for producing a high density magneto-optical recording medium by forming multiple recording layers in a magneto-optical recording medium, and recording information on each layer.

A system for recording multi-valued signals is known as described in, for example, Digests of the 13th Annual Conference on Magnetics in Japan (issued in 1989), page 63 and Japanese Journal of Applied Physics, Vol. 28 (1989) Supplement 28-3 pp. 343–347.

The multi-valued recording system involves stacking (or laminating) a plurality of magnetic layers having different coercive forces, and modulating in multiple levels or stages the strength of a magnetic field applied to the magnetic layers, thereby selectively inverting the magnetization of a specified magnetic layer. It is described that this system makes four-valued recording of signals possible by providing in a recording medium three magnetic layers having different coercive forces.

According to the multi-valued recording system for magneto-optical recording media, however, in order to detect for reproduction the multi-valued signals recorded on a magneto-optical recording medium, these signals have been distinguished by slicing at different levels the signals detected from the medium. Accordingly, it has been impossible to obtain large differences between the signal amplitudes corresponding to the multi-valued states, making it difficult to definitely distinguish two states close or near in signal amplitude. For this reason, the reproduced multi-valued signals have had a low S/N ratio. Therefore, there has been a demand for a reproduction technique for reproducing signals at a high S/N ratio from a magneto-optical recording medium with information recorded at high density.

There is conventionally known no magneto-optical recording medium having a plurality of magnetic layers on each of which information can be recorded and from each of which information can be reproduced independently. A recording medium having such performance may be very effective in recording various types of information correlatively on a single recording medium, or recording and reproducing pieces of channel information simultaneously in parallel.

When it is intended to reproduce information from a recording mark recorded at high density, a problem arises concerning the optical reproducing resolution which depends on the spot diameter of a reproducing light beam. For example, it is impossible to perform reproduction while distinguishing a minute mark having a domain length of 0.15 $\mu$m by using a reproducing light beam having a spot diameter of 1 $\mu$m. In order to eliminate such restriction on reproducing resolution resulting from the optical spot diameter of a reproducing light beam, an approach has been suggested concerning the magnetically induced super resolution technique (MSR) as described, for example, in Journal of Magnetic Society of Japan, Vol. 17, Supplement No. S1, page 201 (1993). This technique utilizes the occurrence of temperature distribution over a magnetic film in a reproducing light beam spot when a magneto-optical recording medium is irradiated with a reproducing light beam. A magnetic mask is generated in the spot so that the effective spot diameter, which contributes to signal reproduction, is reduced. The use of this technique makes it possible to improve the reproducing resolution without reducing the actual spot diameter of the reproducing light beam. However, in the case of this technique, since the effective spot diameter is decreased by the magnetic mask, the amount of light which contributes to the reproduction output is decreased, and the reproduction C/N is lowered to that extent. As a result, it is difficult to obtain sufficient C/N.

Japanese Patent Application Laid-Open No. 8-7350 discloses a magneto-optical recording medium comprising a reproducing layer and a recording layer on a substrate. Reproduction can be performed while magnifying the magnetic domains in the recording layer. When the magneto-optical recording medium is subjected to reproduction, an alternating magnetic field is used as a reproducing magnetic field to alternately apply a magnetic field in the direction for magnifying a magnetic domain and a magnetic field in the opposite direction, thereby magnifying and reducing the magnetic domains.

However, the multi-layer recording or multiple recording method involves recording information on or reproducing information from one recording layer with incident light intersecting (or crossing) another recording layer, which absorbs or disperses the light, thus reducing the amount of light contributing to the recording or the reproduction. As a result, it is difficult to obtain a sufficient S/N ratio.

The technique disclosed in Japanese Patent Application Laid-Open No. 8-7350 merely has the effect of improving the quality of signals for only a single recording layer. This technique does not have the densifying effect achieved with a plurality of recording layers laminated or stacked.

DISCLOSURE OF THE INVENTION

In view of the foregoing problems with the prior art, it is an object of the present invention to provide a magneto-optical multi-layer recording or multiple recording medium for recording information on each of its recording layers, the medium making it possible to record information thereon and reproduce information therefrom at a sufficient S/N even if minute magnetic domains are recorded on the medium. It is another object of the invention to provide a method and an apparatus for reproducing information from such a recording medium.

In accordance with a first aspect of the present invention, there is provided a magneto-optical recording medium comprising a plurality of recording layers on which data are recorded, and at least one reproducing layer to which the recorded data are transferred and which reproduces the transferred data.

FIG. 46 conceptually shows a magneto-optical recording medium according to the present invention. This recording medium includes three magneto-optical recording layers 11, 12 and 13. The data recorded on the recording layers 11, 12 and 13 are reproduced with reproducing beams 31, 32 and 33, respectively, which differ in wavelength. This makes it possible to densely record data and reproduce the densely recorded data in comparison with a magneto-optical recording medium including a single recording layer. Reproducing layers 21, 22 and 23 are provided for the recording layers 11, 12 and 13, respectively. The magnetization data in the recording layers are transferred to the respective reproducing layers. The magnetic domains transferred to the reproducing layers are magnified under an external magnetic field. Accordingly, it is possible to amplify and reproduce the data recorded on each recording layer. Therefore, by using the magneto-optical recording medium according to the present invention, it is possible to reproduce at a high C/N the data recorded densely on the two or more recording layers.

The foregoing magneto-optical recording medium may include reproducing layers for the respective recording layers. Alternatively, the recording medium may include a single reproducing layer to which a combination of states of magnetization in the recording layers is transferred. The recording medium may also include a blocking (intermediate) layer. When the magnetic domain transfers from one of the recording layers to the associated reproducing layer, the blocking layer blocks an influence of a leakage magnetic field from another of the recording layers. The blocking layer may be interposed between the recording layers or between at least one of the recording layers and the associated reproducing layer.

The magneto-optical recording medium according to the present invention may include a first recording layer, a second recording layer, a first reproducing layer and a second reproducing layer. The first and second recording layers are associated with the first and second reproducing layers, respectively. During reproduction, a magnetic domain of at least one of the first and second recording layers may be transferred to the associated reproducing layer. The transferred domain may be magnified under an external field. The magnified domains in the reproducing layers may be reproduced independently with reproducing beams different in wavelength. Alternatively, the recording medium may include a single reproducing layer to which a combination of states of magnetization in the recording layers can be transferred. In this case, a leakage magnetic field affecting the reproducing layer may vary in magnitude with the combination of states of magnetization in the recording layers. A magnetic domain transferred to the reproducing layer may be magnified to a size conforming to the magnitude of the leakage field.

The recording layers may have different compensation temperatures which are in the range between room temperature and the respective Curie temperatures. In this case, reproduction may involve radiating a first reproducing beam and a second reproducing beam which differ in power. The compensation temperature of one of the recording layers may be near to the temperature of the recording medium heated when the first reproducing beam is radiated. The compensation temperature of another of the recording layers may be near to the temperature of the recording medium heated when the second reproducing beam is radiated. The recording layers may include a first recording layer and a second recording layer. If reproduction involves radiating a high power reproducing beam PH and a low power reproducing beam PL, the radiation of the reproducing beam PH may transfer a magnetic domain of the second recording layer to the reproducing layer, and the radiation of the reproducing beam PL may transfer a magnetic domain of the first recording layer to the reproducing layer. The transferred magnetic domains can be magnified and reproduced by the MAMMOS described later.

In accordance with a second aspect of the present invention, a reproducing method is provided for reproducing the data recorded on a plurality of recording layers of a magneto-optical recording medium by radiating a plurality of different reproducing beams the recording medium to transfer the recorded data to a reproducing layer of the recording medium. This reproducing method makes it possible to reproduce through the reproducing layer the data recorded on the two or more recording layers. This makes it possible to realize a high density recording medium including a plurality of recording layers. The plurality of reproducing beams may differ in wavelength. In this case, the recording layers may be irradiated with the reproducing beams, which differ in wavelength, so that the data recorded on the recording layers can be reproduced independently at different wavelengths. The reason for this is that it is possible to apply to the present invention the multi-wavelength magneto-optical reproducing method described later. The reproducing beams may differ in power. In this case, the data recorded on at least one of the recording layers may be reproduced independently with at least one of the reproducing beams, which differ in power. The magnetic domains transferred from the recording layers to the reproducing layer may be magnified under an external field, which may be an external magnetic field, a light intensity-modulated reproducing beam, or a combination of them.

In accordance with a third aspect of the present invention, another reproducing method is provided for reproducing the data recorded on a plurality of recording layers of a magneto-optical recording medium. This reproducing method includes the steps of transferring a combination of states of magnetization in the plurality of recording layers to a single reproducing layer of the recording medium, and reproducing the transferred combination. A leakage magnetic field affecting the reproducing layer may vary in magnitude depending on the combination of states of magnetization in the recording layers. It is possible to magnify to a size conforming to the magnitude of the leakage field a magnetic domain transferred to the reproducing layer, and reproduce the magnified domain. That is to say, the size of the magnified magnetic domain may be correlated with a combination of states of magnetization in the recording layers so that recorded data can be reproduced in conformity with the size of the magnified domain. This makes it possible to record multi-valued data as a combination of states of magnetization in the recording layers, and reproduce the multi-valued data in conformity with the size of the magnified domain.

In accordance with a fourth aspect of the present invention, still another reproducing method is provided for reproducing data recorded on a plurality of recording layers of a magneto-optical recording medium. This reproducing method includes the steps of recording magnetic domains on the recording layers with different recording clocks, reproducing the recorded domains by transferring the recorded domains to reproducing layers of the recording medium and magnifying the transferred domains while applying external fields synchronously with the different recording clocks, and independently reading out from the magnified domains the data recorded on the recording layers.

In each of the reproducing methods according to the present invention, multi-valued data may be recorded in advance on the recording layers by the magneto-optical multi-valued recording method described later.

In accordance with the present invention, a reproducing apparatus is provided for reproducing, by the multi-wavelength magneto-optical reproducing method, the data recorded on a plurality of recording layers. In accordance with the invention, another reproducing apparatus is provided for reproducing, by the optical modulation domain magnifying and reproducing method, the data recorded on a plurality of recording layers.

The present invention employs the method (magneto-optical multi-valued recording method) disclosed in Japanese Patent Application Laid-Open No. 8-129784 filed by the applicant(s) of this application which makes it possible to record multi-valued data on a plurality of recording layers, the method (multi-wavelength magneto-optical reproducing method) disclosed in WO97/03439 for reproducing with reproducing beams different in wavelength the multi-valued data or the trains of data recorded on a plurality of recording layers, the method (optical modulation domain magnifying and reproducing method) disclosed in Japanese Patent Application No. 9-244845 for reproducing the data recorded on a recording layer, by transferring the recorded data with light intensity-modulated reproducing light to a reproducing layer and magnifying the transferred magnetic domains, and the method (magnetic magnifying and reproducing method or magnetically amplified magneto-optical system (MAMMOS)) disclosed in WO98/02878 for reproducing the data recorded on a recording layer, by transferring the recorded data with reproducing light to a reproducing layer and magnifying the transferred magnetic domains with an external magnetic field applied. These methods will be described briefly below, but the magneto-optical multi-valued recording method will be described in detail in Embodiment A8 and will therefore not be described now.

The multi-wavelength magneto-optical reproducing method is a recording and reproducing method for recording, on a magneto-optical recording medium including a plurality of magnetic layers, multi-valued data as combinations of states of magnetization in the recording layers, and reproducing the multi-valued data from the sum of the states of magnetization in the magnetic layers. This reproducing method is characterized by the steps of irradiating the magnetic layers with light beams having wavelengths $\lambda_1$ and $\lambda_2$ ($\lambda_1$, $\neq\lambda_2$), respectively, converting the signals reproduced from the reflected beams of the different wavelengths into at least two-valued reproduced signals, and performing a logical operation for the converted signals of the different wavelengths to reproduce the recorded multi-valued data. This reproducing method may employ a magneto-optical recording medium wherein the strength ratios between the reproduced signals detected for the combinations of states of magnetization in the recording layers at the wavelength $\lambda_1$ differ from those at the wavelength $\lambda_2$.

Another magneto-optical recording medium may be employed wherein the order of strength of the reproduced signals detected for the combinations of states of magnetization in the recording layers at the wavelength $\lambda_1$ differs from that at the wavelength $\lambda_2$. This recording and reproducing method may employ a magneto-optical recording medium including two magnetic layers so that four combinations of states of magnetization in the layers make four-valued recording possible. The magnitude of each of the signals $\theta_1$ to $\theta_4$ reproduced from the four combinations of states of magnetization at the wavelength $\lambda_1$ differs from that at the wavelength $\lambda_2$. With the two magnetic layers irradiated respectively with light beams of the wavelengths $\lambda_1$ and $\lambda_2$, signals may be reproduced from the reflected beams. The reproduced signals may be sliced at one or more levels so that at least two-valued reproduced signals can be obtained. A logical operation may be performed for the at least two-valued reproduced signals from the two wavelengths so that the four-valued recorded data can be reproduced.

The principle of the multi-wavelength magneto-optical reproducing method will be explained briefly below. Explanation will be made as exemplified by reproduction of a four-valued recording signal recorded on a magneto-optical recording medium having two magnetic layers (recording layers) produced in Embodiment A1 described later on. FIG. 3(*a*) illustrates states of magnetization in first and second magnetic layers (recording layers) subjected to recording in accordance with Embodiment A4 described later on. Four combinations of states of magnetization (↑↑) (↑↓) (↓↑) (↓↓) exist on the magneto-optical recording medium based on the combination of the directions of magnetization in the first and second magnetic layers (The states of magnetization in the first and second magnetic layers are shown in that order). The four combinations of states of magnetization correspond to four-valued signals "0", "1", "2" and "3" recorded with external magnetic fields which have strengths of H0, H1, H2 and H3, respectively, applied to the magneto-optical recording medium in accordance with the recording principle explained in the embodiments. As for information recorded on the basis of the four combinations of states of magnetization, the magneto-optical recording medium is irradiated with reproducing light beams at $\lambda_1$=443 nm and $\lambda_2$=780 nm to obtain reflected light beams therefrom so that the magnitudes of apparent Kerr rotation angles are determined as reproduced signals.

The term "apparent Kerr rotation angle" herein means a Kerr rotation angle detected from a reflected light beam from a magneto-optical recording medium irradiated with a reproducing light beam. The apparent Kerr rotation angle is detected as a value which is larger than that of a Kerr rotation angle representing an actual state of magnetization of a magnetic layer due to a multiple interference effect on a protective layer in the recording medium or a Faraday effect of a recording layer. This angle is also called "effective Kerr rotation angle". FIG. 3(*b*) shows the relative signal outputs from the respective states reproduced with the reproducing light beam at $\lambda_1$=443 nm. FIG. 3(*c*) shows the relative signal outputs from the respective states reproduced with the reproducing light beam at $\lambda_2$=780 nm. As for the magneto-optical recording medium used in the method for recording and reproduction according to the present invention, the apparent Kerr rotation angle obtained with the reproducing light beam varies depending on the wavelength of the reproducing light beam especially due to the multiple interference of the reproducing light beam in the first dielectric layer. As shown in FIG. 2, reproduced signal strengths for the four states of magnetization "0", "1", "2" and "3" determined by the combination of the magnetic layers, i.e., apparent Kerr rotation angles, vary depending on the wavelength of the reproducing light beam. In FIG. 2, the difference F in the Kerr rotation angle between the states "1" and "0", the difference E in the Kerr rotation angle between the states "0" and "1" and the difference D in the Kerr rotation angle between the states "3" and "2" in the vicinity of a wavelength λ=630 nm are approximately the same. However, in a longer wavelength region, for example, the difference A in the Kerr rotation angle between the states "2" and "3" and the difference B in the Kerr rotation angle between the states "0" and "1" at a wavelength λ=780 nm are fairly larger than the associated differences D and F in the Kerr rotation angle at the wavelength λ=630 nm. On a shorter wavelength side, the difference C in the Kerr rotation angle between the states "3" and "0" especially in the vicinity of 443 nm is fairly larger than the associated difference E in the Kerr rotation angle in the vicinity of the wavelength λ=630 nm. According to these facts, it is recognizable that a higher S/N ratio is obtained by distinguishing and detecting the four states by using the two wavelengths of 443 nm and 780 nm, as compared with detection by dividing signal amplitudes corresponding to the four values of the states "0", "1", "2" and "3" by using the single wavelength of 630 nm. According to this embodiment, a reproduced signal is detected by using the reproducing light beam at $\lambda_1$=443 nm, and then it is sliced at an appropriate level to make separation into two values concerning the state "0" or "1" and the state "2" or "3", while a reproduced signal is detected by using the reproducing light beam at $\lambda_2$=780 nm, and then it is sliced at appropriate levels to make separation into three levels of the state "0" or "3", the state "1", and the state "2" so that two series of two-valued signals are obtained, from which a recording signal recorded on the multiple layers (two layers) can be reproduced.

Disclosed as a second reproducing method of the multi-wavelength magneto-optical reproducing method is a method for recording on and reproduction from a magneto-optical recording medium including a plurality of magnetic layers, in which multi-valued data or a plurality of series of two-valued data are recorded on the magneto-optical recording medium as combinations of states of magnetization in the magnetic layers, and the recorded data are reproduced on the basis of the sum of the states of magnetization in the magnetic layers. This reproducing method is characterized in that the magnetic layers are irradiated with light beams having wavelengths $\lambda_1$ and $\lambda_2$ respectively, the data recorded on one of the magnetic layers are reproduced by using the light beam having the wavelength $\lambda_1$, the data recorded on another of the magnetic layers are reproduced by using the light beam having the wavelength $\lambda_2$ ($\lambda_2 \neq \lambda_1$) and thus the data are independently reproduced from each of the magnetic layers. In this reproducing method, the magneto-optical recording medium is adjusted in such a manner that the order or sequence of strength of the reproduced signals detected for the states of magnetization determined by the combination of the states of magnetization differs between the detection at the wavelength $\lambda_1$ and the detection at the wavelength $\lambda_2$.

In the second reproducing method of the multi-wavelength magneto-optical reproducing method, it is preferred to use a magneto-optical recording medium including two magnetic layers capable of four-valued recording on the basis of four combinations of states of magnetization, in which the order of strength of the signals $\theta_1$ to $\theta_4$ reproduced from the four combinations of states of magnetization differs between the detection at the wavelength $\lambda_1$ and the detection at the wavelength $\lambda_2$, wherein the two-valued data on one of the magnetic layers are reproduced by using the light beam having the wavelength $\lambda_1$, and the two-valued data on the other magnetic layer are reproduced by using the light beam having the wavelength $\lambda_2$. In this case, a two-valued signal converted into two-valued one by slicing, at a predetermined level, a reproduced signal including the four combinations of states of magnetization detected at the wavelength $\lambda_1$ may correspond to a two-valued state of magnetization of one of the magnetic layers, and a two-valued signal converted into two-valued one by slicing, at a predetermined level, a reproduced signal including the four combinations of states of magnetization detected at the wavelength $\lambda_2$ may correspond to a two-valued state of magnetization of the other magnetic layer. The principle of the recording and reproducing method of the multi-wavelength magneto-optical reproducing method will be explained briefly with reference to FIGS. 5 and 6. FIG. 6(*a*) illustrates states of magnetization recorded on the first and second magnetic layers of a magneto-optical disk produced in Embodiment A2. Four combinations of states of magnetization (↑↑), (↑↓), (↓↑) and (↓↓) exist on the magneto-optical recording medium based on the combinations of directions of magnetization on the first and second magnetic layers. The four combinations of states of magnetization correspond to recorded four-valued recording signals "0", "1", "2" and "3", which have been recorded by applying external magnetic fields having strengths of H0, H1, H2 and H3, respectively, to the magneto-optical recording medium. These signals can be recorded by the foregoing magneto-optical multi-valued recording method. In the second reproducing method of the multi-wavelength magneto-optical reproducing method, the data recorded on the first magnetic layer and the two-valued data recorded on the second magnetic layer can be independently determined (or found) by using the reproducing light beam at $\lambda_1$=443 nm and the reproducing light beam at $\lambda_2$=780 nm respectively.

The magneto-optical recording medium used for the second reproducing method of the multi-wavelength magneto-optical reproducing method has a characteristic, as shown in FIG. 5, that a curve which represents variation in the apparent Kerr rotation angle with respect to the wavelength concerning one combination of states of magnetization in the two magnetic layers) intersects a curve which represents variation in the apparent Kerr rotation angle with respect to the wavelength concerning another combination of states of magnetization, in a range between the two reproducing wavelengths $\lambda_1$ and $\lambda_2$ (a curve for the state "0" and a curve for the state "3" in FIG. 5) . This characteristic can be specifically achieved by adjusting the optical lengths (thicknesses and refractive indexes) of the first dielectric layer and the magnetic layers with respect to the reproducing wavelengths $\lambda_1$ and $\lambda_2$. FIGS. 6(*b*) and 6(*c*) illustrate the relative signal outputs concerning the respective combinations of states of magnetization reproduced by using the light beams at $\lambda_1$ and $\lambda_2$. As for this medium, the levels (apparent Kerr rotation angles) of the reproduced signals concerning the states "0" and "3" intersect near 630 nm (FIG. 5). Accordingly, the order of magnitude of the reproduced signals for the states "0" and "3" is different between $\lambda_2$=780 nm and $\lambda_1$=443 nm. Specifically, the signal output decreases in an order of "2", "3", "0", "1" upon reproduction with the reproducing light beam at $\lambda_1$=443 nm, while the signal output decreases in an order of "2", "0", "3", "1" upon reproduction with the reproducing light beam at $\lambda_2$=780 nm. Now when the reproduced signal is sliced at an intermediate level of the reproduced signal output at $\lambda_2$=443 nm shown in FIG. 6(*b*), then it is possible to distinguish a set of the two states "2" and "3" from a set of the two states "0" and "1".

According to inspection of the states of magnetization of the two sets of the states, it is recognizable that the set of the two states of "2" and "3" and the set of the two states of "0" and "1" can be distinguished into two-valued information on the basis of the states of magnetization in the first magnetic layer. Specifically, both of the states "2" and "3" provide a state of magnetization ↓ of the first magnetic layer, while both of the states "0" and "1" provide a state of magnetization ↑ of the first magnetic layer. Therefore, a two-valued signal obtained by slicing the reproduced signal at the intermediate level of the reproduced signal output at $\lambda_1$=443 nm can correspond to two-valued states of magnetization in the first magnetic layer. On the other hand, when the reproduced signal is sliced at an intermediate level of the reproduced signal output at $\lambda_2$=780 nm shown in FIG. 6(*c*), then the set of the two states of "2" and "0" is distinguished from the set of the two states of "3" and "1", and they can be recognized by using two-valued information. According to inspection of the states of magnetization of the set of the states "2" and "0" and the set of states "3" and "1", both of the states of magnetization in the second magnetic layer are ↑ in the former set, while both of the states of magnetization of the second magnetic layer are ↓ in the latter set. Therefore, a two-valued signal obtained by slicing the reproduced signal at the intermediate level of the reproduced signal output at $\lambda_2$=780 nm can correspond to two-valued states of magnetization in the second magnetic layer. Therefore, the use of the magneto-optical recording medium provided with the reproduced signal characteristic as shown in FIGS. 6(*b*) and (c) makes it possible to independently reproduce two-valued information recorded on the first magnetic layer and two-valued information recorded on the second magnetic layer by selecting the wavelength $\lambda_1$ or $\lambda_2$ of the reproducing light beam. In this case, it is unnecessary for a focal point of a radiated laser beam to be adjusted at a magnetic layer intended to perform reproduction therefrom.

The reproducing wavelength is not specifically limited in the multi-wavelength magneto-optical reproducing method. However, the reproducing wavelength is preferably $\lambda_1$=350 to 900 nm because it is within a wavelength region capable of emission by using currently available various laser apparatuses or capable of emission by using a combination with an SHG (secondary higher harmonic wave generation) device. $\lambda_2$ is desirably different in wavelength from $\lambda_1$ by not less than 50 nm in order to separate pieces of information recorded on the respective magnetic layers at a high S/N ratio. In the recording and reproducing method described above, the light beams at $\lambda_1$ and $\lambda_2$ can be radiated so that they are condensed at different portions of a recording area on the magneto-optical recording medium.

In the multi-wavelength magneto-optical reproducing method, the light beam having the wavelength $\lambda_1$ or $\lambda_2$ is radiated to reproduce information recorded on one of the magnetic layers (recording layers), while the reproduced information and information to be recorded on another of the magnetic layers are recorded in combination with each other so that only information on the another of the magnetic layers may be rewritten in a virtual manner. In the foregoing second recording and reproducing method, information recorded on each of the magnetic layers can be independently reproduced by using a different wavelength for each of the magnetic layers. Therefore, when only one magnetic layer is subjected to rewriting, then information on another magnetic layer not subjected to rewriting is previously reproduced by allowing a reproducing light beam to precede a recording light beam in order to perform scanning on a recording track, and a magnetic field modulation signal is formed by combining the reproduced information with information to be recorded on the magnetic layer subjected to rewriting so that the two magnetic layers are heated by the recording light beam to perform recording while applying a magnetic field in conformity with the modulation signal. Thus, only one magnetic layer is consequently subjected to rewriting.

Suitable for use with the first reproducing method of the multi-wavelength magneto-optical reproducing method is a magneto-optical recording medium in which a ratio of magnitudes of Apparent Kerr rotation angles read from a plurality of states of magnetization determined by the combination of the states of magnetization, obtained upon reproduction by using a light beam having a wavelength $\lambda_1$ is mutually different from that obtained upon reproduction by using a light beam having a wavelength $\lambda_2$. It is preferred in this magneto-optical recording medium that optical path lengths of layers for constructing the magneto-optical recording medium are adjusted so that the ratio of magnitudes of Apparent Kerr rotation angles read from a plurality of states of magnetization determined by the combination of the states of magnetization, obtained upon reproduction by using the light beam having the wavelength $\lambda_1$, is mutually different from that obtained upon reproduction by using the light beam having the wavelength $\lambda_2$.

A magneto-optical recording medium for use with the second reproducing method of the multi-wavelength magneto-optical reproducing method includes a plurality of magnetic layers on a substrate. Multi-valued data or a plurality of series of two-valued data are recorded on the medium based on combinations of states of magnetization in the magnetic layers. Suitable as such a recording medium is a magneto-optical recording medium in which magnitudes of apparent Kerr rotation angles read from a plurality of states of magnetization determined by the combination of the states of magnetization differ depending on a wavelength of a reproducing light beam respectively, and which has a magneto-optical characteristic that a curve representing variation in the apparent Kerr rotation angle with respect to the wavelength of the reproducing light beam detected from one combination of states of magnetization intersects a curve representing variation in the apparent Kerr rotation angle with respect to the wavelength of the reproducing light beam detected from at least one other combination of states of magnetization, in a wavelength range between the wavelengths $\lambda_1$ and $\lambda_2$ of the reproducing light beam.

It is preferable that this magneto-optical recording medium should include at least one dielectric layer and a plurality of magnetic layers on a substrate, and that optical path lengths of the dielectric layer and the magnetic layers be adjusted so that the recording medium has the magneto-optical characteristic that the curve which represents variation in the apparent Kerr rotation angle with respect to the wavelength of the reproducing light beam detected from one combination of states of magnetization intersects the curve which represents variation in the apparent Kerr rotation angle with respect to the wavelength of the reproducing light beam detected from at least one other combination of states of magnetization, in the wavelength range of $\lambda_1$ to $\lambda_2$ of the wavelength of the reproducing light beam.

A magneto-optical recording medium for use with the multi-wavelength reproducing method includes at least two recording (magnetic) layers, and may also include a first dielectric layer, a second dielectric layer, an auxiliary magnetic layer, a third dielectric layer, a metallic reflective layer and a protective layer between, over or under the recording layers. By stacking these layers in various orders on a transparent substrate, it is possible to form magneto-optical recording media.

The first dielectric layer is provided as a layer for making multiple interference of the reproducing light beam, and increasing the apparent Kerr rotation angle, and it is generally formed of an inorganic dielectric material having a refractive index larger than that of the transparent substrate. Those preferred for the first dielectric layer include, for example, oxides or nitrides of silicon, aluminum, zirconium, titanium, and tantalum, and those especially preferred include SiN. In particular, in the multi-wavelength magneto-optical reproducing method, it is important to control the optical length of the first dielectric layer, i.e., the refractive index and the thickness of the first dielectric layer. If the first dielectric layer is composed of SiN, it should preferably have a refractive index of 1.90 to 2.40. The first dielectric layer composed of SiN having the refractive index as described above can be obtained by adjusting the mixing ratio of sputtering atmosphere gases in conformity with a composition of $SiN_x$ upon production of SiN by means of a dry process such as a sputtering method. The first dielectric layer should preferably have a thickness of 400 to 1,100 A (angstroms).

The magnetic (recording and reproducing) layers of a medium for use with the multi-wavelength magneto-optical reproducing method may be composed of an amorphous vertically magnetizable film comprising an alloy of a rare earth metal-transition metal system. Especially, when recording is performed in accordance with the magnetic field modulation system, the magnetic layers should preferably be composed of a material represented by the following general formula:

$$(Tb_{100-A}Q_A)_X Fe_{100-X-Y-Z} Co_Y M_Z$$

wherein:

15 atomic $\% \leqq X \leqq 40$ atomic %;

5 atomic $\% \leqq Y \leqq 20$ atomic %;

0 atomic $\% \leqq Z \leqq 15$ atomic %;

0 atomic $\% \leqq A \leqq 30$ atomic %;

wherein: M is at least one element selected from the group consisting of Nb, Cr, Pt, Ti, and Al, and Q is at least one element selected from the group consisting of Gd, Nd, and Dy.

When the recording layer comprises two magnetic layers, both of the first and second magnetic layers may be composed of the alloy of the rare earth metal-transition metal system having the composition described above. The first magnetic layer should preferably have a thickness of 20 to 200 A (asgstroms), and the second magnetic layer should preferably have a thickness of 50 to 500 A (angstroms). The first and second magnetic layers may have various combinations of their Curie temperatures and thicknesses. However, the first and second magnetic layers should preferably have their Curie temperatures which are approximate to one another as close as possible in order to provide a uniform size of magnetic domains recorded on each of the layers. It is preferred that the difference in Curie temperature between the layers is within 30° C. It is optimum that the layers have an equal Curie temperature. It is also possible to form a film obtained by stacking three or more magnetic layers.

The auxiliary magnetic layer is added to the magnetic layer for recording so that the auxiliary magnetic layer serves to control an external condition under which recording (i.e., inversion of magnetization) occurs on the magnetic layer. The auxiliary magnetic layer is provided, for example, for controlling a region of an external magnetic field to generate a state of magnetization of each direction (↑or ↓) during recording so that combinations of states of magnetization to be generated on the stacked magnetic layers for recording are generated under different recording conditions. The auxiliary magnetic layer may be composed of, for example, an amorphous vertically magnetizable film of a rare earth-transition metal system, an alloy thin film composed of at least one element selected from the group consisting of noble metals such as Pt, Al, Ag, Au, Cu, and Rh, and at least one element selected from the group consisting of transition metals such as Fe, Co, and Ni, or a film composed of a simple substance of a transition metal such as Fe, Co, and Ni or an alloy film thereof. The auxiliary magnetic layer may have a thickness of 5 to 1,500 A (angstroms).

The metallic reflective layer reflects the reproducing light beam having passed through various layers to return the light beam toward the transparent substrate so that the apparent Kerr rotation angle may be increased owing to the Faraday effect exerted during transmission through the magnetic layer. The metallic reflective layer should preferably be composed of an alloy comprising at least one metal element selected from the group consisting of Al, Ag, Au, Cu, and Be and at least one metal element selected from the group consisting of Cr, Ti, Ta, Sn, Si, Pe, Nb, Mo, Li, Mg, W, and Zr.

The second and third dielectric layers make multiple interference of the reproducing light beam having passed through various layers so that the Kerr rotation angle may be increased, in the same manner as described for the first dielectric layer. The second and third dielectric layers may be composed of the group of materials which may be used to construct the first dielectric layer. In addition, the dielectric layers and the metallic reflective layer also serve as heat control layers to obtain an appropriate recording power sensitivity or an appropriate recording power margin, and they also serve to protect the recording layer from chemical shock. The second and third dielectric layers and the metallic reflective layer are optional layers, which may be omitted.

The transparent substrate is composed of a transparent resin material including, for example, polycarbonate, polymethyl methacrylate, and epoxy, on which a preformat pattern is formed.

The protective layer is the uppermost layer, which may be composed of, for example, an ultraviolet-curable resin. The magneto-optical recording medium having the structure as described above should preferably be produced by a dry process such as sputtering and vapor deposition.

The thickness of each of the first to third dielectric layers, the first and second magnetic layers, and the auxiliary magnetic layer of the magneto-optical recording medium may be appropriately adjusted in accordance with the way of change of the apparent Kerr rotation angle depending on the reproducing wavelength, the apparent Kerr rotation angle being obtained on the basis of the states of magnetization determined by the combination of states of magnetization in the magnetic layers. In particular, the thickness of each of the layers is adjusted so that the ratio and/or the order of magnitude of apparent Kerr rotation angles obtained on the basis of a plurality of combinations of states of magnetization is different between the selected two reproducing wavelengths.

The optical modulation domain magnifying and reproducing method will be explained below. The magneto-optical recording media which can be used with this method can be classified into the following two types of magneto-optical layer structure. For convenience of explanation, the illustrated magneto-optical layer structure includes one recording layer and one reproducing layer. However, the present invention includes a structure in which two or more such layer structures are stacked or laminated.

The first type of magneto-optical layer structure, as illustrated in FIGS. 21A and 21B, includes a first auxiliary magnetic film 5 and a second auxiliary magnetic film 4 sequentially laminated on a magneto-optical recording film 6. The magneto-optical recording film 6, the first auxiliary magnetic film 5 and the second auxiliary magnetic film 4 have magnetic characteristics such that, when the Curie temperatures of the magneto-optical recording film, the first auxiliary magnetic film and the second auxiliary magnetic film are designated as $T_{C0}$, $T_{C1}$ and $T_{C2}$, respectively, and the critical temperatures of the first auxiliary magnetic film and the second auxiliary magnetic film are designated as $T_{CR1}$ and $T_{CR2}$, respectively, a relationship expressed as room temperature$<T_{CR2}\leqq T_{CR1}\leqq T_{C0}$, $T_{C1}$, $T_{C2}$ is satisfied.

The first auxiliary magnetic film 5 and the second auxiliary magnetic film 4, as shown in FIG. 22, have magnetic characteristics such that they are plane-magnetized films from room temperature to a certain critical temperature ($T_{CR}$) higher than room temperature, but are perpendicular-magnetized films at a temperature above $T_{CR}$. The magneto-optical recording film 6 is a perpendicular-magnetized film at or above room temperature.

The principle of action (reproduction) of the first type of magneto-optical layer structure will be described below. FIG. 21A shows states of magnetization in the layers after writing recording magnetic domains into the magneto-optical recording film 6 by the optical modulation recording system or the like, but before reproducing them. When this medium is irradiated with reproducing light of a suitable power for making the peak temperatures of the magnetic films desired temperatures, a magnetic domain 22 of perpendicular magnetization in the magneto-optical recording film 6 is first transferred to an area in the first auxiliary magnetic film 5 where the temperature has become higher than $T_{CR1}$. For this purpose, in view of a temperature profile within the medium developed upon radiation with reproducing light as shown in FIG. 27, the reproducing power and $T_{CR1}$ are set so that a magnetic domain 21 of the same size as, or a smaller size than, the size of the magnetic domain in the magneto-optical recording film 6 will be transferred to the first auxiliary magnetic film 5.

Then, the magnetic domain 21 transferred to the first auxiliary magnetic film 5 is transferred to the second auxiliary magnetic film 4. The critical temperatures of the first and second auxiliary magnetic films are set to satisfy $T_{CR2}<T_{CR1}$. Thus, as indicated by the temperature profile within the medium of FIG. 27, an area in the second auxiliary magnetic film which can be perpendicularly magnetized is larger in diameter than that in the first auxiliary magnetic film. As shown in FIG. 21B, therefore, a transferred magnetic domain 23 in the second auxiliary magnetic film 4 is enlarged or magnified by perpendicular magnetic anisotropy within the perpendicularly magnetizable area in the second auxiliary magnetic film and exchange coupling force resulting from the perpendicular magnetization in the first auxiliary magnetic film 5. This magnetic domain enlargement can be said to be promoted, since the in-plane magnetization in areas indicated at W of the first auxiliary magnetic film 5 in FIG. 21B weakens the exchange coupling force from magnetic domains S of the magneto-optical recording film 6 to the second auxiliary magnetic film 4. This magnetic domain enlargement curtails the decrease in the quantity of light contributing to a reproduction output due to magnetic masking by in-plane magnetization, thus permitting reproduction at a high C/N ratio.

The effect of enlargement of the magnetic domain 23 in the second auxiliary magnetic film 4 becomes maximal when the transferred magnetic domain in the second auxiliary magnetic film 4 is enlarged to a size larger than the diameter of a reproducing light spot. In this state, a very large reproduction output is obtained which is unrelated to the size or shape of the magnetic domain recorded in the magneto-optical recording film 6 and which is determined only by the figure of merit of the second auxiliary magnetic film 4 and the intensity of reproducing light beam. After reproduction, namely, after the reproducing laser light-irradiated area has moved, the readout area is cooled to $T_{CR2}$ or lower, whereupon the first and second auxiliary magnetic films are returned to a plane-magnetized state, the state of FIG. 21A. Even at temperatures during the reproducing action as described above, the coercivity of the magneto-optical recording film 6 is sufficiently high, so that the information recorded as magnetization is completely retained.

The second type of magneto-optical layer structure, as illustrated in FIG. 26, is characterized in that it includes a nonmagnetic film 9 between an auxiliary magnetic film 8 and a magneto-optical recording film 10, and that the magneto-optical recording film 10 and the auxiliary magnetic film 8 have magnetic characteristics such that when the Curie temperatures of the magneto-optical recording film and the auxiliary magnetic film are designated as $T_{C0}$ and $T_C$, respectively, and the critical temperature of the auxiliary magnetic film is designated as $T_{CR}$, a relationship expressed as room temperature$<T_{CR}\leqq T_{C0}$, $T_C$ is satisfied.

The principle of reproduction from the second type of magneto-optical layer structure will be described below.

FIG. 25A schematically shows states of magnetization in the auxiliary magnetic film 8, nonmagnetic film 9 and magneto-optical recording film 10 after writing recording magnetic domains into the magneto-optical recording film 10 of the layer structure shown in FIG. 26 by the optical modulation recording system or the like, but before reproducing them. When this magneto-optical layer structure is irradiated with reproducing light of a suitable power for making the peak temperatures of the magnetic films the desired temperatures, an area which can reach $T_{CR}$ or a higher temperature and can be perpendicularly magnetized occurs in the auxiliary magnetic film 8. The $T_{CR}$ and the reproducing power are set so that the size of this area will become not smaller than the diameter of a magnetic domain M recorded in the magneto-optical recording film 10, preferably not smaller than the diameter of a reproducing light spot. The auxiliary magnetic film 8 has magnetic characteristics such that its coercivity has a distribution as shown in FIG. 28 in correspondence with a temperature distribution in the area at or above $T_{CR}$, and the values of the coercivity are sufficiently small in a region reaching the peak temperature and in the vicinity of the region.

The magneto-optical recording film 10 has a distribution of magnetization as shown in FIG. 28 in correspondence with the temperature distribution in the area above $T_{CR}$, and a magnetic characteristic such that the values of magnetization are sufficiently large in a region reaching the peak temperature and in the vicinity of the region. Since the magnetic characteristics of the magnetic films have been set as describe above, only the magnetic domain M in the high-temperature, sufficiently high magnetization region in the magneto-optical recording film 10 is transferred to the high-temperature, sufficiently low coercivity region in the auxiliary magnetic film 8 because of a great static magnetic coupling force between the magneto-optical recording film 10 and the auxiliary magnetic film 8 that acts in the region of the magnetic domain M. As a result, a sufficient reproduction resolving power is obtained.

It is conceivable that, as shown in FIG. 25B, a magnetic domain 63 transferred to the auxiliary magnetic film 8 is then enlarged by perpendicular magnetic anisotropy within the region above $T_{CR}$ and exchange coupling force from the transferred magnetic domain. This magnetic domain enlargement strengthens reproduced signals and improves the C/N ratio, as with the first type of magneto-optical recording medium. After reproduction, namely, after the reproducing laser light has moved, the readout area is cooled to $T_{CR}$ or lower, whereupon the auxiliary magnetic film 8 becomes a plane-magnetized film, and returns to the state of FIG. 25A.

The optical modulation domain magnifying and reproducing method involves reproducing a signal by irradiating the first or second magneto-optical recording medium with reproducing light power-modulated at a period which is equal to, or an integral number of times as long as, the period of a reproducing clock. The principle of this reproducing method will be described with reference to FIG. 30, which is a schematic view of the reproducing method. In this reproducing method, the second type of magneto-optical recording medium shown in FIG. 25 is used. First, a predetermined record pattern as shown in FIG. 30(*a*) is recorded in the magneto-optical recording medium by the optical modulation recording system or the like. In the figure, record marks are recorded with the shortest mark pitch DP, and a record mark length DL is set such that DL=DP/2. During reproduction, the recording medium is irradiated with pulsed laser light, as reproducing laser light, modulated to two reproducing powers Pr2 and Pr1 so that, as shown in FIG. 30(*b*), the pulsed light will have a period DP synchronized with the record mark positions, and the emission width of the higher power Pr2 will be DL. Light with the lower reproducing power Pr1 is radiated always in an erase state (at sites without record marks), while light with the higher reproducing power Pr2 is radiated always in a record state (at sites with record marks) and an erase state.

FIG. 30(*c*) shows a signal waveform reproduced by irradiation with reproducing pulsed laser light as shown in FIG. 30(*b*). FIG. 30(*d*), on the other hand, shows a signal waveform reproduced from the same track with continuous light having a constant reproducing light power. Pr2 is selected to be a power which will bring about the magnetic domain enlargement in the auxiliary magnetic film 8, as will be described later on, while Pr1 is selected to be a power which will cause the magnetic domain enlargement to vanish. By so selecting the reproducing power, the amplitude $H_{pl}$ between the record state and the erase state observed with pulsed light reproduction can be set to have the relation $H_{pl}>H_{dc}$, where $H_{dc}$ is the amplitude with reproduction using constant laser light. Furthermore, magnetized information recorded in each magnetic domain of the magneto-optical recording film can be reproduced in an enlarged form independently of, and without influence from, adjacent magnetic domains.

As the optical modulation domain magnifying and reproducing method, the following reproducing method, too, is effective. Used with this method is a magneto-optical recording medium comprising a magneto-optical recording film having perpendicular magnetization, an auxiliary magnetic film which transfers from an in-plane magnetizable film to a perpendicularly magnetizable film when its temperature exceeds a critical temperature Tcr, and a non-magnetic film interposed between the magneto-optical recording film and the auxiliary magnetic film. The magneto-optical recording medium has a magnetic characteristic which satisfies a relationship of room temperature≦Tcr≦Tcomp≦Tco≦Tc concerning a Curie temperature Tco of the magneto-optical recording film and a Curie temperature Tc and a compensation temperature Tcomp of the auxiliary magnetic film. It is possible to reproduce a recorded signal by irradiating the magneto-optical recording medium with a reproducing light beam power-modulated to have at least two light powers of $Pr_1$ and $Pr_2$ at a period which is equal to, or an integral number of times as long as, the period of a reproducing clock while applying a DC magnetic field to the medium so that a recording magnetic domain in the magneto-optical recording film is transferred to the auxiliary magnetic film, the transferred magnetic domain is magnified, and the magnified magnetic domain is reduced or extinguished. In this method, the light power $Pr_1$ of the reproducing light beam may be a power to heat the auxiliary magnetic film to a temperature from Tcr to Tcomp so that the recording magnetic domain in the magneto-optical recording film is transferred to the auxiliary magnetic film and the magnetic domain is magnified, while the light power $Pr_2$ may be a power to heat the auxiliary magnetic film to a temperature from Tcomp to Tco so that the magnified magnetic domain is reduced or extinguished. It is preferable that such a magneto-optical recording medium is used with this reproducing method that, under a condition in which an external magnetic field Hex is applied to the recording medium, a temperature curve A of a transfer magnetic field generated by the external magnetic field Hex and the magneto-optical recording film and a temperature curve B of a coercive force of the auxiliary magnetic film in a perpendicular direction intersect between room temperature and the compensation temperature Tcomp of the auxiliary magnetic film, and the temperature curves A and B intersect between the compensation temperature Tcomp of the auxiliary magnetic film and the Curie temperature Tco of the magneto-optical recording film. The transfer magnetic field is the sum of the external magnetic field Hex and a static magnetic field Ht from the magneto-optical recording film. The coercive force of the auxiliary magnetic film in the perpendicular direction may be represented by the sum of a coercive force Hr in the perpendicular direction of the magnetic domain subjected to the transfer and an exchange coupling force Hw exerted on the magnetic domain subjected to the transfer by adjoining magnetic domains.

The method for transferring a recording magnetic domain inscribed on the recording layer to the reproducing layer so that the transfer signal on the reproducing layer is magnified and read in order to obtain a high reproduced signal has been confirmed by using the MAMMOS described later. The MAMMOS involves magnifying and reducing a magnetic domain transferred to the reproducing layer with an alternating magnetic field during reproduction. This optical modulation domain magnifying and reproducing method makes it possible to magnify and reduce a transferred magnetic domain by making modulation to give two or more reproducing light powers by using a direct current magnetic field. The principle of reproduction by this reproducing method will be explained. The reproducing method is based on the use of a magneto-optical recording medium comprising a magneto-optical recording film having perpendicular magnetization, an auxiliary magnetic film which causes transition from an in-plane magnetizable film to a perpendicularly magnetizable film when its temperature exceeds a critical temperature Tcr, and a non-magnetic film interposed therebetween. FIG. 37 shows a magneto-optical recording medium of this type. The magneto-optical disk 90 shown in FIG. 37 comprises, in a stacked form on a substrate 1, a dielectric film 3, an auxiliary magnetic film 8, a non-magnetic film 3, a magneto-optical recording film 10, and a protective film 7. The auxiliary magnetic film 8 has a compensation temperature Tcomp between a critical temperature Tcr and its Curie temperature Tc. The magneto-optical recording medium 90 satisfies the relationship of room temperature<Tcr<Tcomp<Tco<Tc concerning the Curie temperature Tco of the magneto-optical recording film 10, the critical temperature Tcr, the Curie temperature Tc, and the compensation temperature Tcomp of the auxiliary magnetic film 8.

Reproduction is performed in accordance with the optical modulation domain magnifying and reproducing method by radiating the light power-modulated reproducing light beam while applying the external DC magnetic field to the magneto-optical recording medium 90 having the magnetic characteristic as described above. FIG. 39 shows magnetic characteristics of the magneto-optical recording film 10 and the auxiliary magnetic film 8 of the magneto-optical disk 90 in a state in which the constant DC magnetic field Hex is applied to the magneto-optical recording medium 90 in the recording direction. The magnetic temperature curve A shown in FIG. 39 denotes a temperature-dependent change in transfer magnetic field (static magnetic field) generated by the magnetization of the recording layer from the magneto-optical recording film 10 (hereinafter simply referred to as "recording layer") to the auxiliary magnetic film 8 (hereinafter simply referred to as "reproducing layer"). The transfer magnetic field of the curve A represents the magnitude of the magnetic field obtained by adding an amount of offset of the external magnetic field Hex. Therefore, the magnetic filed having the magnitude of (Hex−Ht) and the magnetic field having the magnitude of (Hex+Ht) exist as the entire transfer magnetic field depending on the direction of the magnetic domain of the recording layer, with a boundary of the Curie temperature Tco of the recording layer. The two magnetic fields constitute the curve A. In FIG. 39, the downward direction is the recording direction. Hex is applied in the downward direction. In this case, the external magnetic field Hex is adjusted to be small as compared with the magnitude of the static magnetic field Ht in the initializing direction generated from the magnetization of the recording layer at room temperature. Therefore, the entire transfer magnetic field includes those directed in the upward direction (negative) and in the downward direction (positive) depending on the direction of magnetization of the recording magnetic domain in the recording layer as illustrated by the curve A.

The magnetic temperature curve B denotes the temperature-dependent change of the coercive force in the perpendicular direction of the reproducing layer in a state of having the perpendicular magnetization. The coercive force is represented by Hr+Hw as including the pure coercive force Hr of the magnetic domain in the reproducing layer in the perpendicular direction and the magnetic field Hw corresponding to a virtual magnetic field regarded to be applied by generation of the magnetic wall of the reproducing layer (in other words, the exchange coupling magnetic field in the in-plane direction of the reproducing layer). That is, Hr+Hw represents the magnetic field necessary to perform inversion of the magnetization in the direction perpendicular to the film surface of the reproducing layer. As shown in FIG. 39, the magnetization in the direction perpendicular to the film surface of the reproducing layer appears at a temperature which is not less than the critical temperature Tcr (T0 in FIG. 39) at which the reproducing layer behaves as a perpendicularly magnetizable film. The coercive force is maximal at the compensation temperature Tcomp because the magnetization of the reproducing layer is zero.

The temperature curves A and B shown in FIG. 39 are divided into those belonging to three areas (a) to (c) as shown in FIG. 39. The three areas (a) to (c) correspond to the three steps of i) magnetic domain transfer from the recording layer to the reproducing layer, ii) magnification of the transferred magnetic domain in the reproducing layer, and iii) extinguishment of the magnified magnetic domain, respectively, in the reproducing method shown in FIG. 40(*a*). Accordingly, explanation will be made with reference to FIG. 40 for the magnetic characteristics required for the recording layer and the reproducing layer in the areas (a) to (c) shown in FIG. 39. Arrows in the recording layer and the reproducing layer shown in FIG. 40(*a*) denote the direction of the magnetic moment of the rare earth metal included in each of the magnetic domains.

The area (a) is a temperature area in which the magnetic domain is transferred from the recording layer to the reproducing layer in this reproducing method, which belongs to a temperature range of T0 to T1 in the figure. T0 means the critical temperature Tcr, and T1 is a temperature at which the magnetic temperature curve A on the side of Hex−Ht initially intersects the magnetic temperature curve B. The temperature range T0 to T1 can be achieved by adjusting the light power of the reproducing light beam to be a relatively low power as described later on. In order to actually perform the magnetic transfer as shown in FIG. 40(*a*)(1) in this temperature area, it is necessary that the magnitude of the transfer magnetic field in this temperature area exceed the coercive force of the reproducing layer in the perpendicular direction. That is, when the magnetization recorded on the recording layer is in the direction ↓ (recording direction), it is necessary that the transfer magnetic field represented by Hex+Ht is larger than Hr+Hw or −(Hr+Hw) (requirement for magnetic domain transfer). When the magnetization recorded on the recording layer is in the direction ↑ (erasing direction), it is necessary that the negative transfer magnetic field represented by Hex−Ht is smaller than the coercive force Hr+Hw or −(Hr+Hw) of the reproducing layer in the perpendicular direction (requirement for magnetic domain transfer).

On the other hand, when the magnetic temperature curves A and B are compared with each other in the area (a) shown in FIG. 39, it is appreciated that the relationships of the following expressions (a1) to (a3) hold.

$$Hr < Hex + Ht - Hw \quad \text{(a1)}$$

$$-Hr > Hex - Ht + Hw \quad \text{(a2)}$$

$$Hr > Hex - Ht - Hw \quad \text{(a3)}$$

Therefore, the area (a) satisfies the magnetic domain transfer requirement described above, and the recording magnetic domain in the recording layer can be transferred to the reproducing layer regardless of the direction of magnetization thereof. FIG. 40(*a*)(1) shows a case in which the magnetization in the direction ↓ recorded in a magnetic domain 210 in the recording layer is transferred to an area of the reproducing layer at a temperature which exceeds the temperature T0 within the reproducing light spot so that a transferred magnetic domain 201*a* is formed.

Subsequently, in the area (b) shown in FIG. 39, the magnetic domain magnification is performed for the magnetic domain 201*b* transferred to the reproducing layer as shown in FIG. 40 (2) and (3). This temperature area resides in a range indicated by T1 to T2 in the figure. The temperature T2 is a temperature at which the magnetic temperature curve A on the side of Hex–Ht intersects the magnetic temperature curve B on the high temperature side. The magneto-optical disk having the magnetic characteristic shown in FIG. 39 is adjusted such that T2 is approximately coincident with the compensation temperature Tcomp of the reproducing layer (the temperature exists between the compensation temperature Tcomp and the Curie temperature Tco of the recording layer, and the temperature is a temperature extremely close to the compensation temperature Tcomp) in relation to the external magnetic field Hex. In this temperature area, as shown in FIG. 40(*a*)(2), magnetic domains 203, 203', which are subjected to magnetic transfer from magnetic domains 212, 212' in the recording layer in the upward direction, exist on both sides of the magnetic domain 201*b* transferred to the reproducing layer, as a result of being heated to T0 to T1 within the reproducing light spot. In order to allow the magnetic domain 201*b* transferred to the reproducing layer to start magnification in the in-plane direction, it is necessary that the directions of the magnetic domains 203, 203' disposed on the both sides are directed to the recording direction (direction ↓) in the same manner as the magnetic domain 201*b*. The magnetic domains 203, 203' receives the transfer magnetic field (Hex–Ht) (totally in the direction ↑) obtained by adding, to the external magnetic field Hex, the static magnetic field Ht in the upward direction from magnetic domains 212 in the recording layer existing just thereover. On the other hand, the magnetic domains 203, 203' have the coercive force in the perpendicular direction including the exchange coupling magnetic field Hw (in the downward direction) exerted by the magnetic domain 201*b* and the coercive force Hr to invert the magnetization of the magnetic domains 203, 203' themselves. Therefore, when the coercive force in the perpendicular direction (Hr+Hw) is made larger than the transfer magnetic field (Hex–Ht) of the magnetic domains. 203, 203', the magnetic domains 203, 203' are inverted (requirement for magnetic domain inversion).

It is appreciated that the following relational expressions hold in the area (b) according to the relative magnitude between the magnetic temperature curves A and B.

$$Hr < Hex + Ht - Hw \quad (b1)$$

$$-Hr < Hex - Ht + Hw \quad (b2)$$

$$Hr > Hex - Ht - Hw \quad (b3)$$

The foregoing expression (b2) is the condition of magnetic domain inversion itself under which the coercive force (Hr+Hw) in the perpendicular direction is larger than the transfer magnetic field Hex–Ht (in the upward direction) of the magnetic domains 203, 203'. Therefore, the magnetic domain magnification occurs in the area (b) for the magnetic domain 201*b* in the reproducing layer as shown in FIG. 39(*a*)(3). According to the relationship of (b2), it is demonstrated that no magnetic domain in the downward direction appears in the reproducing layer when there is no magnetic domain in the recording direction in the reproducing layer, in the temperature area (b). In FIG. 39(*a*)(3) , the both sides of the magnified magnetic domain 201*b* are the temperature area of T0 to T1. Therefore, the magnetic domains 203, 203' in the direction ↑, which are subjected to the magnetic domain transfer from the magnetic domains 212, 212' in the recording layer, exist therein.

Subsequently, in the area (c), the transferred and magnified magnetic domain is inverted (extinguished), and a magnetic domain 201*c* in the erasing direction is formed as shown in FIG. 40(*a*)(4). This temperature area exists in a range from T2 which slightly exceeds the compensation temperature of the reproducing layer, to the Curie temperature Tco of the recording layer. The magnified and reproduced magnetic domain can be extinguished or reduced by applying the reproducing magnetic field in the erasing direction, i.e., by using the alternating magnetic field as the reproducing magnetic field. However, in this reproducing method, the DC magnetic field is used to extinguish the magnified magnetic domain by power-modulating the reproducing light beam to have the power higher than the reproducing light power used to perform the magnetic transfer and the magnification. The reproducing light power may be modulated to be further small in order to extinguish the magnified magnetic domain, as described in Embodiment B2 of the reproducing method on the magneto-optical recording medium as described later on.

Explanation will be made with reference to FIG. 41 for the principle to invert (extinguish) the magnified magnetic domain in the area (c). FIG. 41 illustrates the temperature-dependent change of the direction and the magnitude of sub-lattice magnetization of the rare earth metal and the transition metal of the magnetic domain 210 in the recording layer composed of the rare earth-transition metal (TbFeCo alloy) and the magnetic domain 201*b* in the reproducing layer composed of the rare earth-transition metal (GdFeCo alloy) subjected to the magnetic domain transfer therefrom shown in FIG. 40(*a*)(2). As shown in FIG. 41(*a*), when the temperature of the reproducing layer is less than the compensation temperature Tcomp, then the magnetization of the rare earth metal in the reproducing layer is dominant, and it is parallel to the direction of magnetization of the recording layer of the transfer source (the magnetization of the transition metal is dominant). Subsequently, when the temperature of the reproducing layer exceeds the compensation temperature Tcomp by radiating the high power laser, the magnetic moment of the transition metal in the reproducing layer is dominant. It is appreciated that the following expressions (c1) and (c2) hold according to the relative magnitude of the magnetic temperature curves A and B of the reproducing layer and the recording layer in the area (c) shown in FIG. 39.

$$Hr < Hex + Ht - Hw \quad (c1)$$

$$Hr < Hex - Ht - Hw \quad (c2)$$

That is, the coercive force Hr of the magnetic domain 201*b* is smaller than the entire magnetic field (Hex+Ht–Hw or Hex–Ht–Hw) in the recording direction acting on the magnetic domain 201*b*. As a result, when the temperature of the reproducing layer is not less than the compensation temperature Tcomp (exactly, when it is not less than T2), the dominant magnetic moment of the transition metal is inverted to be directed in the recording direction as shown in FIG. 41(*b*). Therefore, the magnetic moment of the rare earth metal in the downward direction of the magnified magnetic domain 201*b* shown in FIG. 40(*a*)(3) is inverted in the area which is heated to the temperature not less than the temperature of the area (c), i.e., not less than the compensation temperature Tcomp. Thus, the inverted magnetic domain 201*c* is generated (FIG. 40(*a*)(4)). The magnetic domains 201*d*, 201*d*', which are disposed on the both sides of the inverted magnetic domain 201*c*, have their temperatures ranging from T1 to T2. Therefore, the magnetic domains 201*d*, 201*d*' have the same direction of magnetization as that of the magnified magnetic domain 201*b*.

In the foregoing reproducing method, the three temperature areas (a) to (c) can be achieved by modulating the reproducing light power to have at least the two power levels $Pr_1$ and $Pr_2$ as shown in FIG. 40(*b*). That is, the light power $Pr_1$ of the reproducing light beam may be the power for heating the auxiliary magnetic layer to the temperature of Tcr to Tcomp and making it possible to transfer the recording magnetic domain in the magneto-optical recording film to the reproducing layer and magnify the magnetic domain. The light power $Pr_2$ of the reproducing light beam may be the power for heating the auxiliary magnetic layer to the temperature of Tcomp to Tco and reducing or extinguishing the magnified magnetic domain as described above. The $PR_1/Pr_2$ power-modulated reproducing light beam is used as the reproducing light beam in synchronization with the reproducing clock. Thus, the recording magnetic domain in the recording layer can be subjected to reproduction through the steps of i) transfer to the reproducing layer, ii) magnification of the transferred magnetic domain, and iii) extinguishment of the magnified magnetic domain.

With reference to FIG. 42, a magneto-optical layer structure suitable for the foregoing reproducing method will be explained. As shown in FIG. 42, a magneto-optical recording medium 100 successively comprises, on a magneto-optical recording film 10, a first auxiliary magnetic film 28, a non-magnetic film 29, and a second auxiliary magnetic film 24. The magneto-optical recording film 10 is a perpendicularly magnetizable film. The first auxiliary magnetic film 28 is a magnetic film which causes transition from a perpendicularly magnetizable film to an in-plane magnetizable film when the temperature exceeds the critical temperature $Tcr_{11}$. The second auxiliary magnetic film 24 is a magnetic film which causes transition from an in-plane magnetizable film to a perpendicularly magnetizable film when the temperature exceeds the critical temperature $Tcr_{12}$. It is assumed herein that materials and compositions of the magnetic films are adjusted so that the critical temperature $Tcr_{11}$ of the first auxiliary magnetic film is higher than the critical temperature $Tcr_{12}$ of the second auxiliary magnetic film. The second auxiliary magnetic film 24 functions as a reproducing layer.

With reference to FIGS. 44(*a*) to 44(*c*), the principle of reproduction from this magneto-optical layer structure will be explained. FIG. 44(*a*) conceptually illustrates main components of the magneto-optical recording medium shown in FIG. 42. It is assumed that the magnetization in the upward direction is recorded in a magnetic domain 22 of the magneto-optical recording film 10. The magneto-optical recording film 10 and the first auxiliary magnetic layer 28 make exchange coupling to one another. The same magnetization as that of the magnetic domain 22 is transferred to a magnetic domain 28*a* of the first auxiliary magnetic layer 28 disposed just under the magnetic domain 22. When the magneto-optical recording medium is irradiated with a reproducing light means, and the temperature begins to rise, then the transition occurs from the in-plane magnetization to the perpendicular magnetization in an area of the second auxiliary magnetic film 24 in which its temperature exceeds the critical temperature $Tcr_{12}$. The area subjected to the transition corresponds to magnetic domains 24*a*, 24*b* shown in FIG. 44(*b*). During the transition, the magnetic domain 24*a* is aligned in the same direction of magnetization as that of the magnetic domain 22 as shown in FIG. 44(*b*) by the aid of the magnetostatic coupling force exerted by the magnetic domain 22 of the recording layer 10 disposed just thereover and the magnetic domain 28*a* of the first auxiliary magnetic film 28. FIG. 44(*b*) illustrates the temperature-rising process of the magneto-optical recording medium effected by the reproducing light beam, and it represents a state of magnetization in which the temperature T of the magneto-optical recording medium does not arrive at a maximum arrival temperature yet and the temperature is within a range of $Tcr_{12}<T<Tcr_{11}$. In this state, the recording layer 10, the first auxiliary magnetic layer 28, and the second auxiliary magnetic layer 24 are magnetically coupled (magnetostatically coupled) to one another, and any of them exhibits the perpendicular magnetization. Minute magnetic domains 24*b*, which have the magnetization in the downward direction by the aid of the magnetostatic coupling force exerted by the both magnetic domains adjacent to the magnetic domain 22 and the magnetic domains in the downward direction in the first auxiliary magnetic film 28 disposed just thereunder, are present on both adjoining sides of the magnetic domain 24*a*.

When the temperature of the medium is further raised to arrive at the heating maximum temperature, if the temperature of the high temperature area of the first auxiliary magnetic layer 28 exceeds the critical temperature $Tcr_{11}$, then the coercive force of the first auxiliary magnetic layer 28 is lowered, and thus the first auxiliary magnetic layer 28 in the high temperature area causes transition from the perpendicular magnetization to the in-plane magnetization. As a result, a magnetic domain 28*a*' is formed as shown in FIG. 44(*c*).

FIG. 45 shows a relationship between the temperature distribution and the state of magnetization of the medium shown in FIG. 44(*c*). In the case of this magneto-optical recording medium, there is given $Tcr_{12}<Tcr_{11}$ as described above. Accordingly, as shown in FIG. 45, the area, in which the temperature exceeds $Tcr_{12}$ in the temperature distribution of the medium, is wider than the area in which the temperature exceeds $Tcr_{11}$. The transition occurs from the in-plane magnetization to the perpendicular magnetization in the area in which the temperature exceeds $Tcr_{12}$ in the second auxiliary magnetic layer 24. The transition occurs from the perpendicular magnetization to the in-plane magnetization in the area in which the temperature exceeds $Tcr_{11}$ in the first auxiliary magnetic layer 24. Therefore, the magnetic domain 24*a*' having the perpendicular magnetization in the second auxiliary magnetic layer 24 is larger than the magnetic domain 28*a* ' having the in-plane magnetization in the first auxiliary magnetic layer 24. The reproducing light power and $Tcr_{12}$ are adjusted so that the area, in which the temperature exceeds $Tcr_{12}$ in the second auxiliary magnetic layer 24 upon irradiation with the reproducing light beam, is larger than the magnetic domain in the recording layer 10.

On the other hand, the magnetic domain 28*a*' in the first auxiliary magnetic layer 28 has the in-plane magnetization. Therefore, the magnetic influence can be intercepted, which would be otherwise exerted from the magneto-optical recording film 10 to the second auxiliary magnetic film 24, due to, for example, the leakage magnetic field and the static magnetic field caused by the magnetization in the direction ↓ existing on both adjoining sides of the magnetic domain 22. Accordingly, it is possible to facilitate the magnification of the magnetic domain 24*a*'. The magnification of the magnetic domain increases the reproduced signal. It is considered that C/N is improved owing to the function of the first auxiliary magnetic film 24 to cause magnetic interception. In order to more effectively use the magnetically intercepting function of the first auxiliary magnetic film 28, it is preferable that the critical temperature $Tc_{11}$ of the first auxiliary magnetic film 28 and the reproducing light power are selected so that the area, in which the temperature exceeds $Tcr_{11}$ in the first auxiliary magnetic layer 28 during reproduction, is larger than the recording magnetic domain 11. In order to obtain a sufficiently large reproduced signal by the aid of the magnetic domain magnification in the second auxiliary magnetic layer 24, it is preferable that the critical temperature $Tc_{12}$ of the second auxiliary magnetic film 24 and the reproducing light power are selected so that the area, in which the temperature exceeds $Tcr_{12}$ in the second auxiliary magnetic layer 24 during reproduction, is larger than the recording magnetic domain 11. In order to simultaneously satisfy the facilitating effect for magnifying the magnetic domain and the magnetically intercepting function of the first auxiliary magnetic film 28, it is desirable to appropriately control the relationship ($\Delta T\ Tcr_{11}-Tcr_{12}$) between the critical temperature $Tcr_{11}$ of the first auxiliary magnetic film 28 and the critical temperature $Tcr_{12}$ of the second auxiliary magnetic film 24.

The effect of the magnification of the magnetic domain of the second auxiliary magnetic film 24, i.e., the reproduced signal intensity is maximized when the transferred magnetic domain in the second auxiliary magnetic film 24 is magnified to be not less than the reproducing light spot diameter. In this state, an extremely large reproduction output, which is determined by only the performance index of the second auxiliary magnetic film 24 and the reproducing light beam, is obtained regardless of the size and the shape of the magnetic domain recorded in the magneto-optical recording film 10. After the reproduction, i.e., after the unit for radiating the reproducing light beam is moved, the readout portion is cooled to be not more than $Tcr_{12}$, and the second auxiliary magnetic film is in the in-plane state of magnetization to return to the state shown in FIG. 44(*a*). The coercive force of the magneto-optical recording film 10 is sufficiently large even at the temperature during the reproducing operation as described above. Therefore, the information recorded as magnetization is completely retained.

It is desirable for the foregoing magneto-optical layer structure that, as shown in FIG. 43, a relationship of room temperature$<Tcr_{12}<Tcr_{11}<Tco$, $Tc_1$, $Tc_2$ should hold concerning a Curie temperature Tco of the magneto-optical recording film, a Curie temperature $Tc_1$ and the critical temperature $Tcr_{11}$ of the first auxiliary magnetic film, and a Curie temperature $Tc_2$ and the critical temperature $Tcr_{12}$ of the second auxiliary magnetic film.

With reference to FIGS. 49 to 53, the principle of the MAMMOS will be explained below. FIG. 49A illustratively shows a concept for recording information as minute magnetic domains on a magneto-optical recording medium 11 suitable for the MAMMOS by applying a recording magnetic field 15 to the medium 11 while irradiating the medium 11 with a recording laser beam 13. The magneto-optical recording medium 11 comprises a magnetic domain-magnifying and reproducing layer 3, an intermediate layer 4, a gate layer 16, an exchange coupling force control layer 17, and an information-recording layer 18. Information can be recorded on the magneto-optical recording medium 11 based on the use of the optical magnetic field modulation system, wherein the magneto-optical recording medium 11 is irradiated with a laser pulse synchronized with a recording clock while applying a magnetic field having a polarity corresponding to a recording signal. The magneto-optical recording medium 11 is moved in a traveling direction indicated by an arrow in FIG. 49A with respect to a recording laser beam 13. Therefore, an area 19, which is deviated backward from the spot center, is heated to a higher temperature. The coercivity of the area 19 in the information-recording layer 18 is lowered due to the heating. Accordingly, a minute magnetic domain, which has a direction of magnetization directed in the direction of the recording magnetic field 15, is formed during its cooling process. It is assumed in the description of the principle that the magneto-optical recording medium is subjected to recording and reproduction by using, for example, a magneto-optical recording and reproducing apparatus 200 conceptually illustrated in FIG. 50. With reference to FIG. 50, the magneto-optical recording medium 210 is rotationally movable with respect to an optical head 213 and a flying magnetic head 215 by the aid of a spindle motor 217, and an initializing magnetic field is applied to the magneto-optical recording medium 210 by the aid of an initializing magnet 211 upon reproduction.

As shown in FIG. 49B, the initializing magnetic field 12 is applied to the magneto-optical recording medium 11, in a direction opposite to the direction of the recording magnetic field 15. The coercivity of the gate layer 16 at room temperature is smaller than the initializing magnetic force. Therefore, the magnetic domains subjected to recording in the gate layer 16 are inverted, and all of them are directed in the direction of the initializing magnetic field 12. On the contrary, the coercivity of the information-recording layer 18 is extremely larger than the coercivity of the gate layer 16. Therefore, magnetization of a recording magnetic domain 313*b* in the information-recording layer 18 remains as it is. Magnetization of the gate layer 16 is antiparallel to that of the magnetic domain 313*b* in the information-recording layer 18. Therefore, an interface therebetween is in an unstable state of magnetization.

After the gate layer 16 is initialized as described above, the magneto-optical recording medium 11 is subjected to reproduction under a reproducing light beam as shown in FIG. 51. During reproduction, the magneto-optical recording medium is irradiated with the reproducing light beam having a power lower than that of the recording light beam. An area 314, which is deviated backward from the spot center, is heated to a higher temperature in the same manner as heated by the recording light beam. The coercivity of the gate layer 16, which corresponds to the area 314 heated to the higher temperature, is lowered. The magnetic domain 313*b* in the information-recording layer 18 is transferred to the gate layer 16 via the exchange force control layer 17 by the aid of the exchange coupling force between the information-recording layer 18 and the gate layer 16, and it is further transferred to the magnetic domain-magnifying and reproducing layer 3. On the other hand, another recording magnetic domain 313*a* in the information-recording layer 18 is not transferred to the gate layer 16, because an area in the gate layer 16 corresponding to the magnetic domain 313*a* has a relatively low temperature, and its coercivity is not lowered. Therefore, as shown in a lower part of FIG. 51, when the magneto-optical recording medium 11 is enlarged and viewed from an upward position , only an area 315, which has arrived at a high temperature in the laser spot 311, undergoes decrease in magnetic energy.

Accordingly, the recording magnetic domain 313*b* in the information-recording layer 18 appears as a recording mark 316 on the gate layer 16, and it appears on the magnetic domain-magnifying and reproducing layer 3. On the other hand, the other magnetic domains 313 are prevented from transfer by the gate layer 16, in areas other than the area 315 in the spot 311. Therefore, the recording magnetic domain 313*a* in the information-recording layer 18 remains latent. Accordingly, it is possible to independently reproduce only one minute magnetic domain of a plurality of minute magnetic domains existing within the spot size, by irradiating the magneto-optical recording medium with the reproducing light beam in accordance with the principle as shown in FIG. 51.

According to the MAMMOS, one minute magnetic domain, which is focused by using the gate layer 16 as described above, can be transferred to the magnetic domain-magnifying and reproducing layer 3, and it can be magnified within the reproducing laser spot. This process is performed in the magnetic domain-magnifying and reproducing layer 3 of the magneto-optical recording medium 11. This principle will be explained with reference to FIG. 52A. It is noted that the magnetic domain-magnifying and reproducing layer 3 is a magnetic layer to which a minute magnetic domain is transferred from the gate layer 16, and on which the transferred magnetic domain can be magnified by the aid of the reproducing magnetic field. The magnetic domain-magnifying and reproducing layer 3 is a perpendicularly magnetizable film having a magnetic force resistance of the magnetic wall which is smaller than the force of the reproducing magnetic field upon being irradiated with the reproducing light beam so that the magnetic wall is moved by application of the reproducing magnetic field to magnify the magnetic domain. When a magnifying reproducing magnetic field 411 is applied in a direction identical with that of magnetization of the minute magnetic domain 313*b* in the reproducing state shown in FIG. 51, i.e., in the state in which the minute magnetic domain 313*b* is transferred from the information-recording layer 18 to the gate layer 16 and the magnetic domain-magnifying and reproducing layer 3, then the magnetic wall is moved in a direction to magnify the magnetic domain, because the magnetic force resistance of the magnetic wall is small in the magnetic domain-magnifying and reproducing layer 3. Thus, a magnified magnetic domain 419 is formed. As a result, as shown in a lower part of FIG. 52A, it is possible to observe a magnified mark 413 (the magnetic domain 419 magnified in the magnetic domain-magnifying and reproducing layer) magnified within the reproducing spot 311. As described above, the minute magnetic domain which has been magnified appears on the surface of the magneto-optical recording medium. Therefore, a reproduced signal having a sufficient intensity can be obtained from the magnified magnetic domain.

After the magnified magnetic domain 419 in the information-recording layer 18 is subjected to reproduction, a reducing reproducing magnetic field 415 is applied in a direction opposite to that of the magnifying reproducing magnetic field 411 as shown in FIG. 52B. Accordingly, the magnified magnetic domain 419 in the magnetic domain-magnifying and reproducing layer 3 is reduced. As a result, areas having a direction of magnetization identical with the direction of the magnetic field of the reducing reproducing magnetic field 415 are predominant. The reducing reproducing magnetic field 415 and the magnifying reproducing magnetic field 411 can be applied by using an alternating magnetic field. A reproduced signal with amplification for each of the minute magnetic domains can be obtained by synchronizing the period of the alternating magnetic field with a recording clock.

Now, explanation will be made with reference to a hysteresis curve shown in FIG. 53 for the relationship among the magnitude of the magnifying reproducing magnetic field applied during reproduction, the applied magnetic field, and the size of the mark appearing on the magnetic domain-magnifying and reproducing layer 3. The hysteresis curve shown in FIG. 53 illustrates the change in Kerr rotation angle $\theta_K$ of the magnetic domain-magnifying and reproducing layer 3 with respect to the magnetic field H. The Kerr rotation angle $\theta_K$ is observed when various magnetic fields H are applied to the magneto-optical recording medium while irradiating the magneto-optical recording medium with a reproducing light beam having the same power as that used during reproduction. It is noted that the hysteresis curve shows a hysteresis curve of the magnetic domain-magnifying and reproducing layer of the magneto-optical recording medium having the structure shown in FIGS. 51 and 52, to which the recording magnetic domain in the underlying information-recording layer is transferred by being irradiated with the reproducing light beam. A predetermined Kerr rotation angle θ is provided (point a in the figure/s) even when the magnetic field H is zero, because the magnetic domain in the information-recording layer has been transferred. When the magnetic field H having a polarity identical with the polarity of magnetization of the recording magnetic domain is gradually applied, the initial magnetization curve rises. The point b represents an initial rising point. The rise of the initial magnetization curve corresponds to magnification of the magnetic domain in the layer (the magnetic domain 419 in FIG. 52A) as a result of movement of the magnetic wall of the magnetic domain-magnifying and reproducing layer 3 from the center of the magnetic domain toward the outside depending on the magnitude of the magnetic field H. In the initial magnetization curve, no more increase in Kerr rotation angle occurs when magnetization is saturated. Conceptual photomicrographs of magnetic domain patterns are shown, in which the magnetic domain-magnifying and reproducing layer 3 is viewed from an upward position, at respective points including the points a and b on the initial magnetization curve of the hysteresis curve. The magnetic domain pattern (black circle pattern) at the point a concerns magnetic domains obtained when magnetic domains (seed magnetic domains) in the information-recording layer 18 are transferred via the gate layer 16 to the magnetic domain-magnifying and reproducing layer 3 by the aid of irradiation with the reproducing light beam. The patterns at the respective points comprehensively suggest the situation in which the magnetic domains are magnified in accordance with the increase of the magnetic field on the initial magnetization curve starting from the state represented by the point a. When the Kerr rotation angle θ is saturated, the magnetic domains are inverted on the entire surface of the magnetic domain-magnifying and reproducing layer 3.

In the hysteresis curve shown in FIG. 53, the magnetic field at the rising point c of the major loop of the hysteresis curve (outer loop which represents a locus after the initial magnetization curves is once saturated), which has the same polarity as that of the magnetic field applied in the direction to magnify the magnetization of the magnetic domain-magnifying and reproducing layer, is referred to as "nucleation magnetic field". The absolute value thereof is represented by Hn. The magnetic field at the initial rising point b of the initial magnetization curve, which is obtained by applying the magnetic field in the direction to expand the recording magnetic domain in the magnetic domain-magnifying and reproducing layer 3 transferred from the information-recording layer 5 via the gate layer 16, is referred to as "magnetic wall-magnifying magnetic field". The absolute value thereof is represented by He. Assuming that the reproducing magnetic field has its absolute value Hr, it is desirable to apply the reproducing magnetic field within a range of He<Hr<Hn because of the following reason. Namely, if Hr is smaller than He, the recording magnetic domain transferred to the magnetic domain-magnifying and reproducing layer 3 is not magnified. If Hr is larger than Hn, even when no recording magnetic domain (seed magnetic domain) exists in the information-recording layer 18, then the magnetic domain in the magnetic domain-magnifying and reproducing layer 3 disposed thereover is inverted, and it is read as a signal.

FIG. 54 shows an initial magnetization curve obtained when the magnetic field is applied in a direction to reduce the recording magnetic domain in the magnetic domain-magnifying and reproducing layer 3 transferred via the gate layer 16 from the information-recording layer 18, in the hysteresis curve shown in FIG. 53. The magnetic field at the initial dropping point c' of the major loop (outer loop which represents a locus after the initial magnetization curve is once saturated) of the hysteresis curve, which is located on the side of the same polarity as that of the initial magnetization curve, is referred to as "nucleation magnetic field". The absolute value thereof is represented by Hn. The magnetic field at the dropping point d on the initial magnetization curve is referred to as "magnetic wall-reducing magnetic field". The absolute value thereof is represented by Hs. When the magnetic field is applied within a range of Hs<Hr, the magnetic field having been subjected to magnification and reproduction can be reduced. In FIG. 54, conceptual photomicrographs of magnetic domain patterns are also shown, in which the magnetic domain-magnifying and reproducing layer is viewed from an upward position, at respective points including the points a and d on the initial magnetization curve of the hysteresis curve. Since the magnetic field in the reducing direction is too large at the point e, the recording magnetization transferred to the magnetic domain-magnifying and reproducing layer completely disappears. Therefore, when it is intended to reliably erase the recording magnetization, it is appropriate to adjust the magnetic field to satisfy Hs<Hn<Hr. The hysteresis curves depicted in FIGS. 53 and 54 and hysteresis curves referred to herein are hysteresis curves obtained under the condition in which magneto-optical reproduction is performed in accordance with the reproducing method for the MAMMOS, and they represent characteristics of the Kerr rotation angle (or magnetization) with respect to various magnetic fields, obtained when the reproducing light beam is radiated and the temperature is raised by actually using the recording and reproducing apparatus for the magneto-optical recording medium. Therefore, the hysteresis curves, Hs, Hn, and Hr to be applied are observed by using a practical magneto-optical recording and reproducing apparatus while radiating the reproducing light beam having the power for reproduction.

According to the MAMMSO, owing to the provision of the gate layer as described above, only one magnetic domain is allowed to emerge on the gate layer 16, or it can be transferred to the gate layer 16 even when a plurality of magnetic domains exist in the information-recording layer. Further, the one minute magnetic domain having been transferred to the gate layer 16 can be transferred to the magnetic domain-magnifying and reproducing layer 3, and it can be magnified and detected (reproduced) by using the reproducing magnetic field. Therefore, the minute magnetic domain formed in accordance with the optical magnetic field modulation system can be subjected to reproduction at a high resolving power and at high S/N.

The principle of the MAMMOS has been explained by illustrating the gate layer as the magnetic layer which undergoes temperature distribution of the gate layer generated in the reproducing light beam spot, in which the magnetic domain in the information-recording layer is transferred to the gate layer in a high temperature area having a temperature higher than a predetermined temperature. However, it is possible to use a magnetic layer which undergoes the temperature distribution in the gate layer generated in the reproducing light beam spot, in which the magnetic domain in the information-recording layer is transferred to the gate layer in a low temperature area having a temperature lower than a predetermined temperature. Alternatively, it is possible to use a magnetic layer which undergoes the temperature distribution in the gate layer generated in the reproducing light beam spot, in which the magnetic domain in the information-recording layer is transferred to the gate layer in a predetermined temperature range. In the foregoing magneto-optical recording medium, the recording layer and the reproducing layer may be magnetostatically coupled to one another with a non-magnetic layer interposed between the recording layer and the reproducing layer so that transfer may be effected from the recording layer to the reproducing layer.

BRIEF DESCRIPTION OF THE DRAWINGS

FIG. 3(*a*) shows states of magnetization recorded on the two magnetic layers; FIG. 3(*b*) shows the relative signal outputs for the f our states reproduced with a reproducing light beam at $\lambda 1=443$ nm; FIG. 3(*c*) shows the relative signal outputs for the four states reproduced with a reproducing light beam at $\lambda 2=780$ nm.

FIG. 6(*a*) shows states of magnetization recorded on the two magnetic layers; FIG. 6(*b*) shows the relative signal outputs for the four states reproduced with a reproducing light beam at λ1=443 nm; FIG. 6(*c*) shows the relative signal outputs for the four states reproduced with a reproducing light beam at λ2=780 nm.

FIG. 8(*a*) shows two-valued signal series to be recorded; FIG. 8(*b*) shows a combined signal thereof; FIG. 8(*c*) shows a process for synthesizing a modulated signal to be inputted into a magnetic coil from the combined signal shown in FIG. 8(*b*); FIG. 8(*d*) shows external magnetic fields to be applied to a magneto-optical disk; FIG. 8(*e*) shows a light pulse train radiated under the external magnetic fields shown in FIG. 8(*d*); FIG. 8(*f*) shows a magnetic domain train formed by recording.

FIG. 10(*a*) shows a domain train of recording marks having been recorded; FIG. 10(*b*) shows states of magnetization and two-valued information on the first and second magnetic layers before the rewriting on the second magnetic layer; FIG. 10(*c*) shows recording signals used for the rewriting; FIG. 10(*d*) shows modulated magnetic fields to be applied on the magnetic field modulation system; FIG. 10(*e*) shows states of magnetization and two-valued information on the first and second magnetic layers after the rewriting.

FIG. 13(*a*) shows states of magnetization recorded on the two magnetic layers; FIG. 13(*b*) shows the relative signal outputs for the four states reproduced with a reproducing light beam at λ1=443 nm; FIG. 13(*c*) shows the relative signal outputs for the four states reproduced with a reproducing light beam at λ2=780 nm.

FIG. 14(*a*) shows two-valued information recorded on the two magnetic layers; FIG. 14(*b*) shows recording domains; FIG. 14(*c*) shows states of magnetization and two-valued information recorded on the two magnetic layers; FIG. 14(*d*) shows a signal reproduced with a reproducing light beam at λ2=780 nm; FIG. 14(*e*) shows a signal reproduced with a reproducing light beam at λ1=443 nm; FIG. 14(*f*) shows the two-valued signal obtained by slicing the signal of FIG. 14(*d*) at S1; FIG. 14(*g*) shows the two-valued signal obtained by slicing the signal of FIG. 14(*d*) at S2; FIG. 14(*h*) shows the two-valued signal obtained by slicing the signal of FIG. 14(*e*) at S3; FIG. 14(*i*) shows the two-valued signal obtained by calculation in accordance with (g)–(h)+(f).

FIG. 15(*a*) shows two-valued information recorded on the two magnetic layers; FIG. 15(*b*) shows recording domains; FIG. 15(*c*) shows states of magnetization and two-valued information recorded on the two magnetic layers; FIG. 15(*d*) shows a signal reproduced with a reproducing light beam at $\lambda_2$=780 nm; FIG. 15(*e*) shows a signal reproduced with a reproducing light beam at $\lambda_1$=443 nm; FIG. 15(*f*) shows the two-valued signal obtained by slicing the signal of FIG. 15(*d*) at S1; FIG. 15(*g*) shows the two-valued signal obtained by inverting the signal of FIG. 15(*f*); FIG. 15(*h*) shows the two-valued signal obtained by slicing the signal of FIG. 15(*e*) at S2.

FIGS. 16(*a*) and (*b*) show the four-valued recording signal; FIG. 16(*c*) shows a recording domain train; FIG. 16(*d*) shows a reproduced signal.

FIG. 17(*a*) shows the signal level with respect to an external magnetic field concerning the magnetic layer (second recording layer) to which an auxiliary magnetic layer is added; FIG. 17(*b*) shows the signal level with respect to the external magnetic field concerning the first recording layer.

FIG. 40(*a*) shows the directions of magnetic domains of the recording and reproducing layers; FIG. 40(*b*) shows optically modulated reproducing light power.

FIG. 41(*a*) shows the sub-lattice magnetization of a reproducing layer below the compensation-temperature; FIG. 41(*b*) shows the sub-lattice magnetization of the reproducing layer above the compensation temperature.

FIG. 44(*a*) shows states of magnetization before irradiation with a reproducing light beam; FIG. 44(*b*) shows how the magnetization in the recording layer is transferred to the second auxiliary magnetic layer in the temperature-increasing process effected by irradiation with the reproducing light beam; FIG. 44(*c*) shows how a magnetic domain transferred to the second auxiliary magnetic layer has been magnified.

FIG. 49 (A) illustrates the principle of recording.

FIG. 52(A) shows how a magnifying and reproducing magnetic field magnifies the domain; FIG. 52(B) shows how a reducing and reproducing magnetic field reduces the domain.

FIG. 56 conceptually shows a method for reproducing the information in two recording layers respectively by using the MAMMOS with a high power reproducing beam PH and a low power reproducing beam PL without using the multi-wavelength magneto-optical reproducing method.

FIG. 59 is conceptual views showing the principle of another method for the MAMMOS reproduction of recorded four-valued information in two recording layers with reproducing light of single wavelength in Embodiment F.

FIG. 60(A) shows a case where information recorded on the first recording layer is reproduced with an external magnetic field applied at timing T1; FIG. 60(B) shows a case where information recorded on the second recording layer is reproduced with an external magnetic field applied at second timing T2.

FIG. 62 shows another method for distinguishing and reproducing, with power-modulated reproducing light, the information recorded on a plurality of recording layers in Embodiment I.

BEST MODE OF THE INVENTION

Magneto-optical recording media and reproducing methods therefor which embody the present invention will be described below with reference to the drawings.

Embodiment A1

(First Embodiment of Magneto-optical Recording Medium)

In this embodiment, a magneto-optical disk having two magnetic layers is produced. In this disk, four-valued recording of "0", "1", "2" and "3", and reproduction thereof are possible on the basis of the magnitude of a magnetic field applied in accordance with the magnetic field modulation system. At first, a transparent substrate made of polycarbonate having a guide groove and a preformat signal formed thereon was produced by installing a stamper to an injection molding machine, and injection-molding a polycarbonate material. Layers were stacked on the produced polycarbonate substrate by using a continuous sputtering apparatus provided with a plurality of sputtering film formation chambers. An argon gas or an argon/nitrogen mixed gas was used as an atmosphere gas for sputtering. The substrate was placed in a first film formation chamber, where, as a first dielectric layer, a film of SiN having a refractive index of 2.1 and a thickness of 100 nm was formed on the substrate by using SiN as a sputtering target, and using an $Ar/N_2$ mixed gas having a partial pressure of $N_2$ of 10% as a sputtering gas at a pressure of 0.3 Pa. Next, the substrate was transported to a second film formation chamber, where a first magnetic layer having a composition of $Tb_{22}Fe_{68}Co_{11}$ was formed as a film having a thickness of 15 nm under an Ar gas pressure of 0.3 Pa by using a TbFeCo alloy as a target. Next, the substrate was transferred to a third film formation chamber, where a second dielectric layer composed of SiN having a thickness of 10 nm was obtained on the magnetic layer by forming a film of SiN under the same sputtering condition as the first dielectric layer had been formed. Next, in a fourth film formation chamber, a second magnetic layer having a composition of $Tb_{31}Fe_{58}Co_{11}$ was formed as a film having a thickness of 35 nm under an Ar gas pressure of 0.3 Pa by using a TbFeCo alloy as a target again. The substrate was transported to a fifth film formation chamber, where an auxiliary magnetic layer composed of $Pt_{90}Co_{10}$ was formed as a film having a thickness of 50 nm by using a PtCo alloy as a sputtering target, and using an Ar gas as a sputtering gas at a pressure of 0.3 Pa. In a sixth film formation chamber, a third dielectric layer composed of SiN having a thickness of 100 nm was obtained on the magnetic layer by forming a film of SiN under the same sputtering condition as the first dielectric layer had been formed. The stacked polycarbonate substrate was taken out of the sputtering apparatus. A UV-curable protective resin was spin-coated on the top layer of the substrate to form a protective film.

Figure 49A:
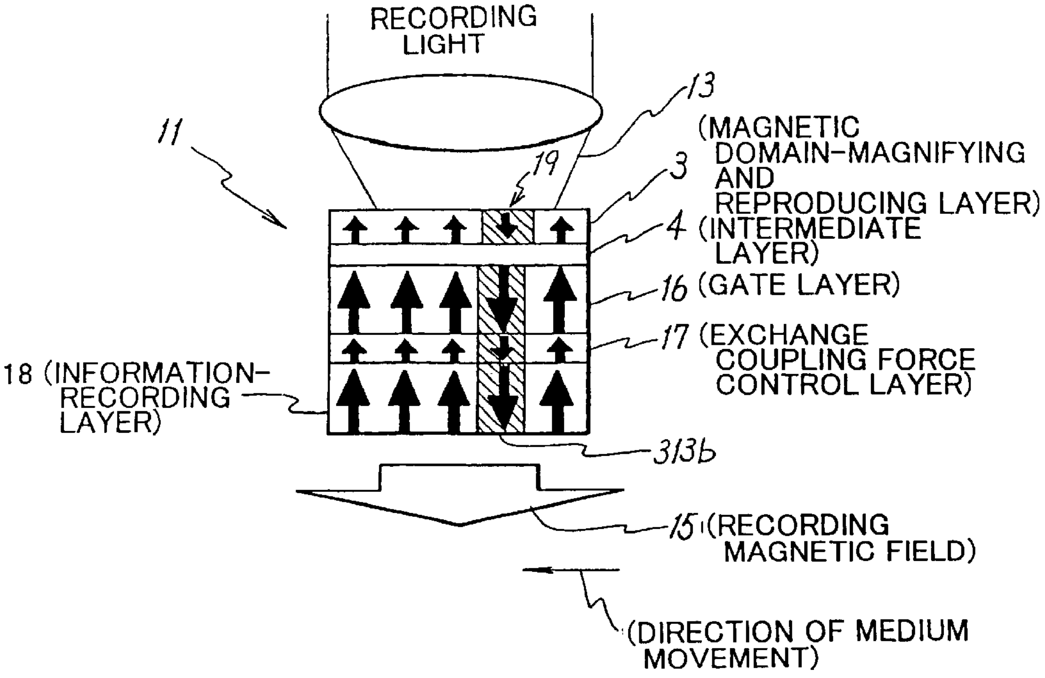
FIG. 49 is views showing the principle of reproduction of the MAMMOS.
FIG. 49(B) illustrates the principle of initialization of a magnifying and reproducing layer.
Figure 49B:
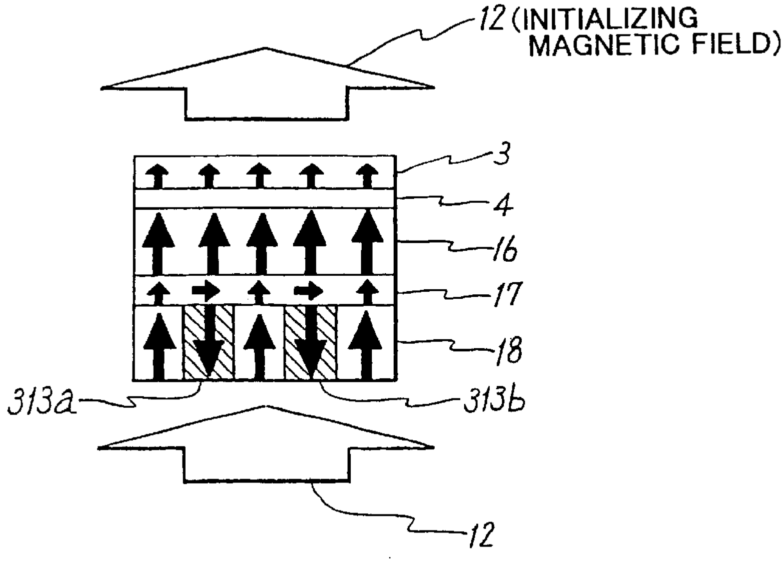
Figure 50:
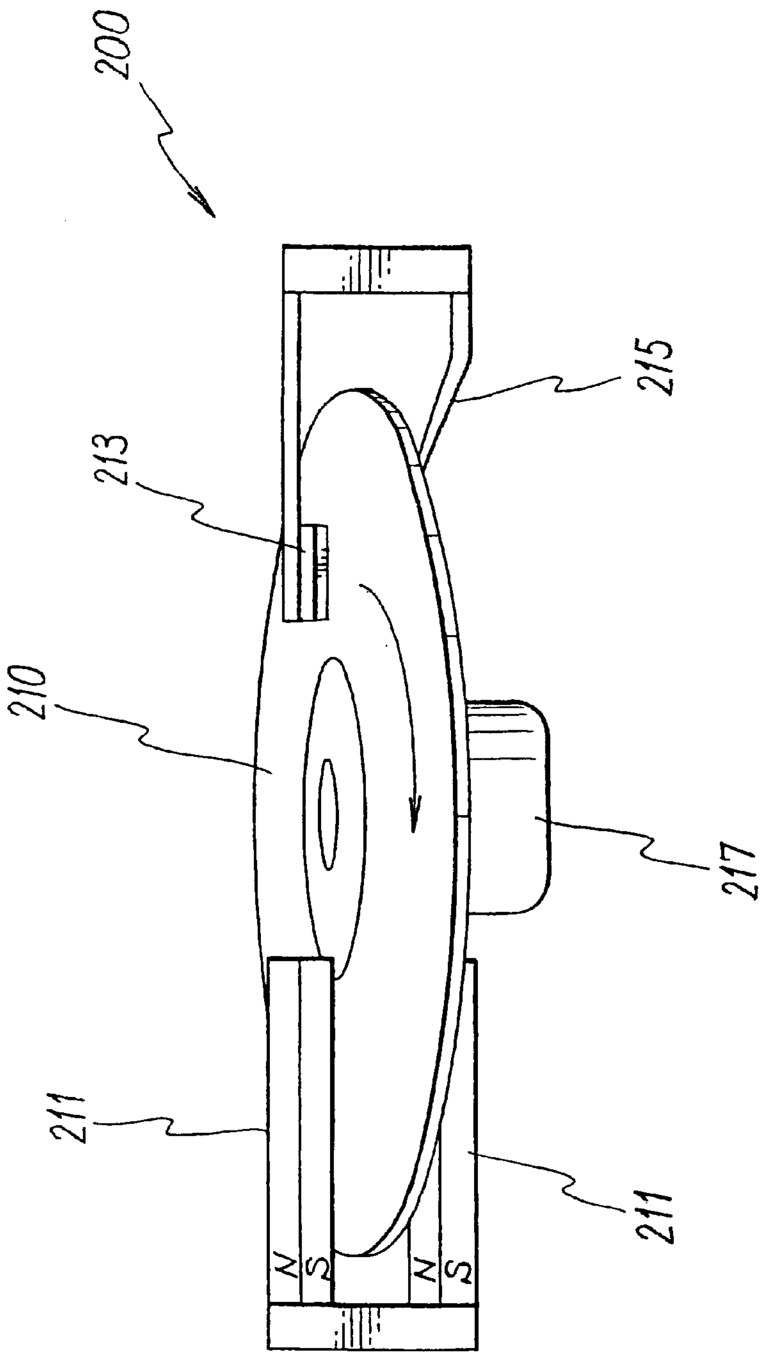
FIG. 50 is a schematic view of a recording and reproducing apparatus for recording and reproduction by means of the MAMMOS.
Figure 51:
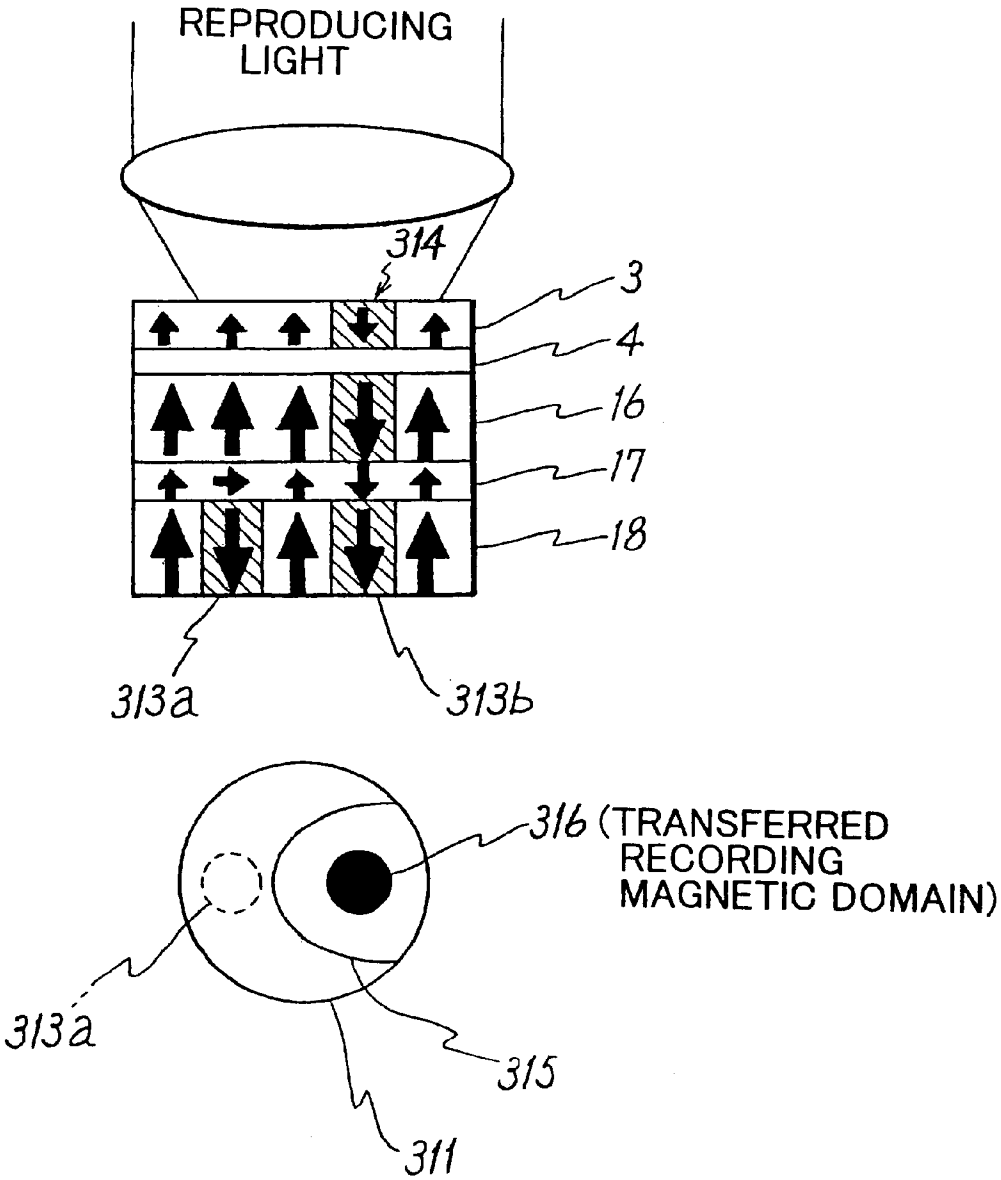
FIG. 51 is views showing the principle of magnetic transfer in which only one of the recording magnetic domains in an information recording layer existing within a reproducing light beam spot is selected through a gate layer during reproduction by means of the MAMMOS.
Figure 52:
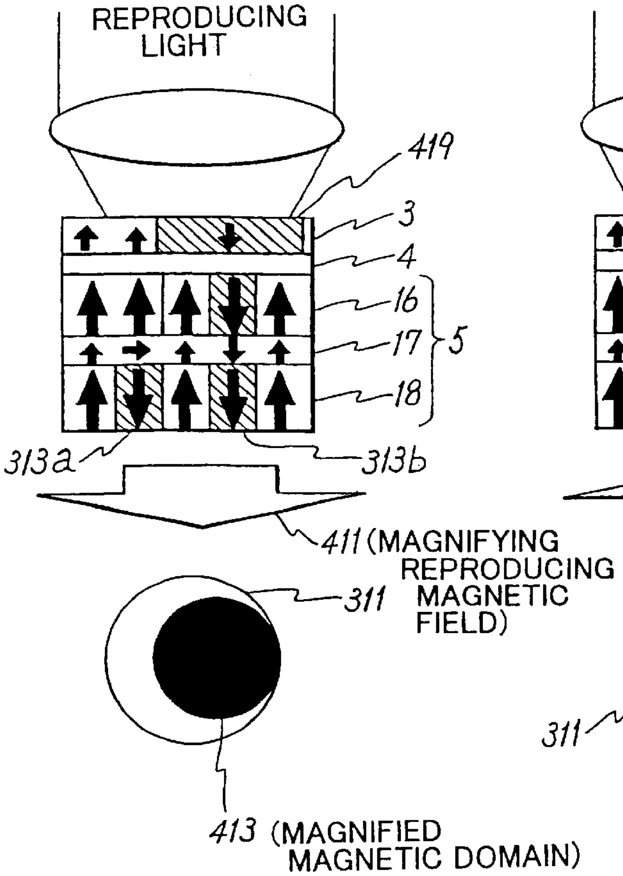
FIGS. 52 is views showing the principle of magnification and reproduction for a minute magnetic domain during reproduction by means of the MAMMOS.
Figure 52:
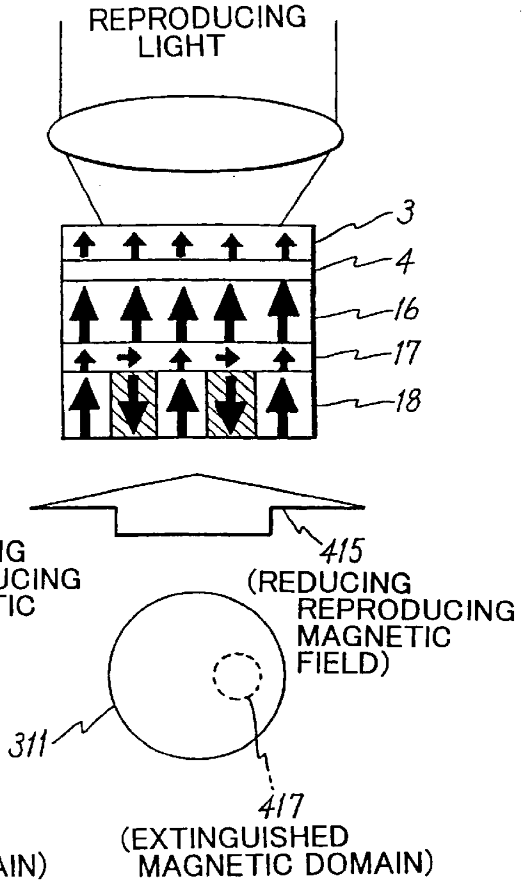
Figure 53:
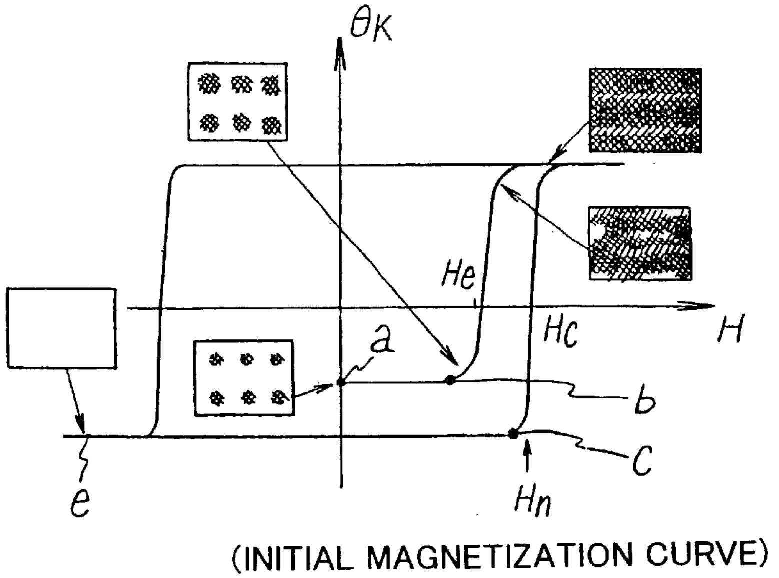
FIG. 53 is a graph illustrating hysteresis curves of the magnifying and reproducing layer of a magneto-optical recording medium suitable for the MAMMOS, and particularly showing an initial magnetization curve upon application of a magnifying magnetic field.
Figure 54:
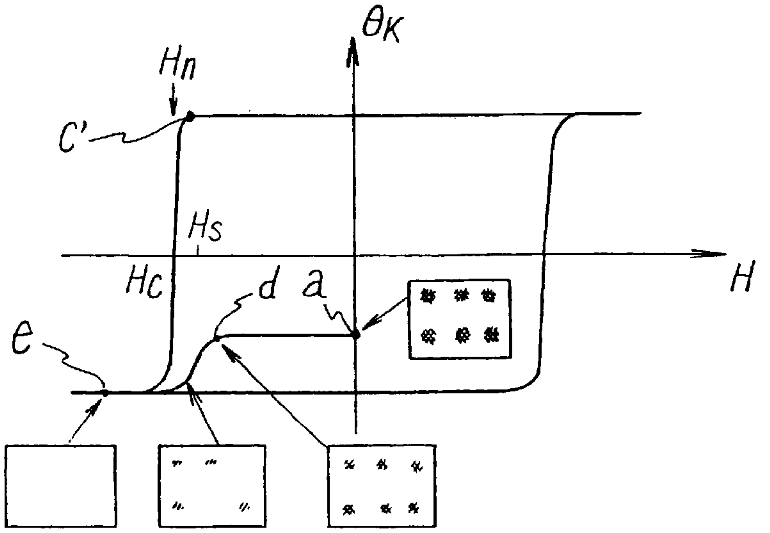
FIG. 54 is a graph illustrating hysteresis curves of the magnifying and reproducing layer of a magneto-optical recording medium suitable for the MAMMOS, and particularly showing an initial magnetization curve upon application of a reducing magnetic field.

As shown in FIG. 49, the magneto-optical disk thus obtained includes the polycarbonate substrate 1 on which the first dielectric layer 2 of SiN, the first magnetic layer 3 of $Tb_{22}Fe_{68}Co_{10}$, the second dielectric layer 4 of SiN, the second magnetic layer 5 of $Tb_{31}Fe_{58}Co_{11}$, the auxiliary magnetic layer 6 of $Pt_{90}Co_{10}$, the third dielectric layer 7 of SiN and the UV-curable protective resin 8 are stacked. FIG. 49 conceptually shows the optical paths of two laser beams having different wavelengths $\lambda_1$ and $\lambda_2$, which are radiated through a collective lens 10 during reproduction. The first magnetic layer 3 had a TM-rich composition with a Curie temperature Tc of 230° C. The second magnetic layer 5 had an RE-rich composition with a Curie temperature Tc of 220° C. Both of the second dielectric layer 4 and third dielectric layer 7 had a refractive index of 2.1, which was equal to that of the first dielectric layer 2.

Figure 1:
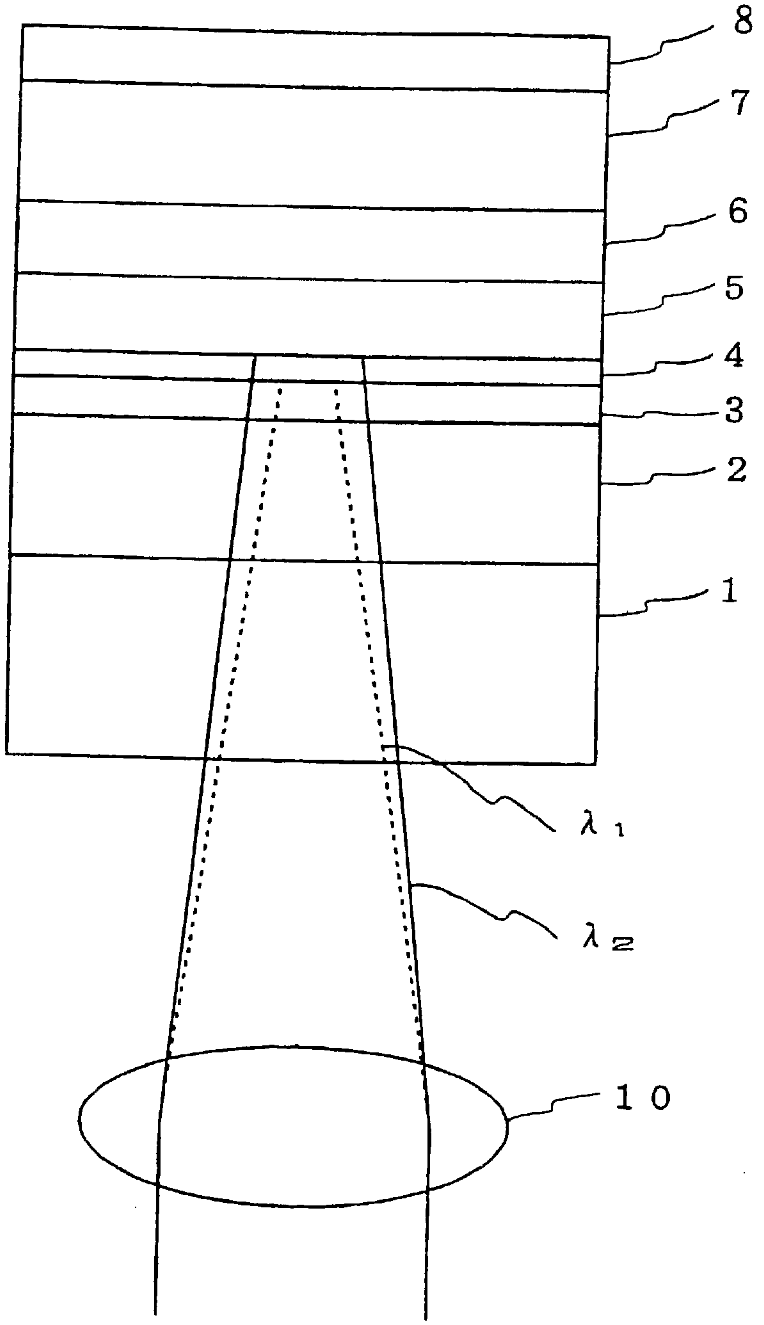
FIG. 1 is a schematic cross section of a magneto-optical disk produced in Embodiment A1, and shows how the disk is irradiated with two reproducing light beams having different wavelengths $\lambda_1$ and $\lambda_2$.

The magneto-optical disk described above conforms in structure to the magneto-optical recording medium disclosed by the inventors of this application in Japanese Patent Application Laid-Open No. 8-129,784. The structure of a magneto-optical recording medium of this type will be briefly described below with reference to FIG. 17 in relation to the principle of multi-valued recording and reproduction. The magneto-optical recording medium shown in FIG. 17, which basically has a structure equivalent to that of the magneto-optical recording medium shown in FIG. 1, has at least two or more magnetic layers 3, 5 stacked on a substrate 1. At least one of the magnetic layers is a magneto-optical recording film where recording states are present in two or more different magnetic field regions with respect to an external magnetic field applied to the recording medium. The other magnetic layer or each of the other magnetic layers is a magneto-optical recording film where at least one or more recording states are present in one or more magnetic field regions different from those for the aforementioned magnetic layer.

A second recording layer comprises the amorphous vertically magnetizable film 5, to which an auxiliary magnetic layer 6 provided adjacent thereto is added. The amorphous vertically magnetizable film 5 comprises an amorphous alloy of a rare earth metal-transition metal system in which the sub-lattice magnetic moment of rare earth metal is dominant in a temperature range from room temperature to Curie temperature, or in a temperature range from room temperature to a maximum achievable temperature upon recording or erasing.

Figures 17A, 17B:
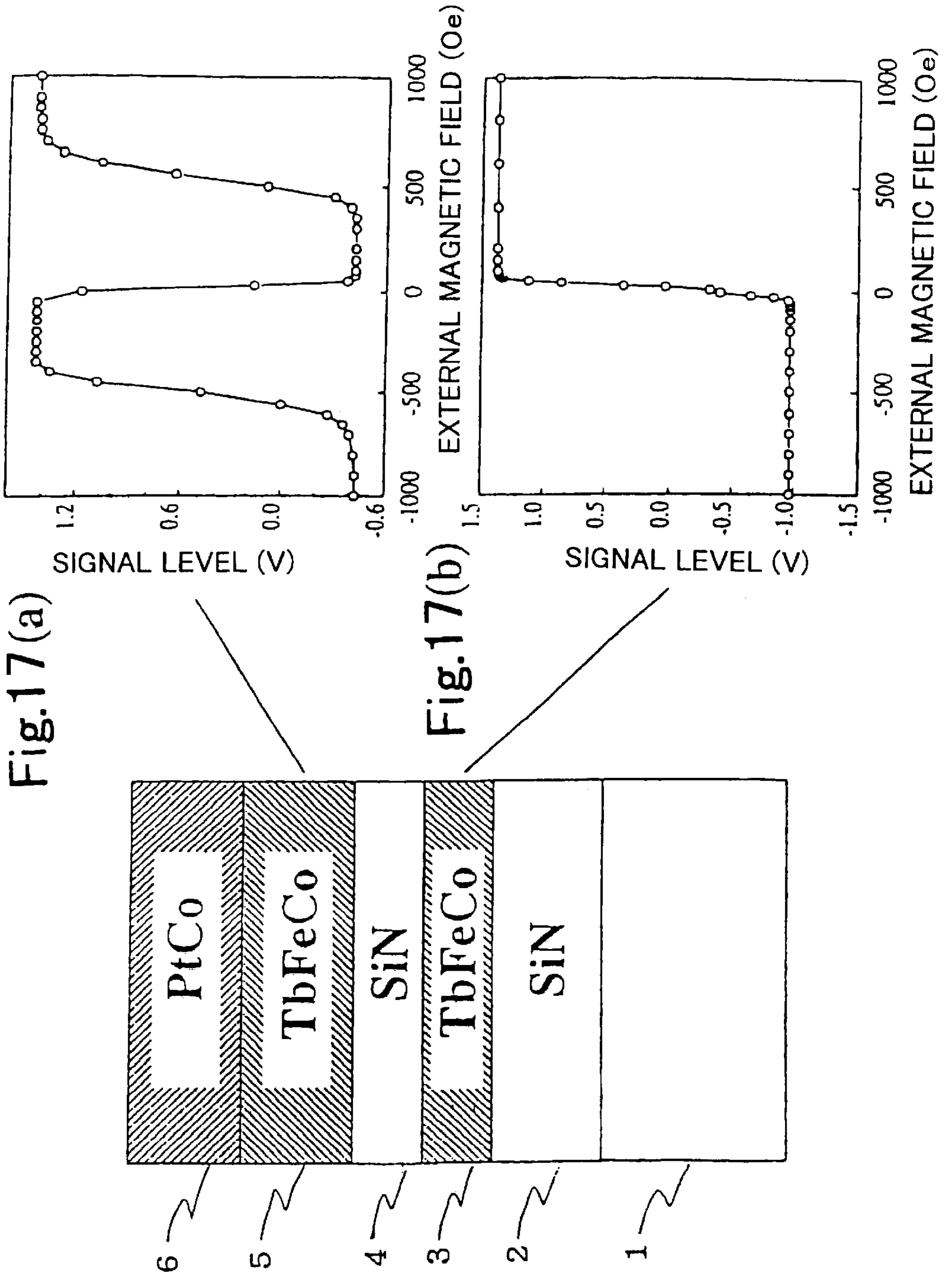
FIG. 17 shows magnetic characteristics of the recording layers of a magneto-optical recording medium, and the recording principle thereon.

As for the auxiliary magnetic layer 6, the vertical magnetic anisotropic energy may be equal to or lower than that of form anisotropy depending on its composition. In this case, the magnetization of the auxiliary magnetic layer 6 can be oriented to an in-plane direction (parallel to a film plane of the layer 6) before an external magnetic field is applied. If the auxiliary magnetic layer 6 thus adjusted is heated to a temperature near the Curie temperature, and if an external magnetic field is applied thereto, then the direction of magnetization is raised from the in-plane direction to generate a magnetic moment component in parallel with or along the external magnetic field, exerting an exchange coupling force on the magnetic moment of transition metal in the amorphous vertically magnetizable layer 5, which is stacked in contact with the auxiliary magnetic layer 6. Therefore, as shown in FIG. 17(*a*), the second recording layer, which is constructed by stacking the amorphous vertically magnetizable layer 5 and the auxiliary magnetic layer 6, has two peaks of change in recording signal level with respect to the external magnetic field.

The first recording layer 3 is a magneto-optical recording film where at least one or more recording states are present in one or more magnetic field regions different from those for the second recording layer (5, 6). Therefore, the first recording layer may be only one magnetic film where, as shown in FIG. 17(*b*), one recording state is present in a magnetic field region different from those for the second recording layer (5, 6). Alternatively, the first recording layer may consist of the same types of amorphous vertically magnetizable film and auxiliary magnetic film as the second recording layer (5, 6) does. In these films, two recording states are present in magnetic field regions different from those for the second recording layer (5, 6). By using a magneto-optical recording medium having recording magnetic field characteristic as described above, states of magnetization as shown in FIGS. 3(*a*) and 6(*a*) can be formed depending on an external magnetic field applied during recording on the basis of the recording method described in Embodiment A4.

From the magneto-optical disk obtained in this embodiment, it is possible to reproduce multi-valued information by a reproducing method described later on, by using two light beams having a wavelength $\lambda_1$ of 443 nm and a wavelength $\lambda_2$ of 780 nm. The use of the reproduction principle described in the explanation of the multi-wavelength magneto-optical reproducing method makes it possible to reproduce recorded four-valued information at a high S/N ratio by separating a reproduced signal into two-valued (binary) values concerning states "0" or "1" and "2" or "3" with the reproducing light beam of the wavelength $\lambda_1$, obtaining two two-valued signal series concerning "0" or "3" and "1" and "2" with the reproducing light beam of the wavelength $\lambda_2$, and then performing a logical operation for the two-valued signals.

Figure 7:
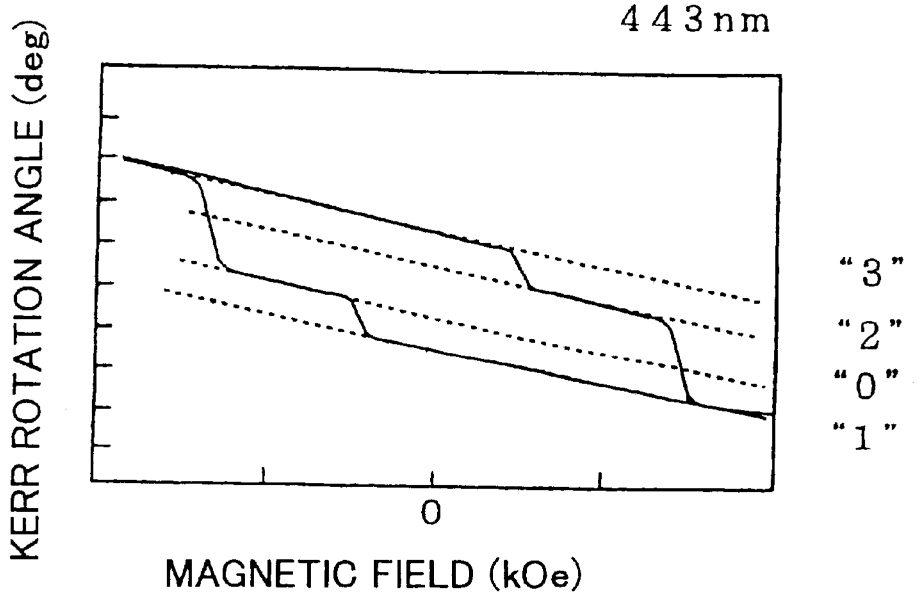
FIG. 7 is a graph showing the Kerr hysteresis which represents the relationship between the magnetic field applied to the magneto-optical disk of Embodiment A1 and the Kerr rotation angle detected with a measuring light beam at λ1=443 nm.

FIG. 7 shows a Kerr hysteresis curve which represents the change of the Kerr rotation angle with the strength of an external magnetic field applied to the recording film of this magneto-optical disk. In FIG. 7, the wavelength of a light beam used for the measurement is $\lambda_1$=443 nm. The Kerr rotation angles for the respective states of "0", "1", "2", "3" in the case of the external magnetic field being zero indicate apparent remaining Kerr rotation angles. Signals corresponding to the remaining Kerr rotation angles are obtained upon reproduction. The curve which represents the magnitude of the Kerr rotation angle in each state of magnetization with respect to the reproducing wavelength in FIG. 2 used to explain the principle of the reproducing method, is depicted by preparing Kerr hysteresis curves as shown in FIG. 7 with reproducing light beams having various wavelengths, and using obtained data therefrom.

Embodiment A2

(Second Embodiment of Magneto-optical Recording Medium)

Figure 4:
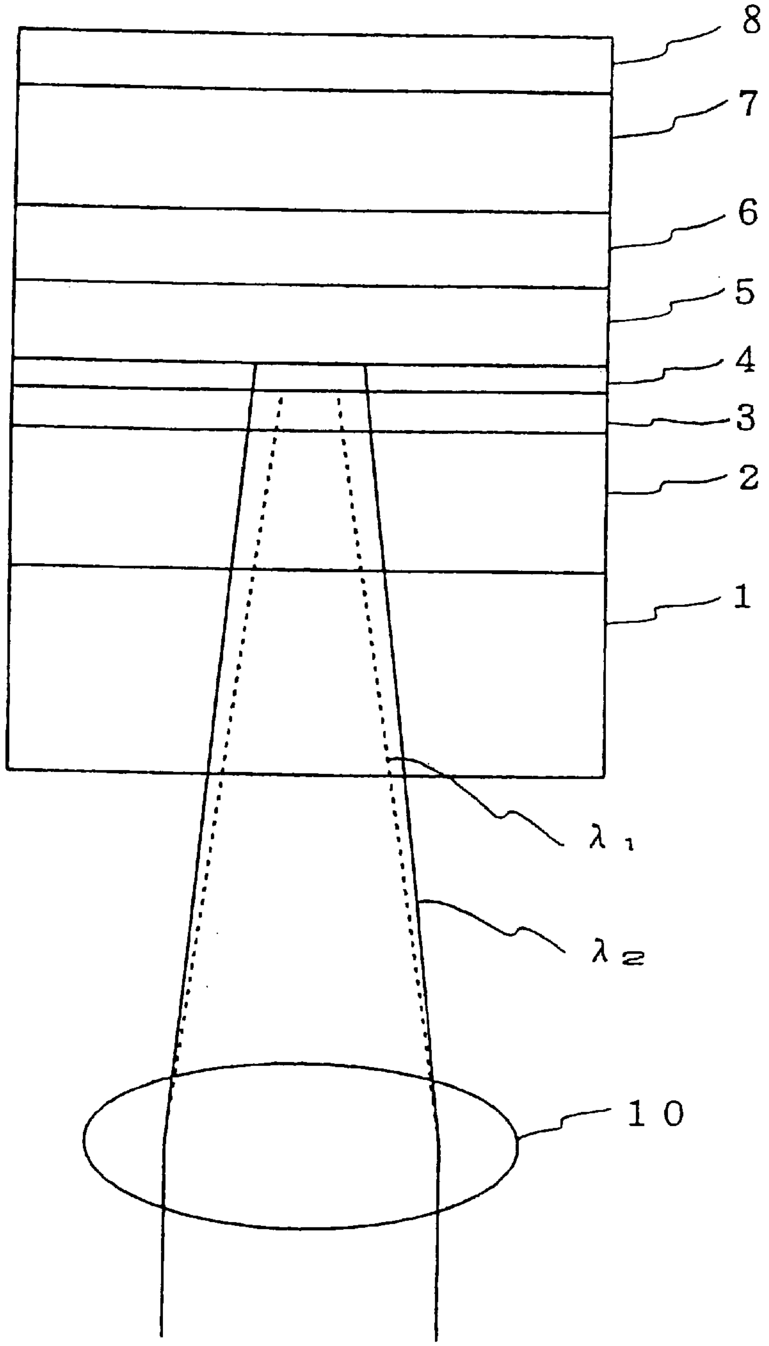
FIG. 4 is a schematic cross section of a magneto-optical disk produced in Embodiment A2, and shows how the disk is irradiated with two reproducing light beams having different wavelengths $\lambda 1$ and $\lambda 2$.

In this embodiment, a magneto-optical disk was produced in the same manner as in Embodiment A1 except that the state of multiple interference was adjusted with the first dielectric layer of SiN having a thickness of 60 nm, the first magnetic layer of $Tb_{22}Fe_{68}Co_{10}$ having a thickness of 7 nm, the second dielectric layer of SiN having a thickness of 7 nm, and the second magnetic layer of $Tb_{31}Fe_{58}Co_{11}$ having a thickness of 40 nm. The refractive index of SiN was controlled to be 2.25 by allowing $N_2$ in the Ar/$N_2$ mixed gas to have a partial pressure of 5% during sputtering for the SiN layer. FIG. 4 shows the obtained magneto-optical disk in cross section.

It is possible to reproduce information independently from each magnetic layer of this magneto-optical disk with two light beams having different wavelengths by the reproducing method described later on (Embodiment A5). The use of there production principle described in the explanation of the multi-wavelength magneto-optical reproducing method makes it possible to independently reproduce a two-valued state of magnetization of the first magnetic layer with a reproducing light beam having a wavelength $\lambda_1$ of 443 nm and a two-valued state of magnetization of the second magnetic layer with a reproducing light beam having a wavelength $\lambda_2$ of 780 nm.

Embodiment A3

(Third Embodiment of Magneto-optical Recording Medium)

Figure 13A:
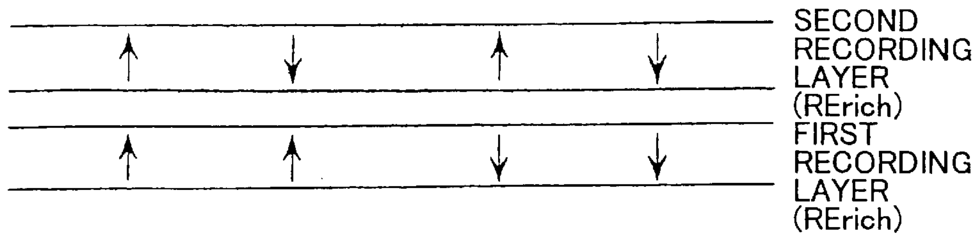
FIG. 13 is graphs showing the relative signal outputs concerning the four states determined by combinations of states of magnetization of the two magnetic layers of the magneto-optical disk of Embodiment A3.
Figure 13B:
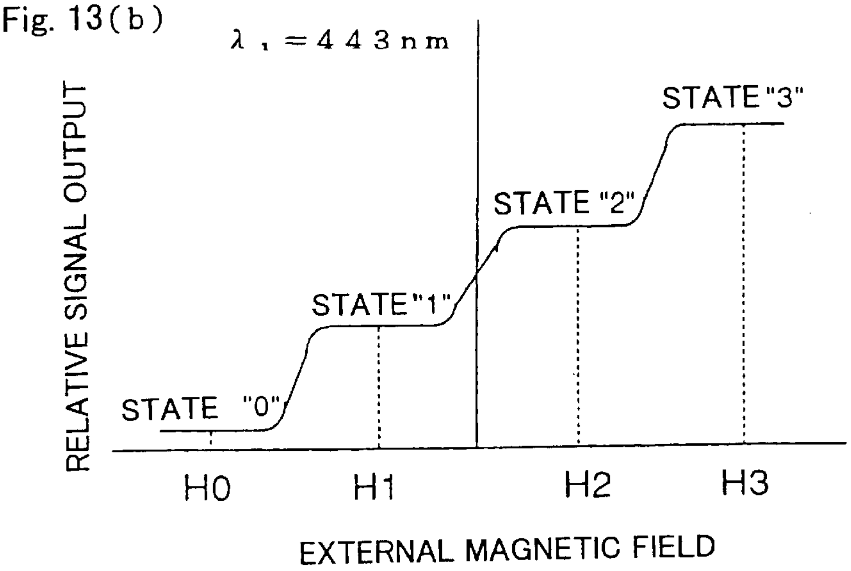
Figure 13C:
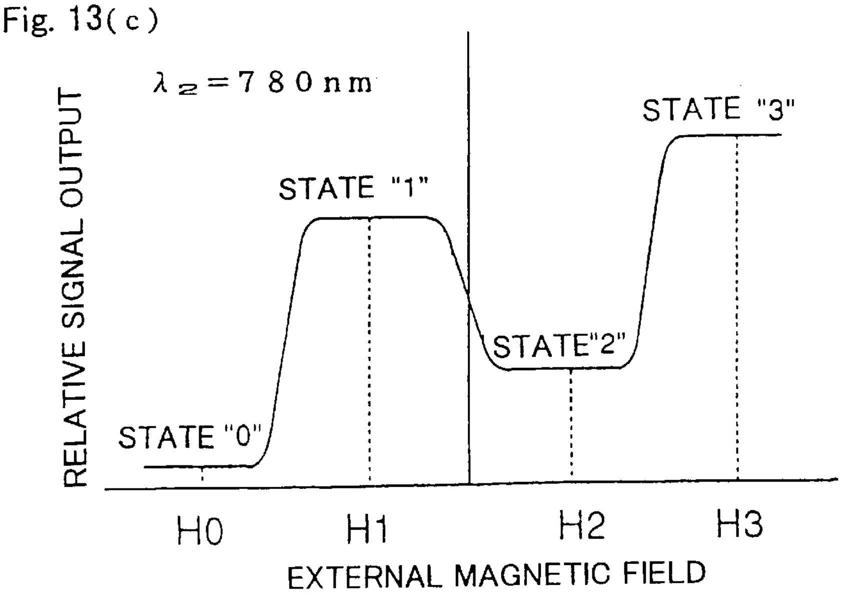

A magneto-optical disk was produced in the same manner as the magneto-optical disk of Embodiment A2 was produced, except that the magnetic layer of $Tb_{31}Fe_{58}Co_{11}$ having the RE-rich composition used in Embodiment A2 was used for both of the first and second magnetic layers. A four-valued sample signal was recorded on this magneto-optical disk by applying magnetic fields having four levels of strength to the disk. FIGS. 13(*b*) and (*c*) show the relationships among the relative reproduction output, the strength of the external magnetic field applied for recording, and the recorded states of magnetization upon reproduction performed with light beams having a wavelength $\lambda_1$ of 443 nm and a wavelength $\lambda_2$ of 780 nm respectively. In the case of reproduction with the reproducing light beam at $\lambda_2$=780 nm, the signal amplitude decreases in an order of the states "3", "1", "2", "0". In the case of reproduction with the reproducing light beam at $\lambda_1$=443 nm, the signal amplitude decreases in an order of the states "3", "2", "1", "0". The difference in the order of magnitudes of reproduced signals between the states makes it possible to carry out recording and reproducing methods according to Embodiments A6 and A7.

Embodiment A4

(First Method for Recording on Magneto-optical Recording Medium)

Figures 8A, 8B:
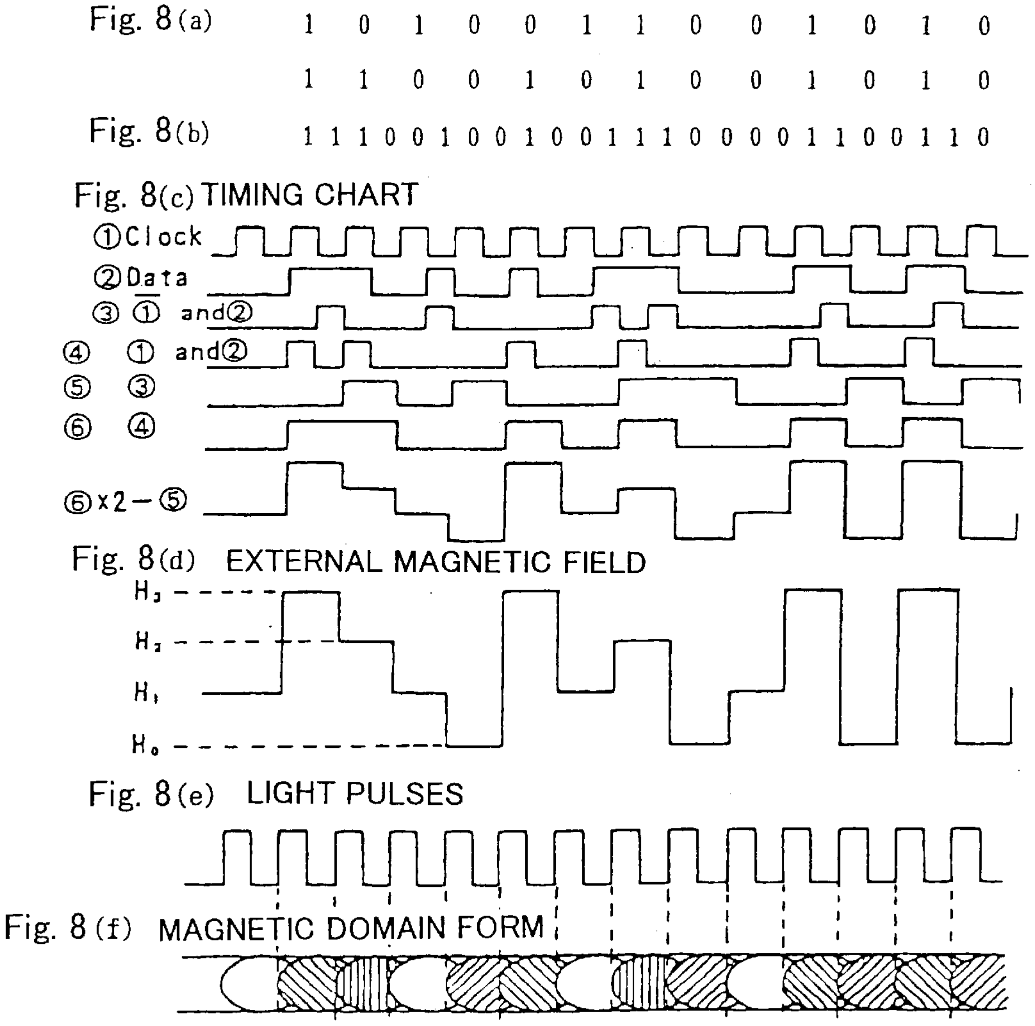
FIG. 8 shows an outline of a recording method on the magnetic field modulation system used for Embodiment A4.

In this embodiment, four-valued signals are recorded in accordance with magnetic field modulation on the magneto-optical disk obtained in Embodiment A1. This recording method includes applying an external magnetic field modulated into four levels in conformity with recording signals, while irradiating the magneto-optical disk with a recording laser beam modulated in pulsed form at a clock period. At first, the magneto-optical disk shown in FIG. 1 was mounted to a medium driving unit such as a turntable. An optical head and a magnetic head were disposed on the sides of the disk which were adjacent to the substrate 1 and the protective film 7, respectively. The medium driving unit was started up, and the magneto-optical disk was rotated at a linear velocity of 7.54 m/s with respect to the optical head and the magnetic head. The heads were positioned at a predetermined track for recording. After that, recording signals as shown in FIG. 8(*a*) were recorded. The recording laser beam was a light beam having a wavelength $\lambda$ of 780 nm from a semiconductor laser. The recording power was 9.5 mW. The 2-bit signals shown in the upper and lower rows in FIG. 8(*a*) represent signals to be recorded on the first and second magnetic layers of the magneto-optical disk respectively. The combination of the signals in the two rows makes it possible to record four-valued information. The data on the two rows were combined bit by bit to provide one signal train as shown in FIG. 8(*b*). This signal train was processed in accordance with the timing chart shown in FIG. 8(*c*) to obtain a signal train as shown in the bottom row in FIG. 8(*c*). The obtained signal was inputted into the magnetic head in synchronization with a recording clock. This applies four magnetic fields $H_0$ to $H_3$ as shown in FIG. 8(*d*) from the magnetic head to the magneto-optical disk. Every time the external magnetic fields were switched to a predetermined value, a light pulse as shown in FIG. 8(*e*) was radiated from the optical head, so that the irradiated portions of the magnetic layers were heated to a temperature at or above which the associated external magnetic field could invert their magnetization. As a result of the operation as described above, four states of magnetization based on the combination of states of magnetization of the first and second magnetic layers were formed on the irradiated portions in conformity with the magnitude of the external magnetic fields. A pattern of formed magnetic domains is shown in FIG. 8(*f*), where the four states of magnetization are distinguished by motifs affixed to circular marks. Recording based on the four states of magnetization can be also performed on the magneto-optical recording media of Embodiments A2 and A3 in accordance with the same operation as described above.

Signal modulation of magnetic field strength can be performed by the system(s) and the signal modulation circuit(s) described in the foregoing Japanese Patent Application Laid-Open No. 8-129,784. Specifically, a signal modulation circuit separates recording signals into even and odd bits, performs waveform processing such as timing adjustment and pulse length adjustment, thereafter amplifies the bits by means of amplifiers having different gains, and adds the amplified bits. Subsequently, the added signal is subjected to voltage-current conversion by a magnetic head driving circuit so that external magnetic fields are applied from the magnetic head. Another signal modulation circuit separates recording signals into even and odd bits, performs waveform processing such as timing adjustment and pulse length adjustment, and thereafter amplifies the bits by means of amplifiers having the same gain. Subsequently, the amplified signals may be subjected to voltage-current conversion by separate magnetic head driving circuits so that external magnetic fields may be applied from a magnetic head having a plurality of windings. It is of course possible to use another magnetic field generating unit such as an electromagnetic coil instead of the magnetic head. Further alternatively, two magnetic heads each having one winding can be closely arranged so that an external magnetic field may be applied from each of the heads.

In the signal recording on the magnetic field strength modulation system described above, the laser beam may be radiated at constant intensity, or it may be radiated periodically or in pulsed form.

Embodiment A5

(First Method for Reproduction From Magneto-optical Recording Medium)

Figures 16A, 16B, 16C, 16D:
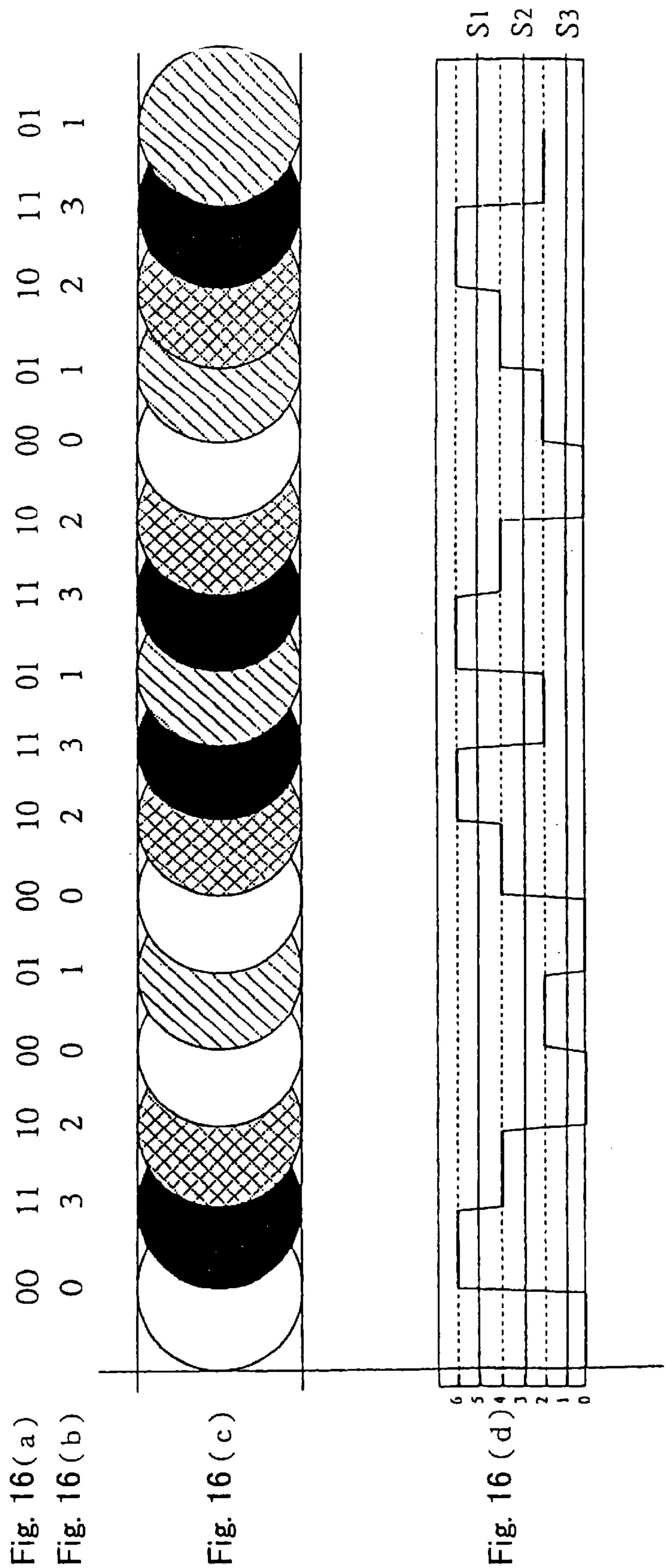
FIG. 16 shows a process of reproduction of a four-valued signal with a reproducing light beam at a single wavelength.

A method for reproduction from the magneto-optical disk subjected to the four-valued recording in Embodiment A4 will be explained. FIG. 16 schematically shows a signal recorded on a magneto-optical recording medium having two magnetic layers as disclosed by the applicants of this application in Japanese Patent Application Laid-Open No. 8-129,784, and a reproduction system therefor. In this system, four-valued recording signal series as shown in FIG. 16(*a*) and (b) are recorded by a recording method as described above to form recording magnetic domains distinguished by the four motifs shown in FIG. 16(*c*). In this art, such a combination of laminated medium structure and laser beam wavelength is selected that the spacing between magnitudes of Kerr rotation angles corresponding to four states of magnetization is equalized. When information is reproduced from the recording medium, an apparent Kerr rotation angle corresponding to a combination of magnetization of each magnetic layer and magnetization of the other is detected. The detected signal is sliced by using levels S1 to S3 to obtain three two-valued signals, from which a four-valued recorded signal is reproduced. In this method, the maximum amplitude of the reproduced signal is equally divided into three to make distribution of regions for the respective signal levels. Accordingly, the S/N ratio is low. In the multi-wavelength magneto-optical reproducing method, the S/N ratio of the prior art described above is improved by performing reproduction from a magneto-optical recording medium according to the present invention with laser beams having different wavelengths.

Figure 2:
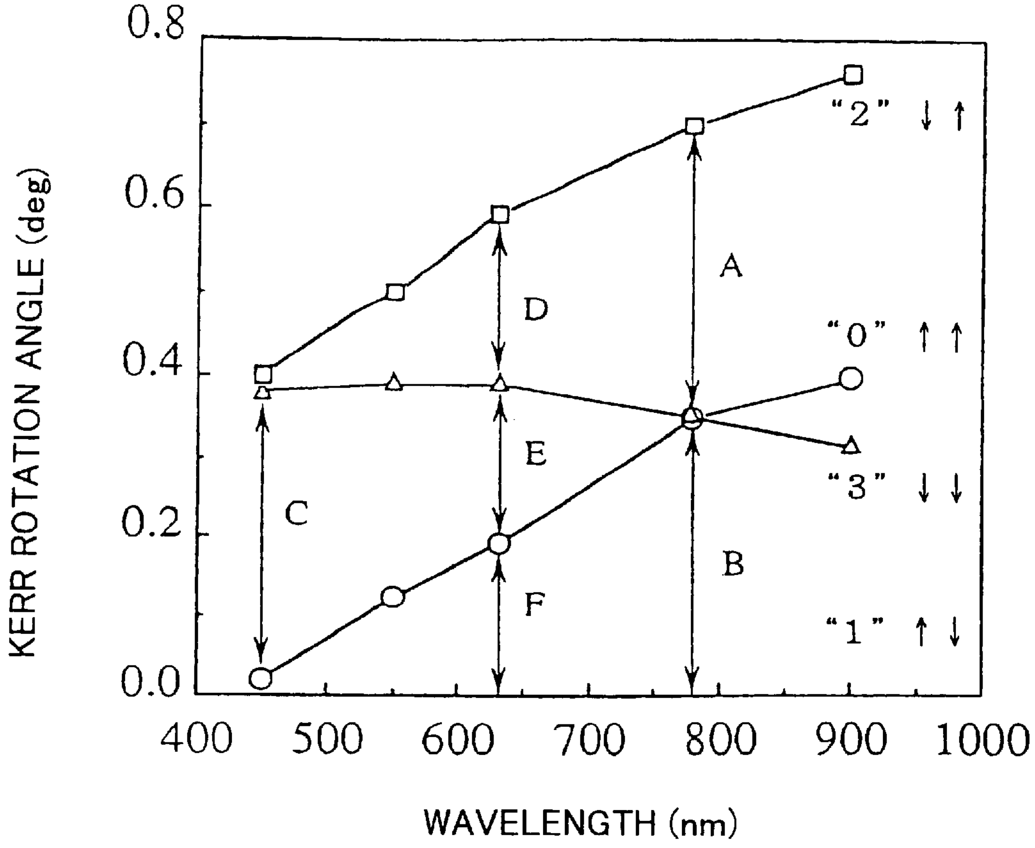
FIG. 2 is a graph showing the wavelength-dependency of the apparent Kerr rotation angle from the four states of magnetization determined by combinations of states of magnetization of the two magnetic layers of the magneto-optical disk of Embodiment A1.
Figure 3A:
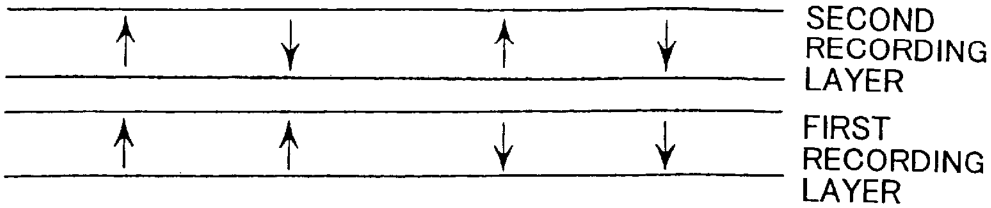
FIG. 3 is graphs showing the relative signal outputs concerning the four states determined by combinations of states of magnetization of the two magnetic layers of the magneto-optical disk o f Embodiment A1.
Figure 3B:
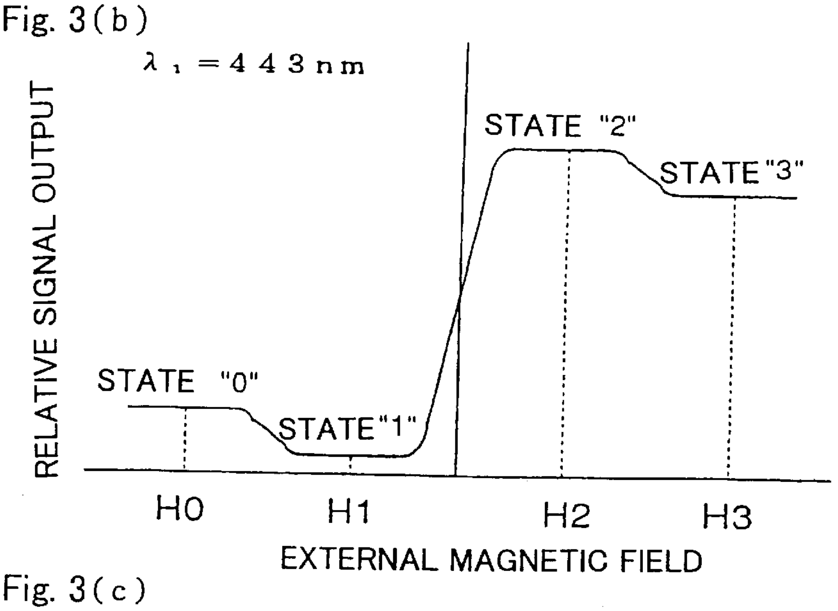
Figure 3C:
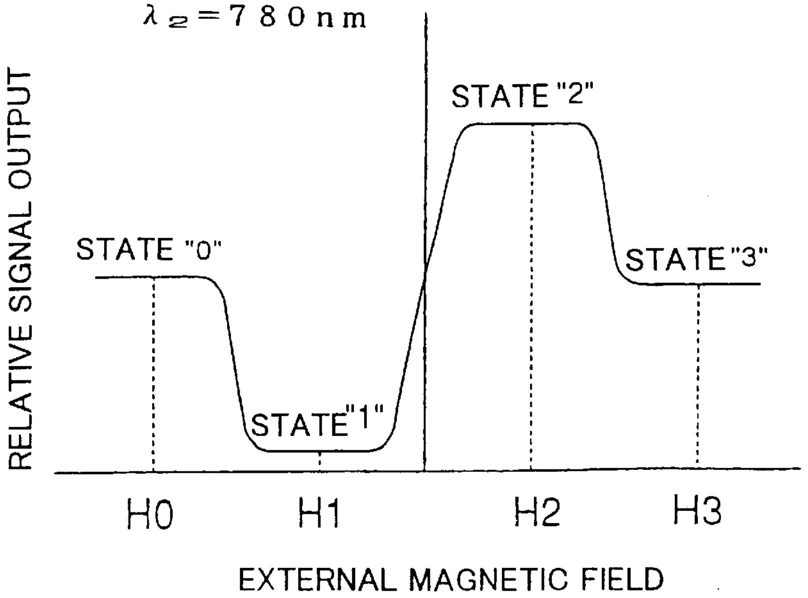
Figures 14A, 14B, 14C, 14D, 14E, 14F, 14G, 14H, 14I:
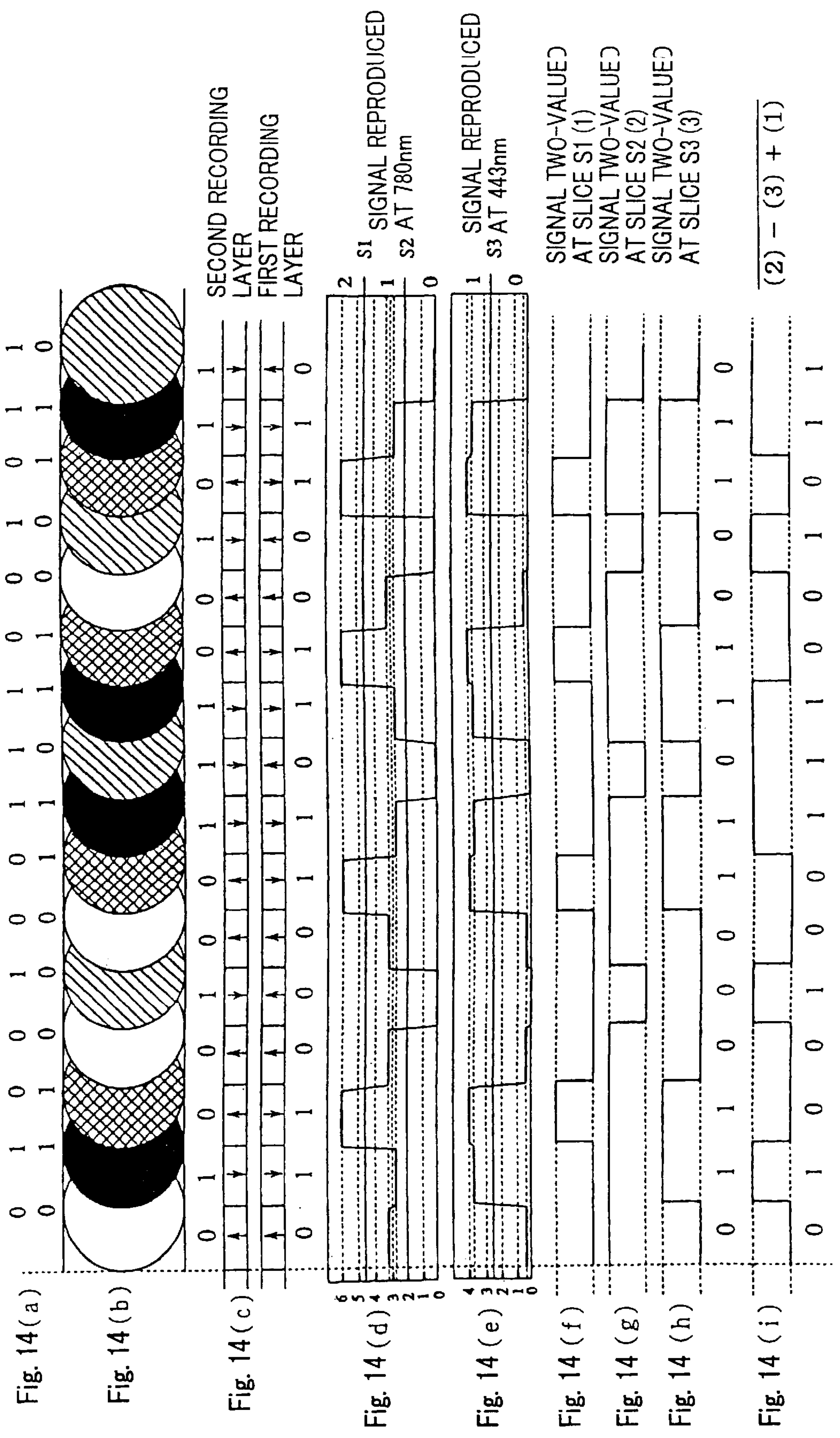
FIG. 14 shows a process of reproduction of information recorded on the first and second magnetic layers, in the reproduction method of Embodiment A4.

An example of reproduction of four-valued information recorded on the magneto-optical disk obtained in Embodiment A1 will be explained with reference to FIG. 14. Two series of two-valued information as illustrated in FIG. 14(*a*) were recorded in accordance with the recording method of Embodiment A4. The first and second series of information shown in FIG. 14(*a*) were recorded on the second and first magnetic layers, respectively. States of magnetization of the magnetic layers subjected to recording are shown in FIG. 14(*c*), and recording marks corresponding to these states are shown in FIG. 14(*b*). The magneto-optical disk on which such information had been recorded was subjected to reproduction with two laser beams having different wavelengths of $\lambda_1$=443 nm and $\lambda_2$=780 nm. A He—Cd laser was used as a laser source for the wavelength $\lambda_1$, and a semiconductor laser was used as a laser source for the wavelength $\lambda_2$. This recording medium has a signal output characteristic corresponding to each state of magnetization as shown in FIG. 3(*b*) with respect to the reproducing wavelength of $\lambda_1$=443 nm. On the other hand, it has a signal output characteristic corresponding to each state of magnetization as shown in FIG. 3(*c*) with respect to the reproducing wavelength of $\lambda_2$=780 nm. FIG. 2 shows dependency of the apparent Kerr angle (relative signal output) on the reproducing wavelength in a range of wavelength of 443 nm to about 900 nm. A reproduced signal reproduced from this recording medium by using the reproducing light beam at $\lambda_2$=780 nm is shown in FIG. 14(*d*). It is assumed that the output level of the reproduced signal from a state of magnetization (↑↓) is 0, and that the output level of the reproduced signal from a state (↓↑) is 6. Then, the reproduction outputs from states (↑↑) and (↑↓) are approximately at a level 3, which generally divides the spacing between the levels 0 and 6 into two. The spacing between the levels 6 and 3 corresponds to the apparent Kerr rotation angle difference A in FIG. 2, and the spacing between the reproduction output levels 0 and 3 corresponds to the apparent Kerr rotation angle difference B in FIG. 2. Namely, it is recognizable that the three states can be distinguished by the relatively large difference in signal amplitude by using the reproducing light beam at $\lambda_2$=780 nm. An output for the reproducing light beam at $\lambda_1$=443 nm is shown in FIG. 14(*e*). As for levels detected from the four states of magnetization, it is assumed that the state (↓↑) is at a level 4 and that the state (↑↓) is at a level 0. The output level of the reproduced signal from the state (↓↓) is extremely close to the level of the state (↓↑). The output level of the reproduced signal from the state (↑↑) is extremely close to the 0 level reproduced from the state (↑↓). The difference between the reproduction output levels 0 and 4 corresponds to the apparent Kerr rotation angle difference C in FIG. 2. Therefore, it is recognizable that the two states can be distinguished by the large difference in signal amplitude by using the output for the reproducing light beam at $\lambda_1$=443 nm.

Next, the reproduced signal obtained by using the reproducing light beam at $\lambda_2$=780 nm is sliced at slice levels S1 and S2 (as shown in FIG. 14(*d*)). Thus, two-valued signal series (designated as (1) and (2), respectively) as shown in FIG. 14(*f*) and (g), respectively, are obtained. The reproduced signal obtained by using the reproducing light beam at $\lambda_1$=443 nm is sliced at a slice level S3 (as shown in FIG. 14(*e*)). Thus, a two-valued signal series (designated as (3)) as shown in FIG. 14(*h*) is obtained. A logical operation for the signal series (2)–(3)+(1) is performed to obtain a two-valued signal series, which is inverted to obtain a signal series as shown in FIG. 14(*i*). Thus, the first recorded signal series can be reproduced. The second recorded signal series can be reproduced by the signal series shown in FIG. 14(*h*), namely the signal array (3) itself. Therefore, the first and second recorded signal series can be separated, and the four-valued signal composed of the two series of two-valued signals can be reproduced at a more excellent S/N ratio as well.

In the embodiment described above, an identical position on the track of the magneto-optical disk was irradiated with the two reproducing laser beams different in wavelength. However, radiation may be performed so that different condensing positions are provided for the two laser beams. Such a procedure may be dealt with by adjusting a reproducing circuit so that the difference in time caused by a distance between two laser spots is compensated.

Embodiment A6

(Second Method for Reproduction From Magneto-optical Recording Medium)

Figure 5:
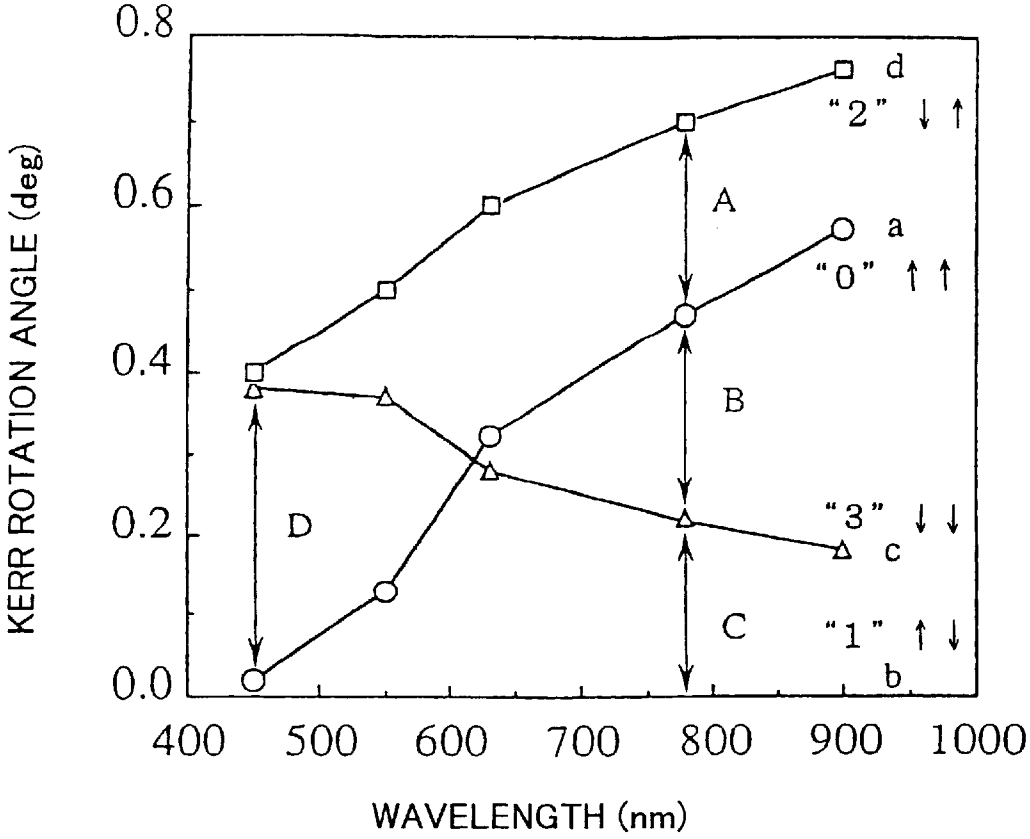
FIG. 5 is a graph showing the wavelength-dependency of the apparent Kerr rotation angle from the four states of magnetization determined by combinations of states of magnetization of the two magnetic layers of the magneto-optical disk of Embodiment A2.
Figure 6A:
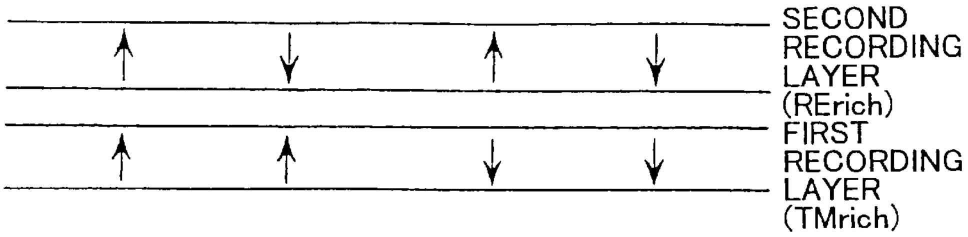
FIG. 6 is graphs showing the relative signal outputs concerning the four states determined by combinations of states of magnetization of the two magnetic layers of the magneto-optical disk of Embodiment A2.
Figure 6B:
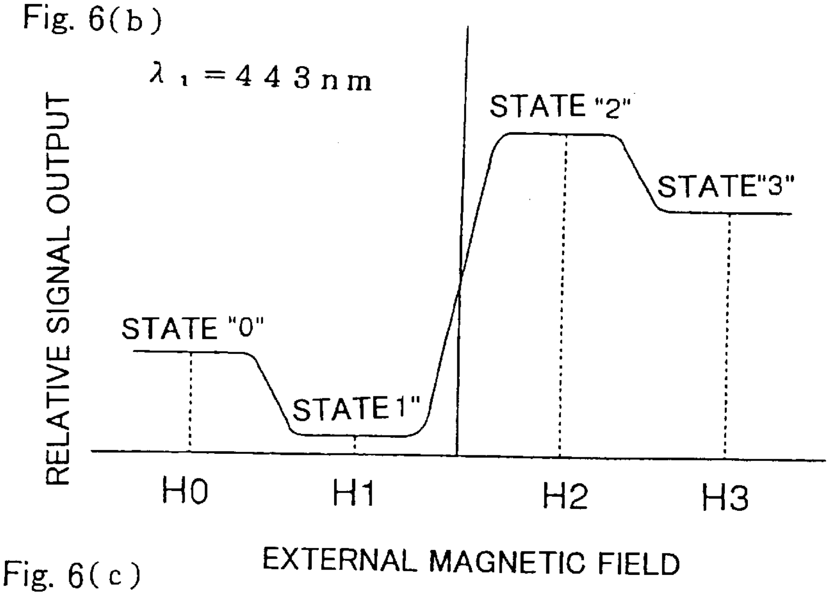
Figure 6C:
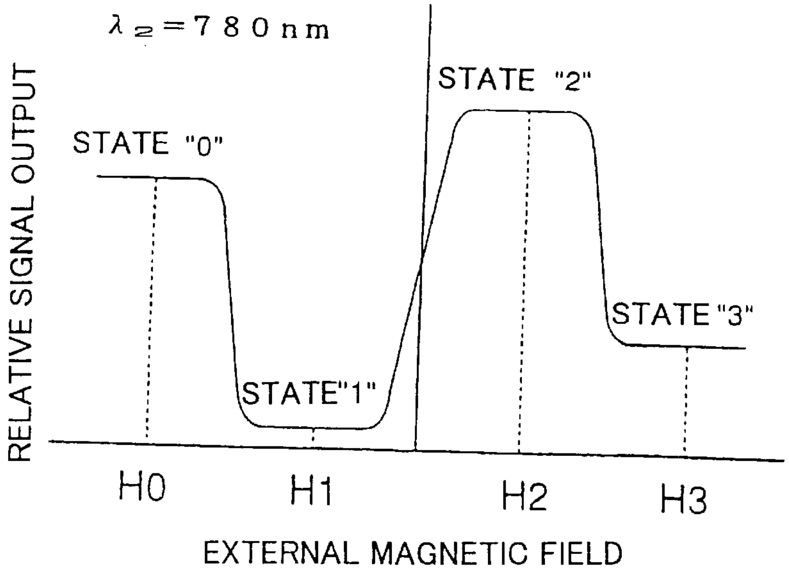
Figures 15A, 15B, 15C, 15D, 15E, 15F, 15G, 15H:
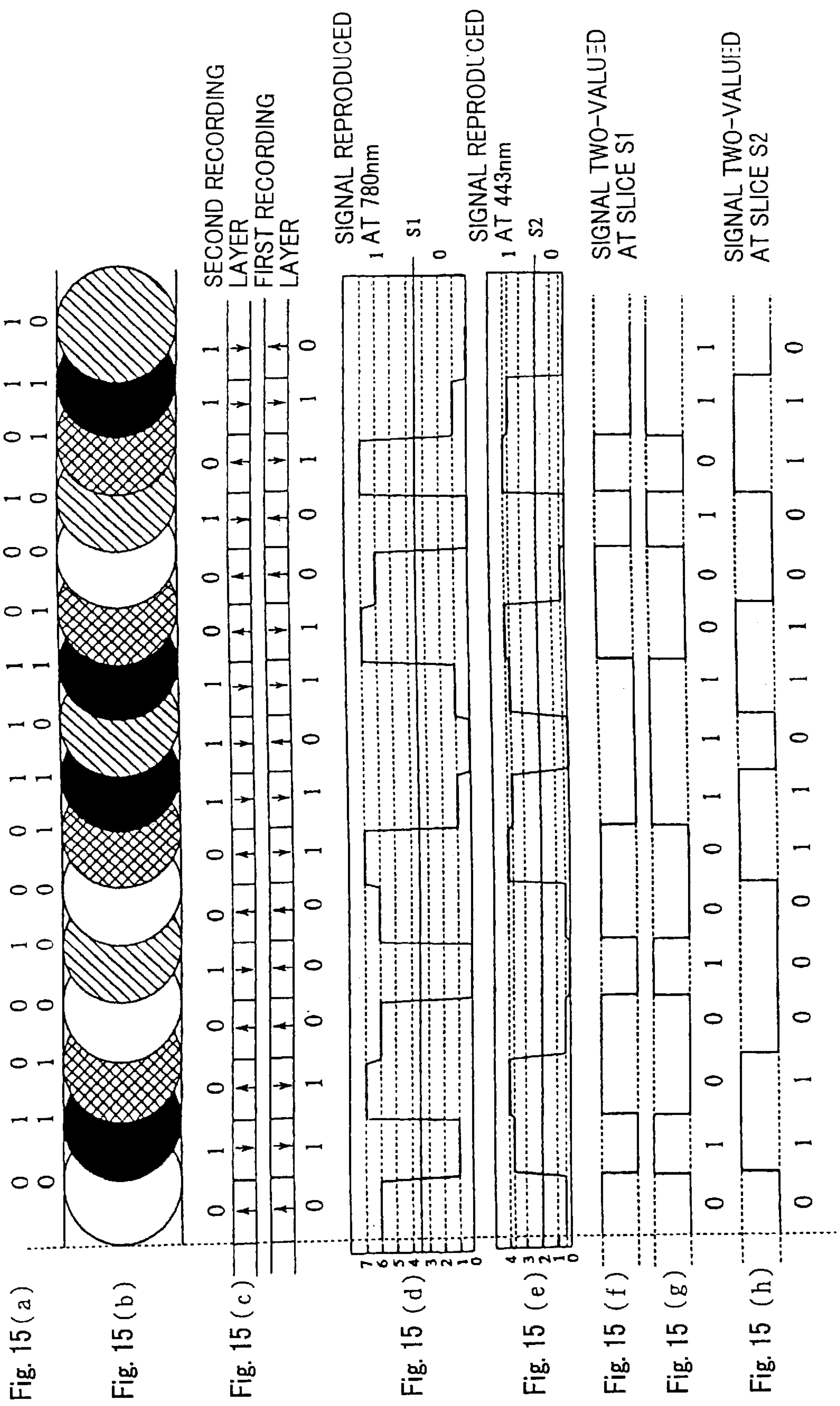
FIG. 15 shows a process of reproduction of information recorded on the first and second magnetic layers, in the reproduction method of Embodiment A6.

In this embodiment, a reproducing method different from the reproducing method of Embodiment A5 will be explained. The magneto-optical disk produced in Embodiment A2 was used as a recording medium. The magneto-optical disk of Embodiment A2 has such a magneto-optical characteristic that, as shown in FIG. 5, a curve representing a variation in the apparent Kerr rotation angle with respect to the wavelength which is detected from a combination of states of magnetization (determined by the two magnetic layers) intersects, in a range between two reproducing wavelengths $\lambda_1$ and $\lambda_2$ a curve representing a variation in the apparent Kerr rotation angle with respect to the wavelength which is detected from another combination of states of magnetization. At first, the two series of two-valued information shown in the upper and lower rows in FIG. 15(*a*) were recorded by a recording method similar to the recording method used in Embodiment A1. The recorded domains are shown in FIG. 15(*b*), where they are distinguished by motifs affixed to circular marks in conformity with the differences between the combinations of states of magnetization of the two magnetic layers. FIG. 15(*c*) shows the two-valued signals and states of magnetization recorded on the magnetic layers. The two-valued signals thus recorded on the two layers were reproduced by using two laser beams having different wavelengths of $\lambda_1$=443 nm and $\lambda_2$=780 nm. FIG. 15(*d*) and FIG. 15(*e*) show the signal waveforms reproduced with the reproducing light beams at $\lambda_2$=780 nm and $\lambda_1$=443 nm, respectively.

The reproduction output levels with respect to the combinations of states of magnetization greatly differ owing to the use of the two reproducing wavelengths $\lambda_1$ and $\lambda_2$ because of the following reason. As understood from the curves representing the changes in the apparent Kerr rotation angle with respect to the reproducing wavelength shown in FIG. 5, the four states "η↑", "↑↑", "↓↑", "↑↑" determined by the combinations of states of magnetization of the first and second magnetic layers involve greatly different magnitudes of the Kerr rotation angle and its order at the wavelengths 780 nm and 443 nm. A two-valued signal (1) as shown in FIG. 15(*f*) is obtained by slicing, at the level S1 where the maximum signal strength is divided into two, the signal reproduced with the reproducing light beam at $\lambda_2$=780 nm shown in FIG. 15(*d*). By inverting the waveform of this two-valued signal, a two-valued signal (1) as shown in FIG. 15(*g*) is obtained. It is understood that the two-valued signal (1) shown in FIG. 15(*g*) is the same as the two-valued signal recorded on the second magnetic layer. On the other hand, a two-valued signal (2) as shown in FIG. 15(*h*) is obtained by slicing, at the level S2 where the maximum signal strength is divided into two, the signal reproduced with the reproducing light beam at $\lambda_1$=443 nm shown in FIG. 15(*e*). It is understood that the two-valued signal (2) shown in FIG. 15(*h*) is the same as the two-valued signal recorded on the first magnetic layer. Therefore, it is understood that the two-valued information recorded on the first magnetic layer can be reproduced by performing reproduction from the magneto-optical disk with the wavelength $\lambda_2$=443 nm, and that the two-valued information recorded on the second magnetic layer can be reproduced by performing reproduction from the magneto-optical disk with the wavelength $\lambda_2$=780 nm. This is based on the following facts. As explained in the principle of the foregoing reproducing method, the two states "↓↑" and "↓↓" can be distinguished from the two states "↑↑" and "↑↓" by slicing the reproduced signal at the intermediate level of the reproduced signal output at $\lambda_1$=443 nm. As also explained, the same signal as the signal obtained by two-valued representation of the states of magnetization of the first magnetic layer is obtained by two-valued representation of the difference between the two sets of states. Further, the two states "↓↑" and "↑↑" can be distinguished from the two states "↓↓" and "↑↓" by slicing the reproduced signal at the intermediate level of the reproduced signal output at $\lambda_2$=780 nm, and the same signal as the signal obtained by inverting the two-valued signal of the states of magnetization of the second magnetic layer is obtained by two-valued representation of the difference between the two sets of states. Accordingly, pieces of information recorded on a plurality of magnetic layers can be independently reproduced by using the reproduction method of this embodiment. In addition, a four-valued signal obtained from two two-valued input signal series can be also reproduced at a high S/N ratio in the same manner as described in Embodiment A5.

Embodiment A7

(Second Method for Recording on Magneto-optical Recording Medium)

In this embodiment, an example will be explained in which a method for recording on a magneto-optical recording medium different from the recording method used in Embodiment A4 was carried out. In this recording method, information on only one of the first and second magnetic layers is rewritten in a virtual manner. In a recording system for recording information by raising the temperature by condensing a laser beam onto the laminated thin-film magnetic layers of an optical recording medium, it is extremely difficult to selectively heat only one layer up to a temperature at or above which information can be recorded. For this purpose, for example, an artifice is required to relatively increase the distance between two layers so that focal positions for a laser beam spot are deviated. However, such an artifice is extremely difficult to carry out because of difficulty to achieve a thermal condition. Therefore, the information on the magnetic layer (for example, the first magnetic layer) where no information was to be rewritten was previously reproduced and stored. Upon rewriting of information, both of the first and second magnetic layers were heated to a recording temperature (Curie temperature) with a single laser beam so that the read information was recorded on the first magnetic layer again, and new information was recorded on the second magnetic layer subjected to rewriting. According to this method, apparently the information on the first magnetic layer remains as it is, and only the information on the second magnetic layer is rewritten into the new information. Thus, only one of the magnetic layers is subjected to rewriting in a virtual manner.

Figure 9:
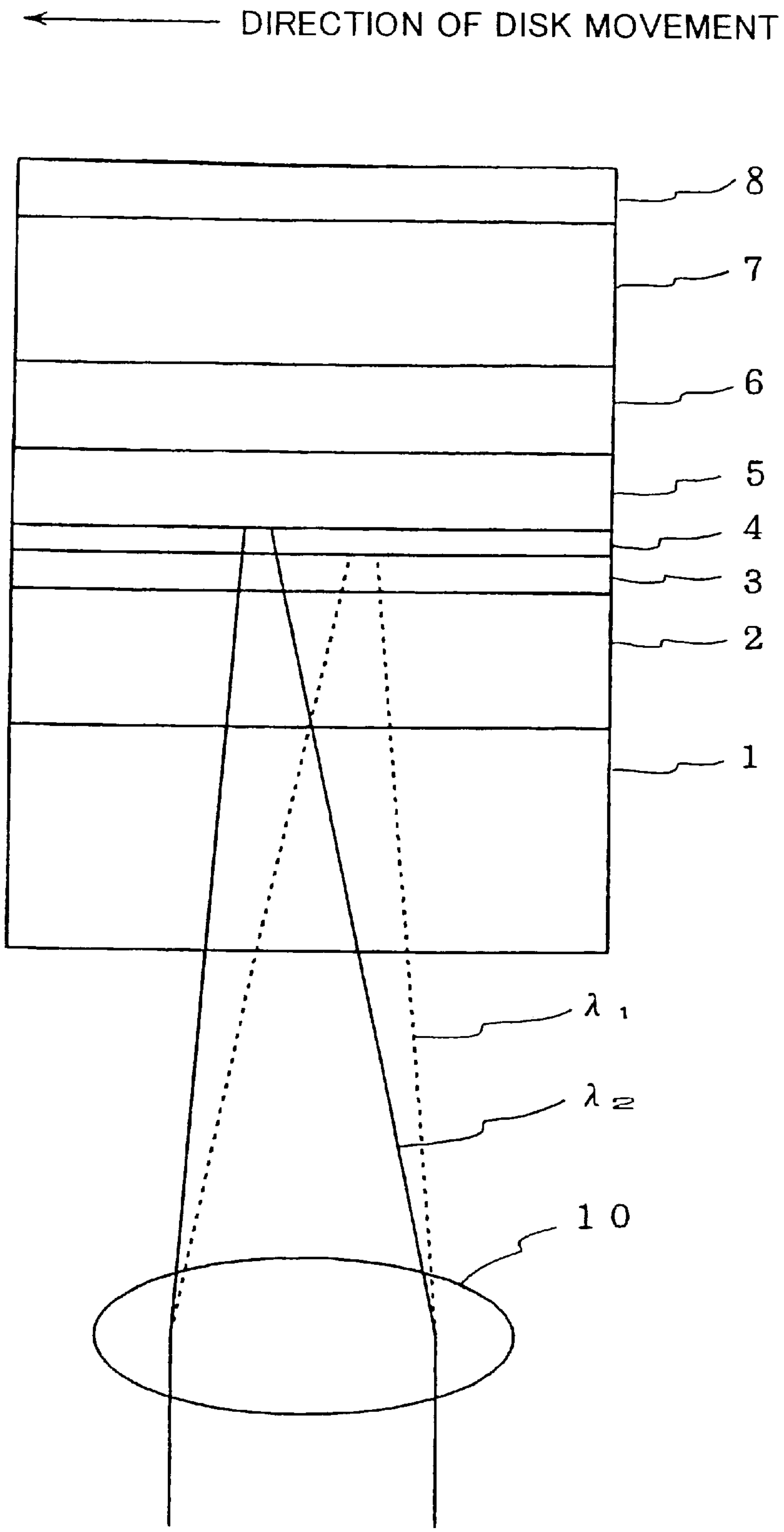
FIG. 9 shows how information is reproduced from the first layer with a reproducing light beam at $\lambda_1$ while information is recorded on the first and second layers with a recording light beam at λ2 in a recording method according to Embodiment A7.
Figures 10A, 10B, 10C, 10D, 10E:
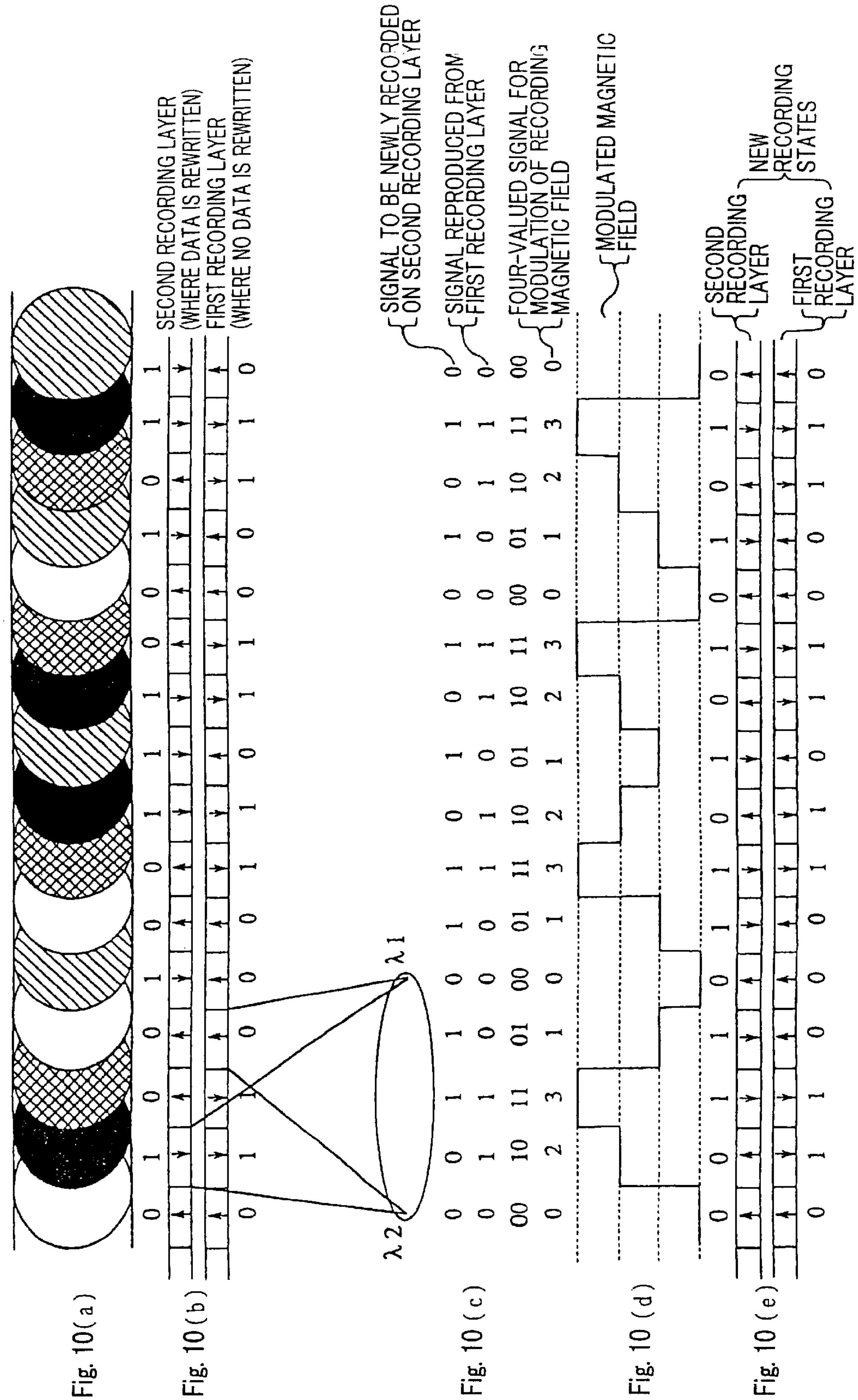
FIG. 10 shows states of magnetization of the first and second magnetic layers before and after rewriting of information on the second magnetic layer in the recording method of Embodiment A7.
Figure 11:
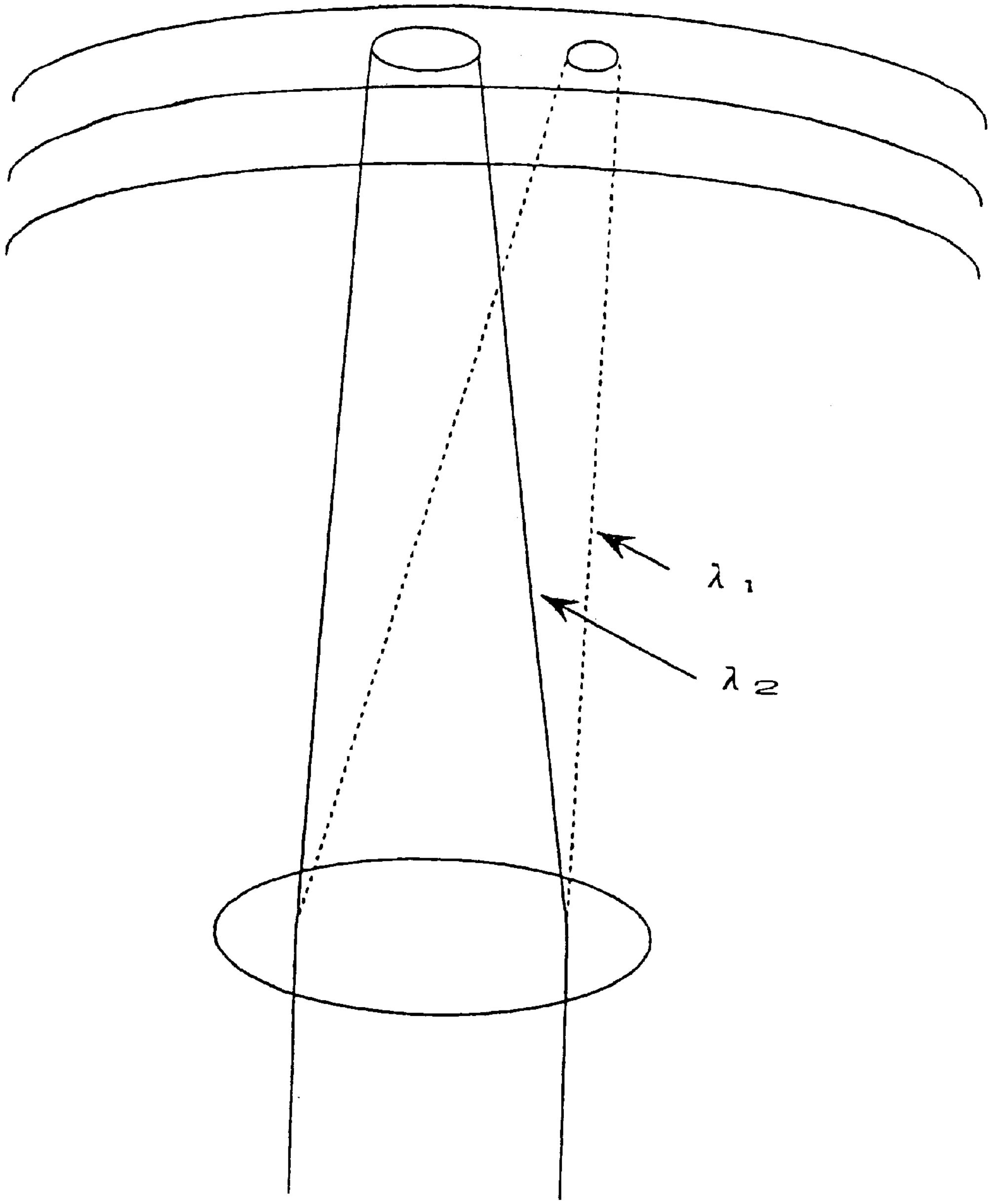
FIG. 11 shows positions irradiated with a reproducing light beam at the wavelength λ1 and a recording light beam at the wavelength λ2 in the recording method of Embodiment A7.
Figure 12:
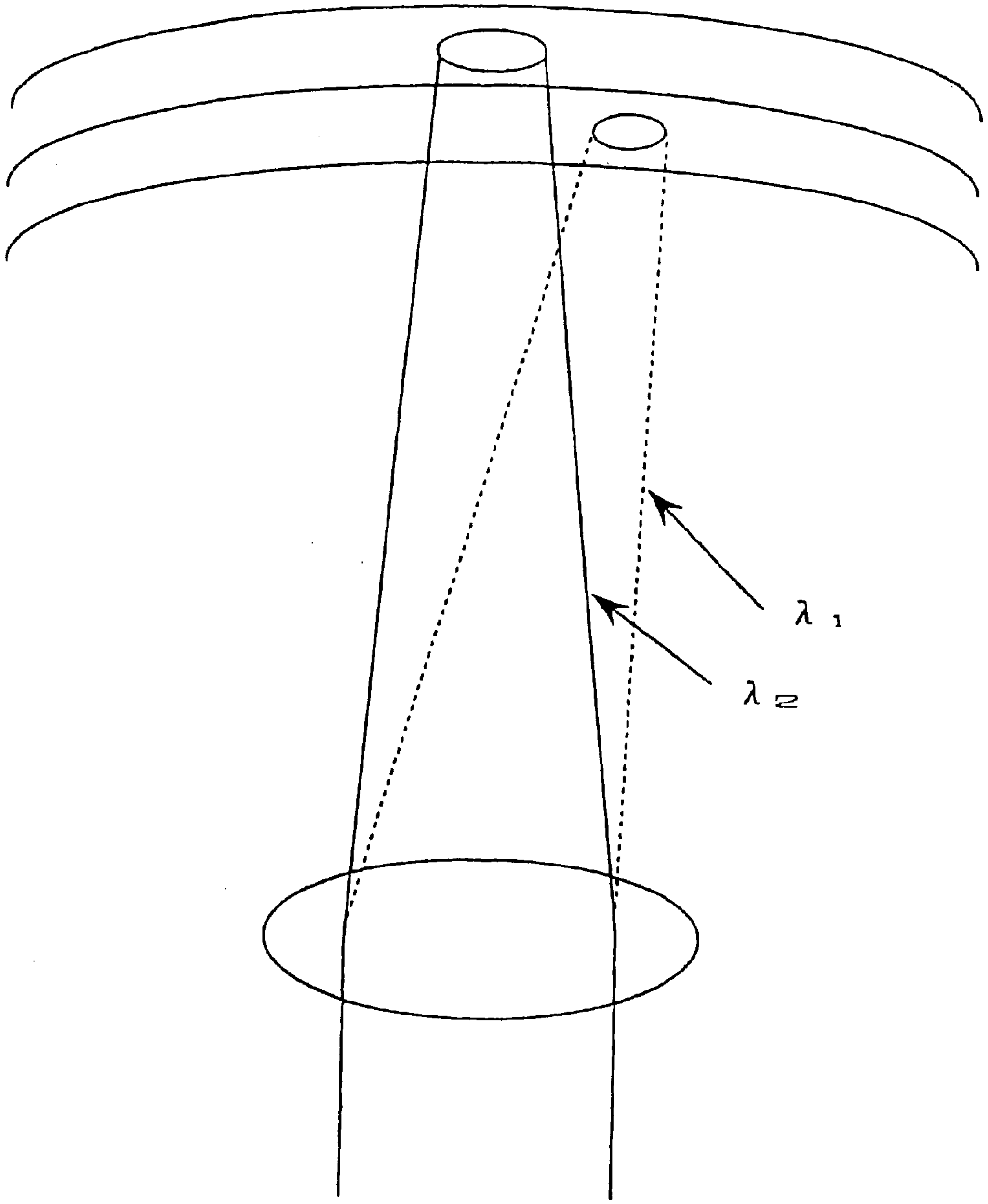
FIG. 12 shows other positions irradiated with a reproducing light beam at the wavelength λ1 and a recording light beam at the wavelength λ2 in the recording method of Embodiment A7.

Next, a specific method will be explained with reference to FIGS. 9 and 10. The magneto-optical disk produced in Embodiment A2 is used as a recording medium. Accordingly, by a reproducing method as explained in Embodiment A6, it is possible to reproduce information from the first and second magnetic layers of this magneto-optical disk with the reproducing light beams having the wavelengths $\lambda_1$=443 nm and $\lambda_2$=780 nm, respectively. Two laser sources as shown in FIG. 9 are used upon recording of information, and two laser beams are condensed so as to be deviated from each other along a recording track. Specifically, the disk is scanned with the laser beam at $\lambda_1$=443 nm preceding the laser beam at $\lambda_2$=780 nm. The laser beam at $\lambda_1$=443 nm is used as a reproducing light source, and the laser beam at $\lambda_2$=780 nm is used as a recording light source. It is assumed that magnetization arrays as shown in FIG. 10(*b*) are firstly recorded on the two magnetic layers of the magneto-optical disk. Domains corresponding to the magnetization arrays are shown in FIG. 10(*a*). The magneto-optical disk having the domains as described above was irradiated with the laser beam at $\lambda_1$, and a two-valued signal (second row in FIG. 10(*c*)) was reproduced by detecting a reflected light beam from the disk. The reproduced two-valued signal is temporarily stored in an external memory. The signal reproduced with the reproducing light beam at $\lambda_1$, corresponds to the information on the first magnetic layer. In the next step, the reproduced signal is combined (third row in FIG. 10(*c*)) with a two-valued signal subjected to rewriting on the second magnetic layer (uppermost row in FIG. 10(*c*)) so that a modulated waveform of external magnetic fields to be applied is formed (FIG. 10(*d*)). When a position of information at which reproduction has been performed with the reproducing light beam at $\lambda_1$ is encompassed by the light spot at $\lambda_2$, both of the first and second magnetic layers are heated to a temperature at or above which information can be recorded. The external magnetic fields in conformity with the combined recording signals described above are applied to perform recording on the magnetic layers. FIG. 10(*e*) shows the states of magnetization of the magnetic layers subjected to recording and the two-valued signals recorded thereon. According to a recording method as described above, the information on the first magnetic layer is recorded again as it is as original information, and new information is recorded only on the second magnetic layer. The spacing distance between the reproducing light spot at $\lambda_1$ and the recording light spot at $\lambda_2$ is adjusted to be a length more suitable for the performance of a temporarily storing circuit for reproduced information and a magnetic field modulating circuit. The spots of the two irradiating beams may be located at frontward and backward positions on an identical recording track as shown in FIG. 11. Alternatively, they may be located on adjacent recording tracks as shown in FIG. 12 so that reproduced information obtained by using the wavelength $\lambda_1$ is temporarily stored in a memory while a recording light beam spot at the wavelength $\lambda_2$ circulates on the track.

In the recording method described above, only the information on the second magnetic layer is rewritten. However, when only the information on the first magnetic layer is rewritten, rewriting of the information on the first magnetic layer can be executed by using the laser beam at the wavelength $\lambda_2$ and the laser beam at the wavelength $\lambda_1$ as a reproducing light beam and a recording light beam respectively to make scanning so that the laser spot at the wavelength $\lambda_2$ precedes the laser spot at the wavelength $\lambda_1$.

In the foregoing Embodiments A6 and A7, recording and reproduction are performed by using the magneto-optical disk of Embodiment A2. However, it is also possible to use the magneto-optical disk of Embodiment A3. When the magneto-optical disk of Embodiment A1 is used, it is impossible to reproduce information on one of the magnetic layers with only the reproducing light beam having one of the wavelengths. Accordingly, information on both of the layers is once reproduced with the reproducing light beams having the wavelengths $\lambda_1$ and $\lambda_2$. Only information on one of the magnetic layers is stored, and this information is combined with information to be recorded on the other magnetic layer, followed by recording with the recording light beam. Thus, it is possible to execute a virtual recording method in which only one of the layers is subjected to rewriting.

Embodiment A8

(Fourth Embodiment of Magneto-optical Recording Medium)

In the aforementioned embodiments, the rare earth metal-transition metal alloy comprising the same components (TeFeCo) has been used for the first and second magnetic layers. On the contrary, this embodiment exemplifies a magneto-optical recording medium produced by using different materials for the first and second magnetic layers. This magneto-optical recording medium conforms in structure to the magneto-optical recording medium (or media) described in Japanese Patent Application Laid-Open No. 8-129,784 of the inventors of this application, and in K. Shimazaki, M. Yoshihiro, O. Ishizaki, S. Ohnuki and N. Ohta, "Magneto-Optical Recording International Symposium 1994, Post Dead Line Paper Technical Digest, No. 27-S-01, page 4 (1994); Optical Data Storage, Technical Digest, pages 59 and 60 (1994). This magneto-optical recording medium includes at least two or more stacked magnetic layers. At least one of these layers is formed of magneto-optical recording film in which recording states exist in two or more different ranges of magnetic field strength with respect to applied external magnetic fields. Another of the magnetic layers is formed of magneto-optical recording film in which at least one recording state exists in a range of magnetic field strength different from those for the aforementioned magnetic layer. Magnetic layer materials applicable to this medium may, as described in Japanese Patent Application Laid-Open No. 8-129,784, and K. Shimazaki, M. Yoshihiro, O. Ishizaki, S. Ohnuki and N. Ohta, "Magneto-Optical Recording International Symposium 1994, Post Dead Line Paper Technical Digest, No. 27-S-01, page 4 (1994); Optical Data Storage, Technical Digest, pages 59 and 60 (1994), include oxide magnetic substances such as garnet and ferrite, alternately stacked materials composed of noble metal such as Pt and Pd and transition metal such as Fe and Co and/or rare earth metal such as Tb and Gd, Heuslar alloys such as PtMnSb, and other materials having a large magneto-optical effect and usable to form a thin film such as MnBi. A specific example of the medium constructed as described above will now be explained.

When a multi-layered recording medium obtained by forming multiple layers by using only a rare earth metal-transition metal alloy is subjected to reproduction by using a plurality of laser beams having different wavelengths so that pieces of information on the respective recording layers are distinguished, then the mutual difference in the Kerr rotation angle between states of recording magnetization with respect to the respective reproducing wavelengths is generated by only a condition of optical multiple interference, because of the following reason. Since materials of the same type are used for the recording layers, the materials themselves do not provide a large change for their tendency of change in the Kerr rotation angle with respect to the reproducing wavelength. Accordingly, in order to increase the difference in the Kerr rotation angle between states of recording magnetization with respect to the reproducing wavelength and enhance the S/N ratio of reproduced signals, stacked layers comprising different recording materials have been applied to this multi-layer recording.

Figure 18:
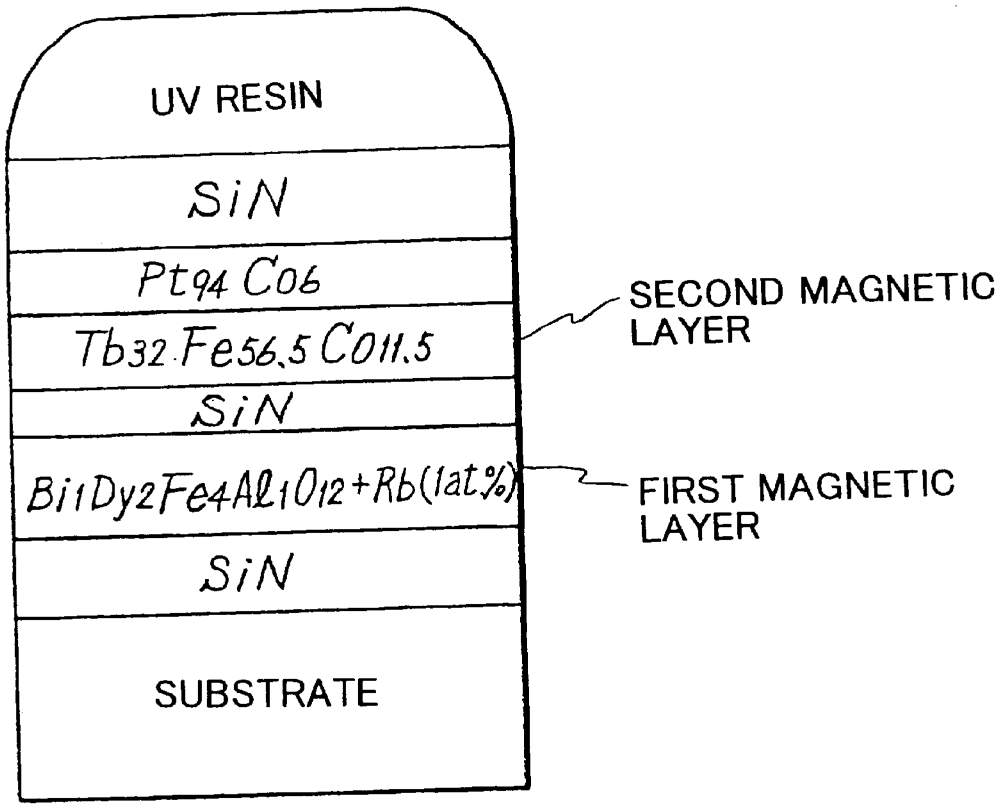
FIG. 18 is a conceptual cross section of a magneto-optical disk produced in Embodiment A8.
Figure 19:
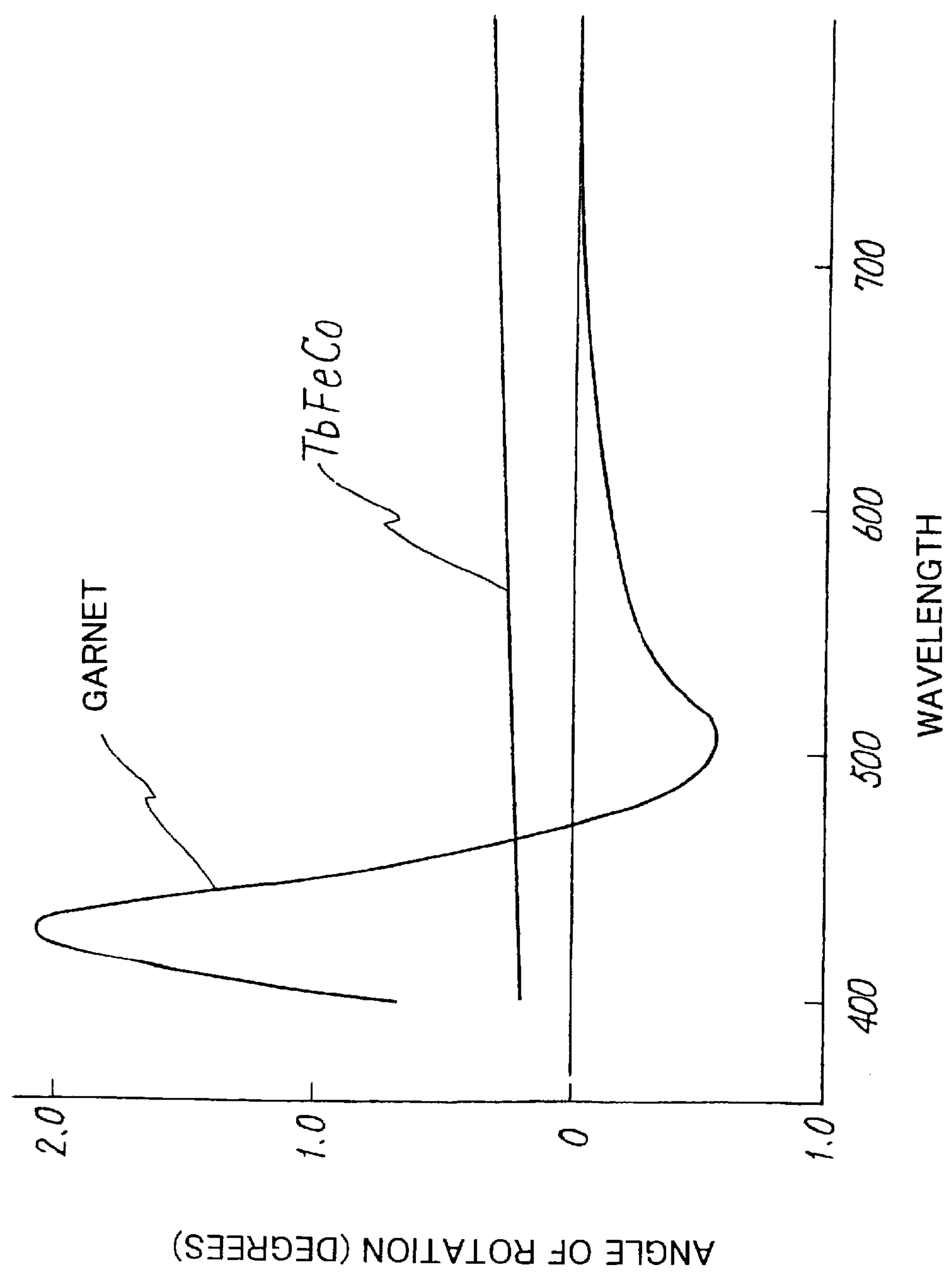
FIG. 19 is a graph showing the change of the Kerr rotation angle depending on the measuring wavelength concerning the rare earth metal-transition metal alloy film and the garnet film used for the magnetic layers of the magneto-optical disk in Embodiment A8.

FIG. 18 shows an example in which a garnet film is used as a recording material for a first magnetic layer (recording layer), and a rare earth metal-transition metal alloy is used as a recording material for a second magnetic layer (recording layer). FIG. 19 shows the change in the Kerr rotation angle of thin films made of the respective recording materials with respect to the measuring wavelength. As for the rare earth metal-transition metal alloy, for example, TeFeCo, the Kerr rotation angle gradually decreases as the measuring wavelength becomes short as shown in FIG. 19. On the other hand, in the case of garnet, in general, the Kerr rotation angle remarkably changes depending on the change in wavelength, as compared with the rare earth metal-transition metal alloy. As shown in FIG. 19, garnet provides an extremely small Kerr rotation angle at a wavelength in a range of about 600 nm to 800 nm. However, at a wavelength in a range of about 400 nm to 450 nm, the Kerr rotation angle quickly increases, exhibiting a value of not less than 2 degrees at its maximum. Namely, when the medium having laminated structure as shown in FIG. 18 is subjected to reproduction with two laser beams having a wavelength in the range of about 600 nm to 800 nm and a wavelength in the range of about 400 nm to 450 nm, then the garnet thin film does not contribute to the Kerr rotation at a wavelength in the range of about 600 nm to 800 nm, but serves as a thin film which simply effects the multiple interference action. Only the Kerr rotation caused by the rare earth metal-transition metal alloy dominantly contributes to reproduced signals. On the other hand, in the case of a wavelength in the range of about 400 nm to 450 nm, an extremely large Kerr rotation angle caused by the garnet thin film dominantly contributes to reproduced signals. The difference in the Kerr rotation angle between states of magnetization caused by optical multiple interference is further superimposed on the effect caused by the garnet thin film. The laminated structure as described above makes it possible to improve the reproduction efficiency of a multiple recording medium by using a plurality of reproducing laser beams having different wavelengths.

As described above, the magneto-optical recording medium according to this embodiment is characterized in that a plurality of magnetic layers, which have properties that the recording characteristic with respect to the recording magnetic field is mutually different between the respective magnetic layers, and simultaneously the magneto-optical effect such as the ellipticity and the Kerr rotation angle with respect to the measuring wavelength, especially the increasing point thereof is mutually different between them, are directly or indirectly stacked. Multi-layer recording can be achieved at a high S/N ratio by performing reproduction on the medium with a plurality of laser beams having different wavelengths.

A specific example of the medium having the feature as described above will be explained below. At first, an SiN underlying base layer having a thickness of 80 nm was stacked by a sputtering method on a glass substrate formed with pre-pits and a guide groove for tracking for a laser beam spot. A thin film of garnet as a first magnetic layer was deposited thereon. A material used herein was obtained by adding 1 atomic % of Rb to a garnet film, $Bi_1Dy_2Fe_4Al_1O_{12}$ produced by a pyrolysis method. In this method, nitrates of respective elements, i.e., $Bi(NO_3)_3.9H_2O$, $Dy(NO_3)_3.5H_2O$, $Fe(NO_3)_3.9H_2O$ and $Al(NO_3)_3.5H_2O$ were dissolved in water at predetermined concentrations and used for spin coating, followed by heating to achieve drying and crystallization. The thin film had a thickness of 120 nm. A two-layered film of TbFeCo/PtCo as a second magnetic layer was stacked thereon through an SiN layer having a thickness of 20 nm. A film having a composition ratio of $Tb_{32}Fe_{56.5}Co_{11.5}$ was stacked in a thickness of 45 nm, on which an alloy film having a composition ratio of $Pt_{94}Co_6$ was stacked in a thickness of 45 nm. An SiN layer as a protective film was stacked thereon in a thickness of 100 nm by means of sputtering. An ultraviolet-curable resin was spin-coated thereon, which was cured by ultraviolet irradiation.

It is preferable that a magnetic layer be made of a substance providing a large magneto-optical effect at the wavelengths of laser beams used for reproduction. This embodiment exemplifies the use of garnet film and rare earth metal-transition metal alloy for the magnetic layers. The garnet film may be also produced by sputtering. For example, those usable include materials obtained by replacing the rare earth element in the rare earth metal-iron-garnet produced by sputtering with Bi, such as $Y_{275}Bi_{0.25}Fe_5O_{12}$. In addition, a thin film of ferrite composed of a base material such as (Y, Sm, Eu, Gd, Tb, Dy) $FeO_3$ and (Co, Ni, Fe, Mn) $Fe_2O_4$ is another material which exhibits the characteristic increase in magneto-optical effect with respect to the wavelength, and thus such a material is suitable for the reproducing methods used in the present invention. As for the rare earth element-transition metal alloy, a system containing a light rare earth element such as Nd provides an increase in Kerr rotation angle in a short wavelength region. An alloy system of heavy rare earth metal-transition metal generally provides a decrease in Kerr rotation angle in a short wavelength region. Accordingly, a rare earth metal-transition metal alloy containing a light rare earth element is combined with a rare earth metal-transition metal alloy containing a heavy rare earth element to construct a group of magnetic layers of a medium. When reproduction is performed from such a medium with a plurality of laser beams having predetermined wavelengths, then multi-layer recording can be achieved at a high S/N ratio. Alternatively, the Kerr rotation angle is also increased in a short wavelength region by using a film obtained by alternately stacking Pt and Co in thicknesses of several angstroms, the film being also applicable in the same manner as described above. The stacking order and the number of the magnetic layers may be arbitrarily determined.

An arbitrary dielectric protective film material may be used for each of the SiN layers. However, those especially preferred include, for example, nitride, oxide, fluoride, and carbide of Si, Ti, Al, Ta, Zr, Nb, and W. The refractive index and the thickness of these layers are selected in view of multiple interference and protective performance. These layers may be omitted, if necessary. The ultraviolet-curable resin layer may be also omitted, if necessary.

The magneto-optical recording medium in which the first and second magnetic layers are made of different materials may be used with the methods for recording and reproduction according to Embodiments A4–A7. Thus, it is possible to obtain a reproduced signal having a more excellent S/N ratio. Alternatively, both of the first and second magnetic layers may be formed of garnet films, and the garnet composition of each layer may be adjusted so that a λ characteristic as shown in FIG. 2 or 5 may be obtained. In this case, in addition to the effect of the multiple interference, it is possible to further increase the change in the Kerr rotation angle corresponding to each state of magnetization with respect to the wavelength. Accordingly, a reproduced signal is obtained at a more excellent S/N ratio.

The aforementioned embodiments exemplify recording on magneto-optical recording media on the magnetic field modulation system. However, the methods for recording on magneto-optical recording media can be applied to not only the magnetic field modulation system but also the optical modulation system, in which signal modulation is performed with the pulse frequency of a recording light beam or the power of a recording light beam. These methods are applicable to all optical recording media provided with a plurality of magnetic layers in which the reproduced signal outputs from multi-valued states differ in conformity with the use of reproducing light beams having different wavelengths as shown in FIGS. 2 and 5.

Embodiment B1

Production of First Type of Magneto-Optical Recording Medium

Figure 20:
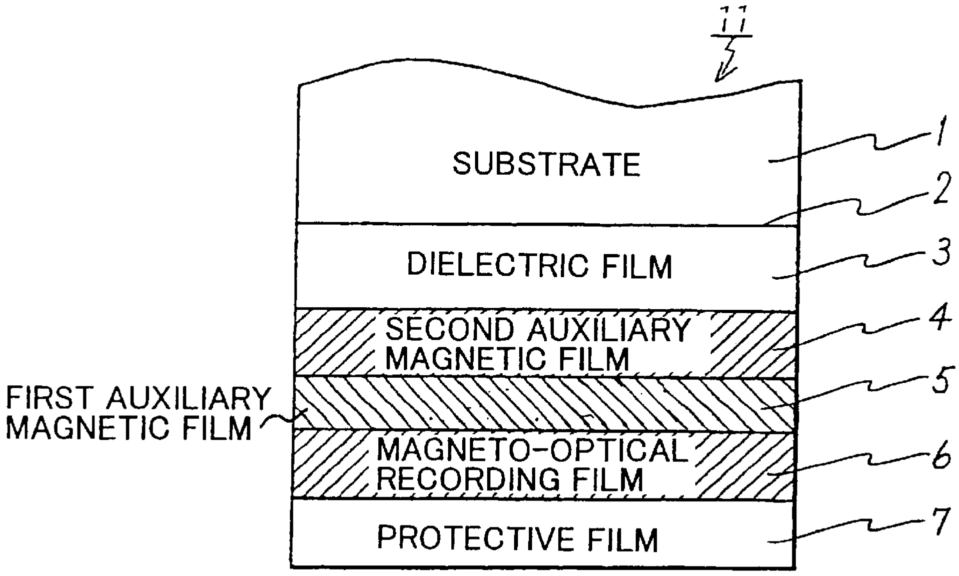
FIG. 20 is a sectional view conceptually showing the laminated structure of a first type of magneto-optical recording medium according to the present invention.
Figure 21:
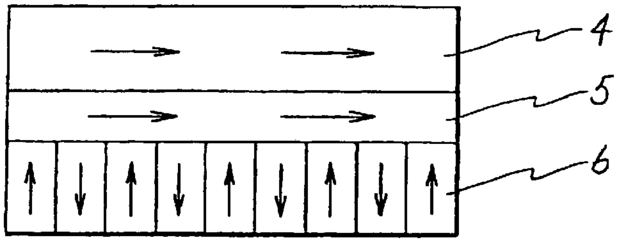
FIG. 21(A) is a conceptual view showing states of magnetization of layers of the first type of magneto-optical recording medium before reproduction.
FIG. 21(B) is a conceptual view showing states of magnetization of layers of the magneto-optical recording medium during reproduction.
Figure 21:
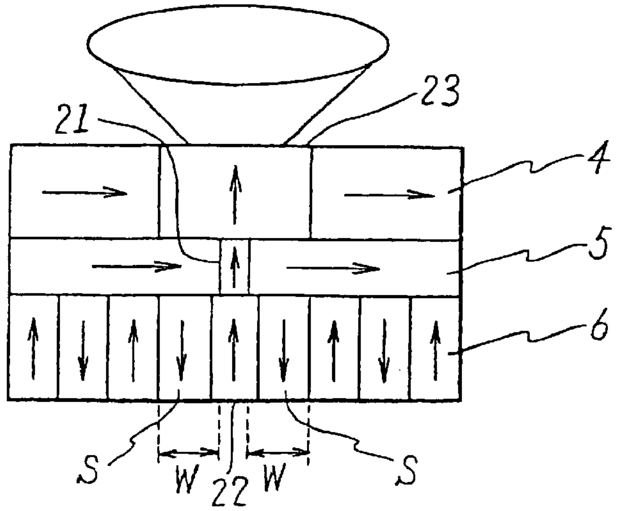

An example of the structure of a first type of magneto-optical recording medium suitable for the optical modulation domain magnifying and reproducing method is described with reference to FIG. 20. As shown in FIG. 20, the first type of magneto-optical recording medium 11 consists of a transparent substrate 1 having a desired preformat pattern 2 on one side thereof, a dielectric film 3 formed on the preformat pattern 2, a second auxiliary magnetic film 4 formed on the dielectric film 3, a first auxiliary magnetic film 5 formed on the second auxiliary magnetic film 4, a magneto-optical recording film 6 formed on the first auxiliary magnetic film 5, and a protective film 7 formed on the magneto-optical recording film 6.

In the structure shown in FIG. 20, the transparent substrate 1 may be an arbitrary optically transparent substrate, e.g., a transparent resin material, such as polycarbonate or amorphous polyolefine, molded into a desired shape, or a glass plate in a desired form to one side of which is adhered a transparent resin film having a desired preformat pattern 2 transferred thereto. The dielectric film 3 is provided to cause multiple interference of a reproducing light beam in the film, thereby increasing an effective Kerr rotation angle. The dielectric film 3 may be formed of an inorganic dielectric, which may be made of SiN, having a larger refractive index than that of the transparent substrate 1. The protective film 7 serves to protect the films 3 to 6, laminated between the substrate 1 and the protective film 7, against adverse chemical influence of corrosion or the like. The protective film 7 may be an SiN film. The magneto-optical recording film 6 is a perpendicular-magnetized film showing perpendicular magnetic anisotropy at or above room temperature. The recording film 6 may most preferably be made of amorphous alloys of rare earth metals and transition metals, such as TbFeCo, DyFeCo and TbDyFeCo, but may alternatively be made of other known magneto-optical recording materials, such as an alternating laminate of Pt films and Co films and garnet series oxide magnetic materials.

Figure 22:
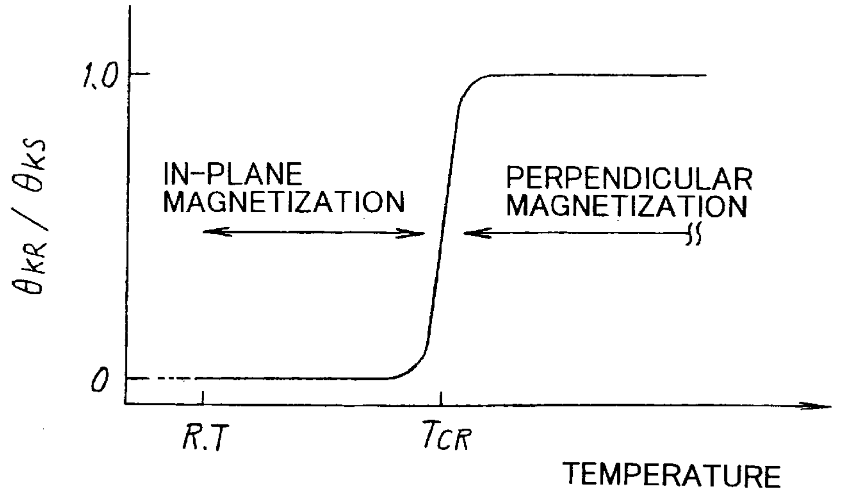
FIG. 22 shows the magnetic characteristics of the auxiliary magnetic film of a magneto-optical recording medium.

As shown in FIG. 22, the first auxiliary magnetic film 5 and the second auxiliary magnetic film 4 have such a characteristic that they are plane-magnetized films from room temperature (R.T.) to a certain critical temperature ($T_{CR}$) above R.T., and transform into perpendicular-magnetized films above $T_{CR}$. In this specification, the room temperature refers to an ambient temperature at which magneto-optical recording media are usually used. This temperature varies with the location of use, and is not restricted to a specific temperature. FIG. 22 shows the temperature dependence of $\theta_{KR}/\theta_{KR}$ ($\theta_{KR}$=residual Kerr rotation angle, $\theta_{KR}$=saturated Kerr rotation angle) determined from a hysteresis loop of a Kerr effect obtained when an external magnetic field was applied perpendicularly to the films. As the material for the auxiliary magnetic films, an amorphous alloy of a rare earth metal and a transition metal, such as GdFeCo, GdFe, GdTbFeCo or GdDyFeCo, is most preferred.

The dielectric film 3, second auxiliary magnetic film 4, first auxiliary magnetic film 5, magneto-optical recording film 6, and protective film 7 can be formed, for example, by the dry process such as continuous sputtering using a magnetron sputtering device.

An example of the preparation of a magneto-optical recording medium of the first type shown in FIG. 20, i.e., a magneto-optical disk sample, will be shown below.

The sample was prepared by forming, on a glass substrate having a preformat pattern, a dielectric film comprising an SiN film, a second auxiliary magnetic film comprising a $Gd_{25}Fe_{56}Co_{19}$ film (II), a first auxiliary magnetic film comprising a $Gd_{28}Fe_{53}Co_{19}$ film (I), a magneto-optical recording film comprising a $Tb_{21}Fe_{66}Co_{13}$ film, and a protective film comprising an SiN film in this order by a sputtering method. Table 1 shows the thicknesses and magnetic characteristics of the auxiliary magnetic films and the magneto-optical recording film. In this table, $T_C$ stands for the Curie temperatures, and $T_{CR}$ stands for the critical temperature at which each auxiliary magnetic film changes its form from a plane-magnetized film to a perpendicular-magnetized film.

TABLE 1

| | Material | Film thickness (nm) | $T_C$ (° C.) | $T_{CR}$ (° C.) |
|---|---|---|---|---|
| Magneto-optical recording film | TbFeCo | 50 | 270 | — |
| First auxiliary magnetic film | GdFeCo (I) | 60 | >400 | 200 |
| Second auxiliary magnetic film | GdFeCo (II) | 50 | >400 | 90 |

Figure 23:
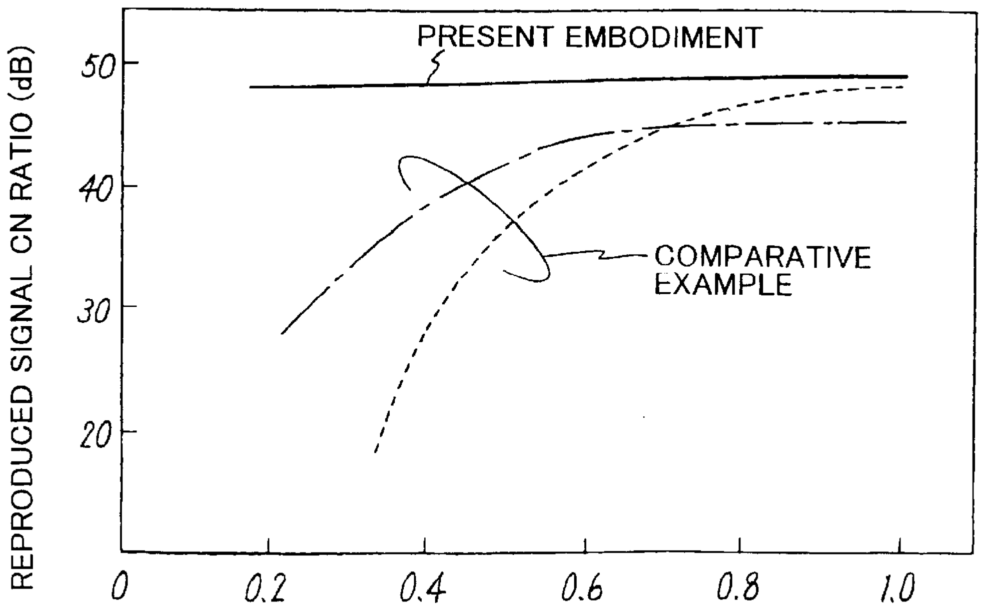
FIG. 23 is a graph showing the relation between reproduction C/N ratio and record mark length in a magneto-optical recording medium produced in Embodiment B1 and conventional types of magneto-optical recording media.

Test signals were recorded in a data record region of the thus produced disk by a optical magnetic filed modulation system which performs recording by modulating an external magnetic field in response to record signals while irradiating the disk with a laser beam in pulsed form with a constant period. The duty factor of the recording light pulses was 50%. The test signals were given so that record marks with various record mark lengths could be formed. Then, the record marks of various lengths were reproduced at a linear velocity of 7.5 m/sec, a read power of 2.5 mW and an external magnetic field during reproduction of zero by means of a pickup with an objective lens numerical aperture NA=0.55 and a laser wavelength of 780 nm. FIG. 23 shows the measured recording magnetic domain length dependence of the reproduction C/N ratio (C=carrier level, N=noise level).

Figure 24A:
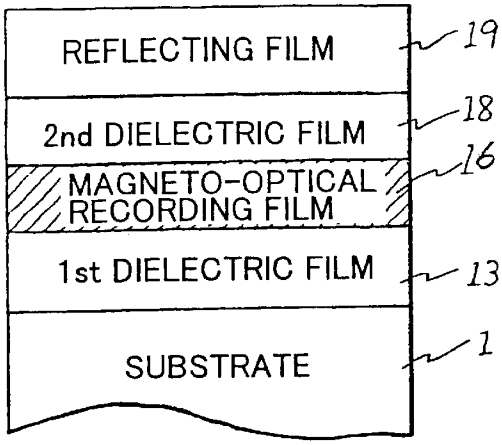
FIG. 24(A) is a sectional view showing the laminated structure of a magneto-optical recording medium of a conventional type.
Figure 24B:
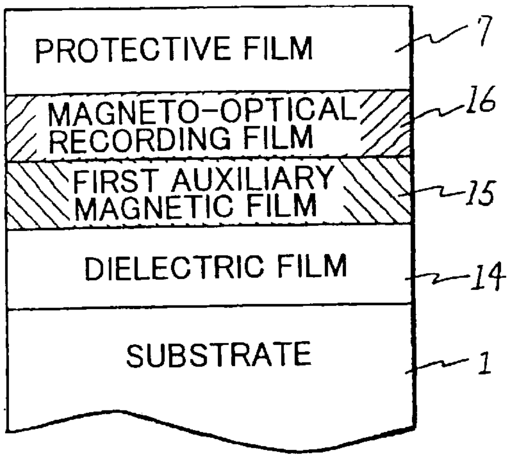
FIG. 24(B) is a sectional view showing the laminated structure of a magneto-optical recording medium of a magnetic super-resolution type.
Figure 25A:
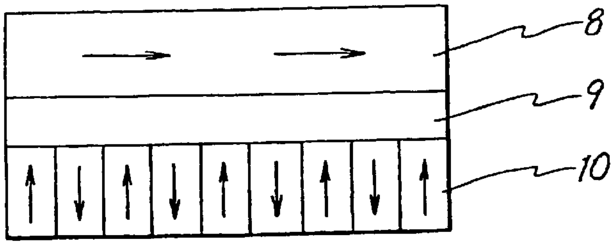
FIG. 25(A) is a conceptual view showing states of magnetization of layers of a second type of magneto-optical recording medium according to the-present invention before reproduction.
Figure 25B:
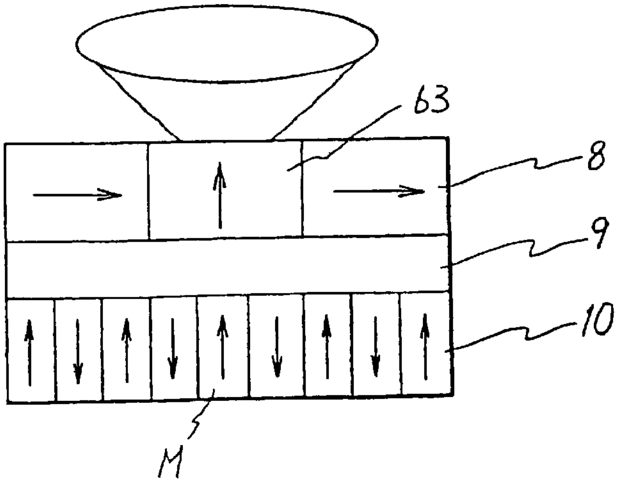
FIG. 25(B) is a conceptual view showing states of magnetization of layers of the magneto-optical recording medium during reproduction.

For comparison, FIG. 23 also shows data on two conventional types of magneto-optical recording media. The data expressed as a dashed line are data reproduced from the conventional type of magneto-optical recording medium shown in FIG. 24A, in which TbFeCo is used as a single layer of magneto-optical recording film 16. The data as a one-dot chain line are the results on a magnetic super-resolution (MSR) disk including two magnetic film layers, which are a TbFeCo magneto-optical recording film 16 and a GdFeCo first auxiliary magnetic film 15, as shown in FIG. 24B. From the results of FIG. 23, it is seen that the sample disk concerned with the instant embodiment (data are represented by a solid line) gives a markedly higher reproduction C/N ratio even at a record mark length of 0.2 $\mu$m in comparison with the two types of conventional disks. Thus, the use of this magneto-optical recording medium can reproduce record marks very tiny beyond the conventional reproduction limits, thereby increasing the recording density.

In the instant embodiment, the three magnetic films, i.e., magneto-optical recording film 6, first auxiliary magnetic film 5 and second auxiliary magnetic film 4, were laminated together and exchange-coupled. However, a nonmagnetic film may be interposed between the magneto-optical recording film 6 and the first auxiliary magnetic film 5 or/and between the first auxiliary magnetic film 5 and the second auxiliary magnetic film 4, whereby the adjacent magnetic films are magnetostatically coupled together.

In the instant embodiment, the two auxiliary magnetic films were used. However, a number "n" (n≧3) of auxiliary magnetic films may be laminated sequentially with the $T_{CR}$ (the critical temperature at which transformation from a plane-magnetized film into a perpendicular-magnetized film occurs) of each film set at $T_{CR1}>T_{CR2}> \ldots >T_{CRN}>$room temperature (where $T_{CRi}$ is the $T_{CR}$ of the "i"th auxiliary magnetic film). In this case, the first auxiliary magnetic film is provided on the side adjacent to the magneto-optical recording film 6, while the "n"th auxiliary magnetic film is provided on the side adjacent to the dielectric film 3.

To impart a desired shape to the temperature profile of the medium irradiated with a reproducing light beam, or to decrease the linear velocity dependence of the temperature profile, a thermal control film with a suitable heat conductivity may be provided on the protective film 7 of the magneto-optical recording medium 11.

In this embodiment, ordinary DC laser light was used for reproduction. However, as in Embodiment B2 to be described later, it is possible to perform reproduction with pulsed laser light having a frequency corresponding to the shortest mark length, thereby obtaining a better reproduction C/N ratio.

To obtain an even better reproduction C/N ratio, a reproducing magnetic film whose Kerr rotation angle θk at the peak temperature of the medium irradiated with reproducing light is not less than the θk of the second auxiliary magnetic film 4 and which is a perpendicular-magnetized film at or above room temperature may be additionally provided between the dielectric film 3 and the second auxiliary magnetic film 4.

Embodiment B2

This embodiment includes examples of a medium belonging to a magneto-optical recording medium of the second type suitable for the optical modulation domain magnifying and reproducing method, and a reproducing method for reproduction from this medium with reproducing laser light varied in a pulsed form. The magneto-optical recording medium used is a medium having a structure as shown in FIG. 26.

Production of Second Type of Magneto-Optical Recording Medium

Figure 26:
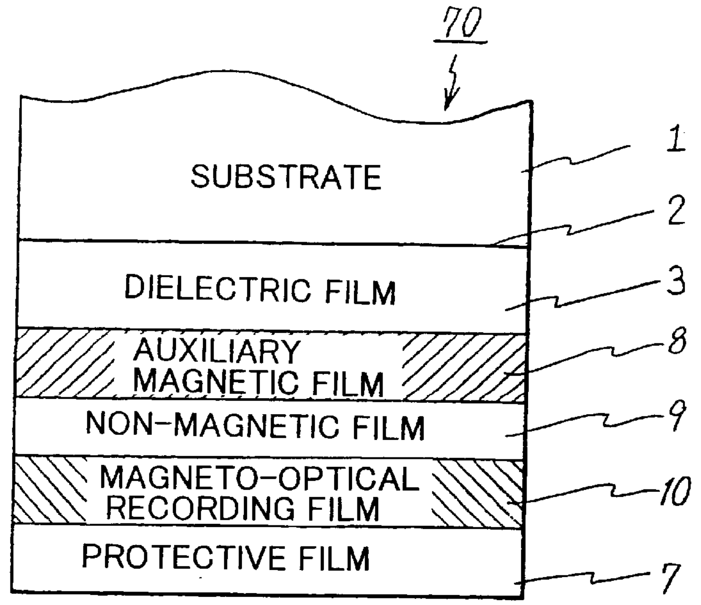
FIG. 26 is a view conceptually showing the laminated structure of the second type of magneto-optical recording medium.
Figure 27:
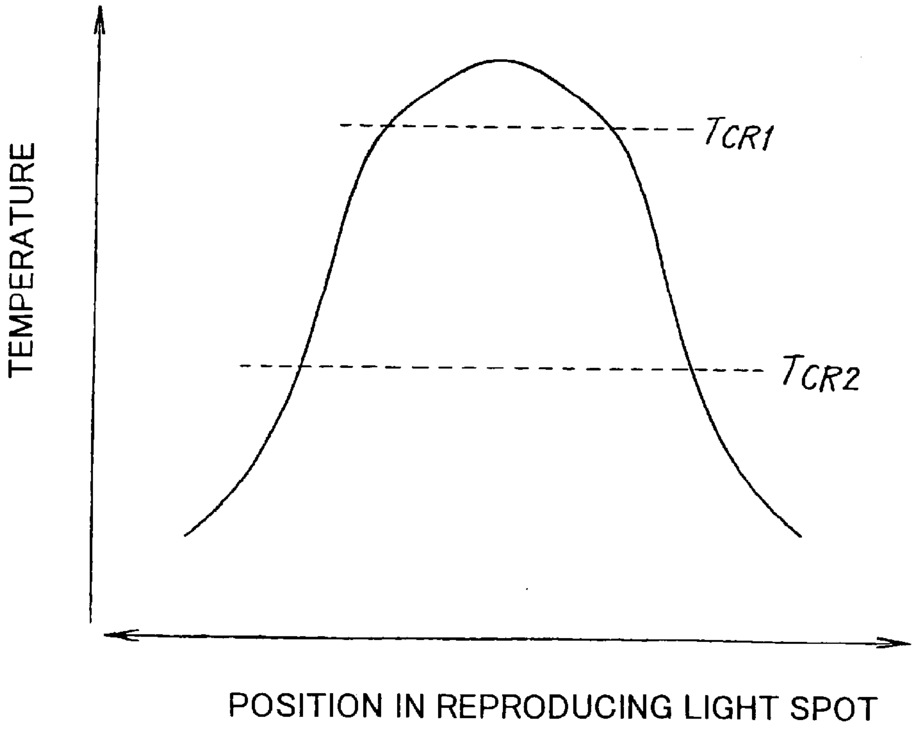
FIG. 27 is a graph showing a temperature profile of a readout area of the first type of magneto-optical recording medium being irradiated with reproducing light.
Figure 28:
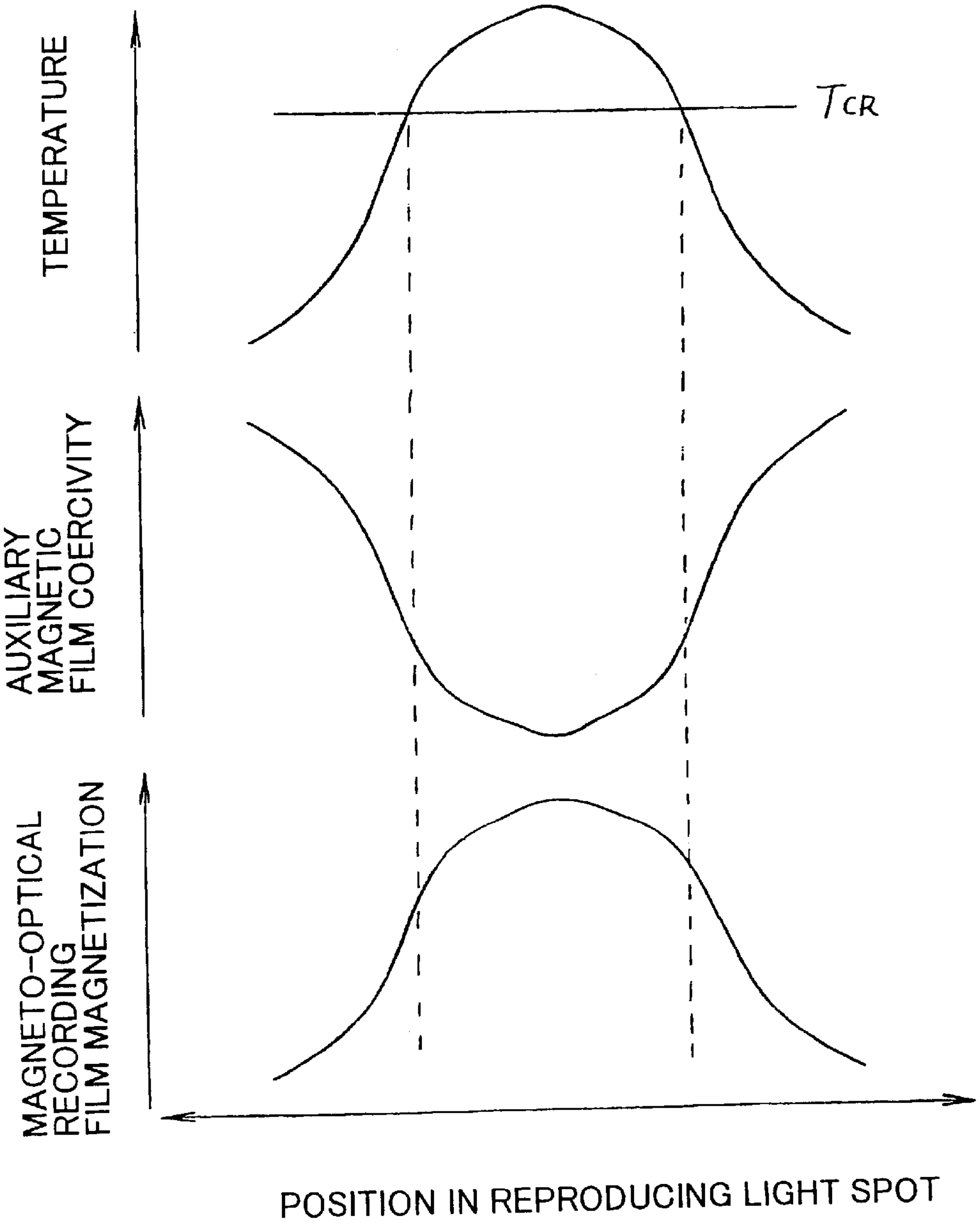
FIG. 28 is a graph showing temperature and coercivity profiles of the auxiliary magnetic film of the second type of magneto-optical recording medium and a magnetization profile of the magneto-optical recording medium.

The magneto-optical recording medium 70 shown in FIG. 26 includes a transparent substrate 1, which is a glass substrate. On one side of the glass substrate, a transparent resin film 2 having a preformat pattern transferred thereto is formed. A dielectric film 3 is made of SiN, and has such a thickness as to cause multiple interference of reproducing laser light, thereby increasing an apparent Kerr rotation angle. An auxiliary magnetic film 8 comprises a ferrimagnetic amorphous alloy of a rare earth metal and a transition metal, GdFeCo, and exhibits plane magnetic anisotropy from room temperature to a certain critical temperature $T_{CR}$ higher than room temperature and perpendicular magnetic anisotropy above $T_{CR}$. A nonmagnetic film 9 is made of SiN, and interposed to magnetostatically couple the auxiliary magnetic film 8 and a magneto-optical recording film 10 together. The magneto-optical recording film 10 comprises a ferrimagnetic amorphous alloy of a rare earth metal and a transition metal, TbFeCo, and exhibits perpendicular magnetic anisotropy from room temperature to the Curie temperature. A protective film 7 is made of SiN, and provided to protect the thin films laminated between the substrate 1 and the protective film 7 from adverse chemical influence of corrosion or the like.

The dielectric film 3, auxiliary magnetic film 8, nonmagnetic film 9, magneto-optical recording film 10 and protective film 7 were prepared to the following thicknesses by continuous sputtering using a magnetron sputtering device: 60 nm for the dielectric film 3, 60 nm for the auxiliary magnetic film 8, 20 nm for the nonmagnetic film 9, 50 nm for the magneto-optical recording film 10, and 60 nm for the protective film 7.

The composition of TbFeCo constituting the magneto-optical recording film 10 is $Tb_{21}Fe_{66}Co_{13}$ expressed as atomic ratio (%). In this composition, the magnetized components of the transition metals show predominant characteristics compared with the magnetized component of the rare earth metal from room temperature to the Curie temperature $T_{CO}$=270° C. The composition of GdFeCo constituting the auxiliary magnetic film 8, on the other h and, is $Gd_{28}Fe_{53}Co_{19}$ expressed as atomic ratio (%), and shows, as a single-layer film, the temperature characteristics of the Kerr rotation angle given in FIG. 29.

Figure 29:
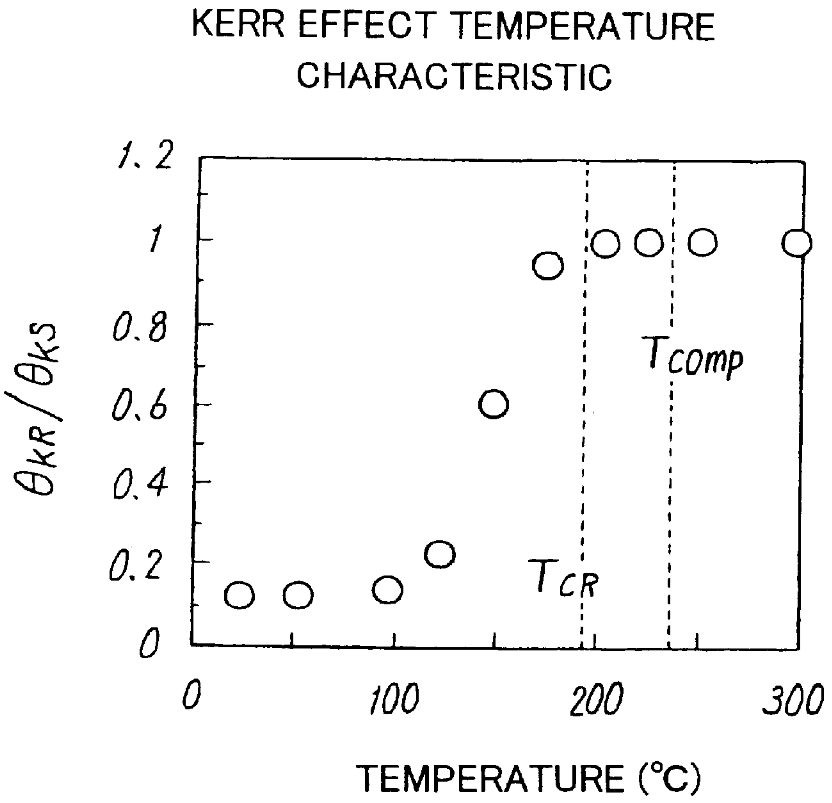
FIG. 29 is a graph showing the temperature characteristics of a Kerr effect of the auxiliary magnetic film of a magneto-optical recording medium produced by Embodiment B2.

The horizontal axis of FIG. 29 represents temperature, while the vertical axis represents the ratio of the residual Kerr rotation angle $\theta_{KR}$ to the saturated Kerr rotation angle $\theta_{KS}$ of the GdFeCo auxiliary magnetic film 8, i.e. , $\theta_{KR}/\theta_{KS}$, determined from the hysteresis of the Kerr rotation angle versus temperature. From this graph, one sees that the critical temperature $T_{CR}$ beyond which the auxiliary magnetic film 8 changes from a plane-magnetized film to a perpendicular-magnetized film is about 200° C. The auxiliary magnetic film 8 has a Curie temperature $T_c$ of 300° .C or higher, and also has a compensation temperature $T_{comp}$ between room temperature $T_{room}$ and the Curie temperature, the $T_{comp}$ being about 230° C. The relationship among the critical temperature $T_{CR}$, compensation temperature $T_{comp}$ and Curie temperature $T_C$ of the auxiliary magnetic film 8 and the Curie temperature $T_{CO}$ of the magneto-optical recording film 10 is as follows: $T_{room}<T_{CR}<T_{comp}<Tco<T_c$. Satisfaction of these conditions extremely facilitates reproduction using power-modulated pulsed light to be described later.

Figure 30:
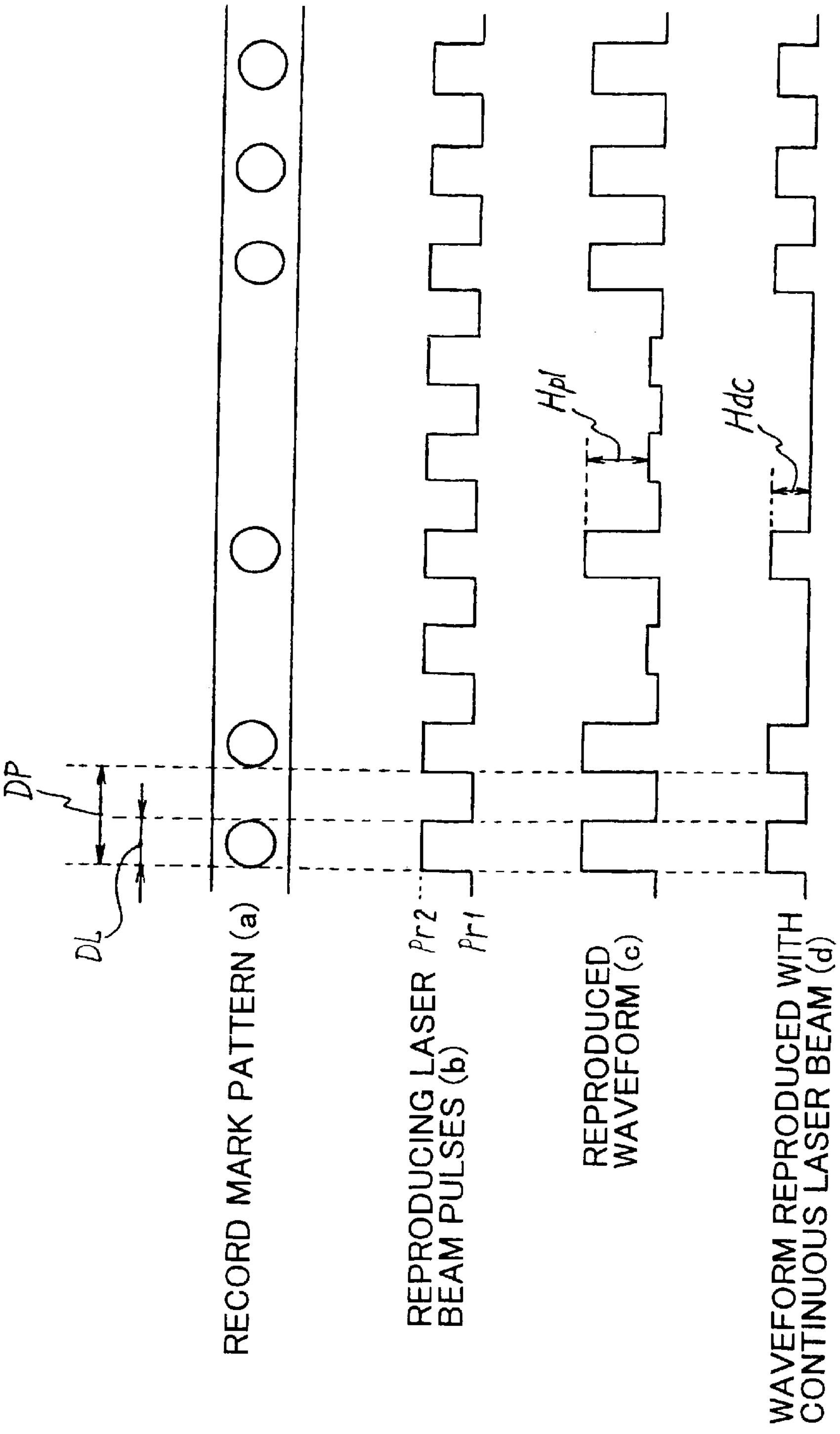
FIG. 30 is a timing chart showing the principle of a reproducing method for a magneto-optical recording medium.

Using the magneto-optical recording medium 70 of the foregoing structure, the reproducing method as explained in the description of the foregoing principle in connection with FIG. 30 will be carried out.

Preparatory Experiment for Determining Intensity of Reproducing Laser Pulse

In the optical modulation domain magnifying and reproducing method, a recording magnetic domain is magnified and reproduced with pulsed light obtained by power-modulating the laser power to have a high power Pr2 and a low power Pr1. Accordingly, a preparatory experiment is firstly performed to determine the optimum laser powers Pr2 and Pr1 for reproducing the data recorded on the magneto-optical recording medium 70. In this preparatory experiment, a magneto-optical drive comprising an optical system having a laser beam wavelength of 680 nm and a numerical aperture of 0.55 is used to radiate recording and reproducing laser beams onto the side of the substrate 1 (side of the auxiliary magnetic film 8). A continuous light beam is used as the reproducing laser beam as described later. The reproducing laser beam is changed to have various powers to observe respective reproduced signal waveforms.

While a laser beam having a recording power of 4.5 mW was modulated with a period of 640 ns and a pulse width of 213 ns, and while a recording magnetic field of 500 Oe was applied, optical modulation recording was performed at a linear velocity of 5.0 m/s on the track disposed at a radius of 40 mm of the previously initialized magneto-optical recording medium 70. Accordingly, recording marks each having a length of about 1.6 μm were continuously recorded at a pitch of 3.2 μm on the track.

Subsequently, the recording marks recorded on the track were reproduced with a continuous light beam having various reproducing powers Pr. In order to determine the optimum modulation condition for the reproducing power, the value of the power Pr of the continuous light beam was changed to be at five levels, i.e., Pr=1.0 mW, 1.5 mW, 1.9 mW, 2.0 mW and 2.1 mW to determine reproduced signals respectively. No magnetic field was actively applied to the magneto-optical recording medium 70 during the reproduction. However, a leakage magnetic field (about 80 Oe) leaked in the recording direction from the actuator of the optical head.

Figures 31A, 31B, 31C, 31D, 31E:
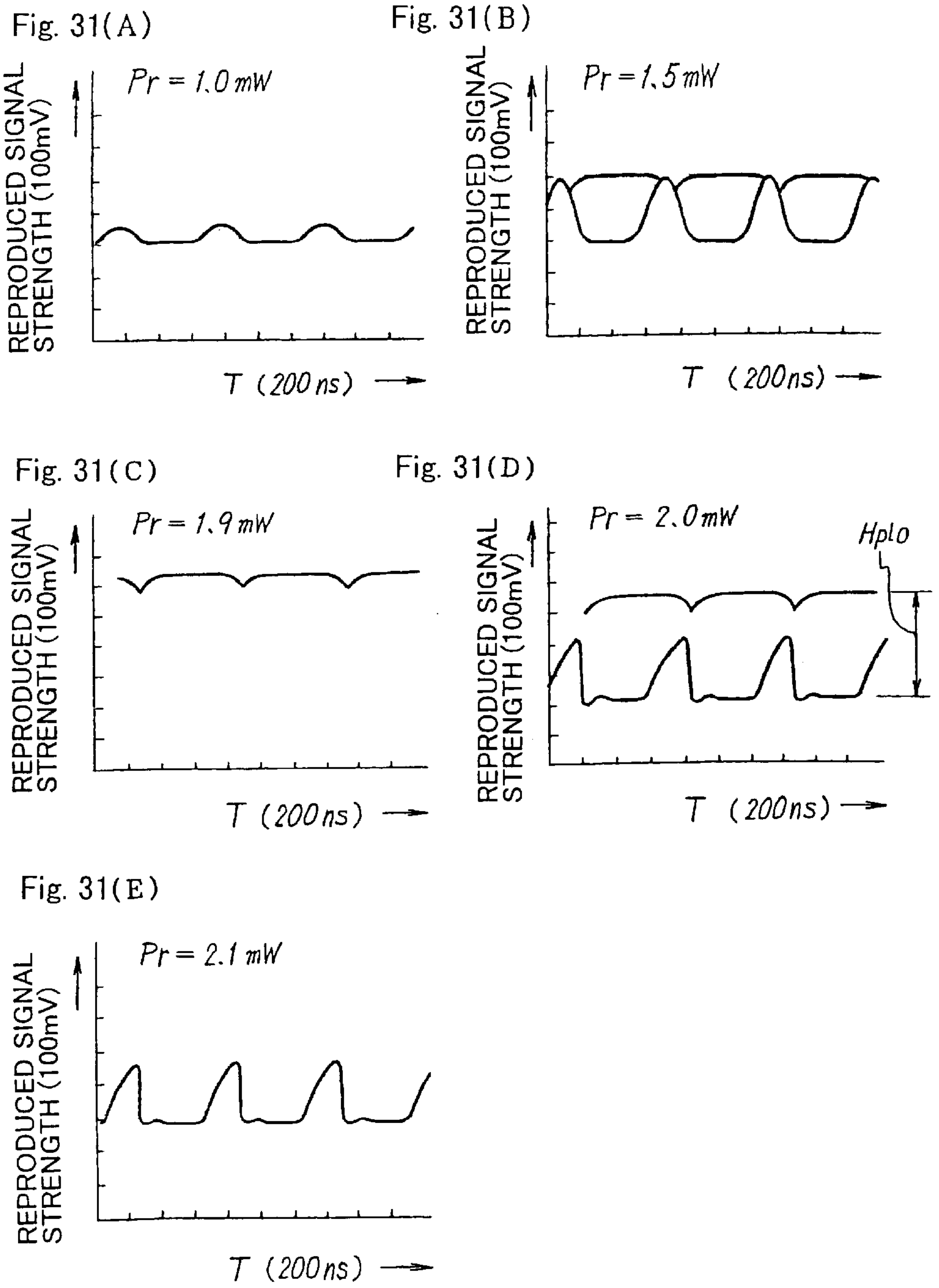
FIGS. 31(A) to 31(E) are graphs showing reproduced signal waveforms observed on an oscilloscope when information was reproduced from the magneto-optical recording medium of Embodiment B2 with continuous light varying in reproducing power.

FIGS. 31A to 31E show waveforms reproduced from the recording track of the magneto-optical recording medium 70 with the respective reproducing powers Pr. The reproduced waveforms themselves were triggered and observed by an oscilloscope. FIG. 31A shows the waveform reproduced with the reproducing light power Pr=1.0 mW, from which it is understood that the reproduced signals rise corresponding to the pattern of the recording marks. On the graph, the base line indicates an erased state, and the rising peak signals indicate recorded states. The amplitude between each recorded state and the erased state was 50 mV. When the reproducing light power was increased to Pr=1.5 mW, as shown in FIG. 31B, the signal amplitude was increased to about 200 mV. From the waveform shown in FIG. 31B, it is understood that the adjoining peak signals are continuous at the recorded states in a part of the area of the waveform.

FIG. 31C shows the signal waveform reproduced with the reproducing power of Pr=1.9 mW, indicating that the peak signals are completely continuous at the recorded states (at an upper portion in the drawing). This result demonstrates that the magnetic domains are magnified in the auxiliary magnetic film as described later, and the magnified magnetic domains move on the track in accordance with the scanning for the track with the reproducing light spot. When the reproducing light power is further increased to Pr=2.0 mW, as shown in FIG. 31D, the peak signals having been continuous begin to be discontinuous. In this case, the amplitude $H_{plo}$ between the connected portion of the peak signal and the base line was about 350 mV. When the reproducing light power was further increased up to Pr=2.1 mW, as shown in FIG. 31E, the peak signals are completely discontinuous, giving the waveform corresponding to the recording mark pattern. In FIG. 31E, the amplitude between each recorded state and the erased state was 200 mV.

Figure 32A:
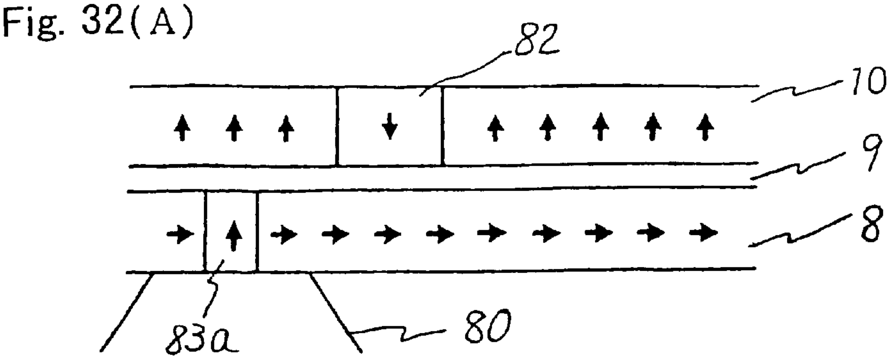
FIGS. 32(A) to 32(C) are conceptual views illustrating states of magnetization of layers of the magneto-optical recording medium from which the signal waveform shown in FIG. 31(A) is being obtained.
Figure 32B:
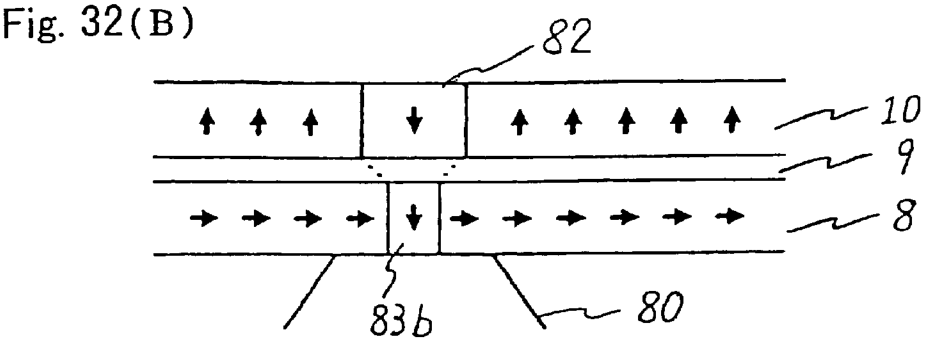

States of magnetization of the auxiliary magnetic film 8 and the magneto-optical recording film 10 stacked with the non-magnetic film 9 intervening therebetween, which are given when the reproduced waveforms shown in FIGS. 31A to 31E are obtained, will be explained with reference to the conceptual drawings shown in FIGS. 32 to 34. FIG. 32 shows a situation in which the signal waveform shown in FIG. 31A is obtained (reproducing light power Pr=1.0 mW), illustrating the relationship between the reproducing light spot 80 and the directions of magnetization of the auxiliary magnetic film 8 and the magneto-optical recording film 10 which are irradiated with the reproducing light spot 80. At first, the auxiliary magnetic film 8 irradiated with the reproducing light spot 80 as shown in FIG. 32A exhibits perpendicular magnetization in an area where its temperature is raised to be not lower than the critical temperature TCR. At the same time, the magnetization of the magneto-optical recording film 10 is transferred to an area 83*a* of the auxiliary magnetic film by the aid of the magnetostatic coupling. As shown in FIG. 32B, when the reproducing light spot 80 is disposed just under a magnetic domain (recording magnetic domain) 82 magnetized in the recording direction, the magnetization of the recording magnetic domain 82 is transferred to the auxiliary magnetic film 8 by the aid of the magnetostatic coupling. In this case, the reproducing light power Pr is 1.0 mW which is low. Therefore, only the central portion of the auxiliary magnetic film 8 within the light spot 80, i.e., only the area 83*b* has the temperature which exceeds the critical temperature TCR. The transferred area 83*b* of the auxiliary magnetic film 8 is not magnified to be larger than the width of the recording magnetic domain 82. Accordingly, as shown in FIG. 31A, the reproduced signal strength is small. When the reproducing light spot 80 passes over the recording magnetic domain 82, a transferred area 83*c* has the same direction of magnetization as that of the magnetic domain in the magneto-optical recording film 10 located just thereover, as a result of transfer from the magnetic domain in the magneto-optical recording film 10 located just thereover.

Figure 33A:
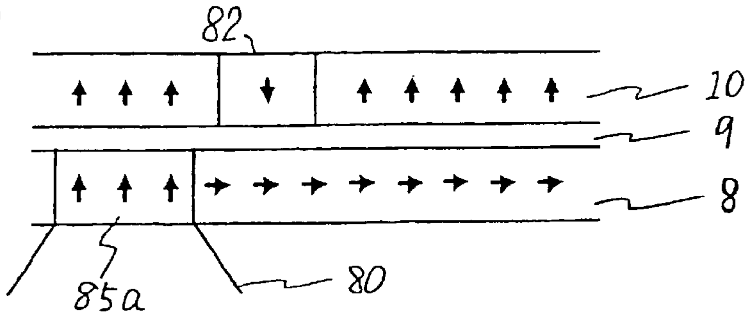
FIGS. 33(A) to 33(C) are conceptual views illustrating states of magnetization of layers of the magneto-optical recording medium from which the signal waveform shown in FIG. 31(C) is being obtained.
Figure 33B:
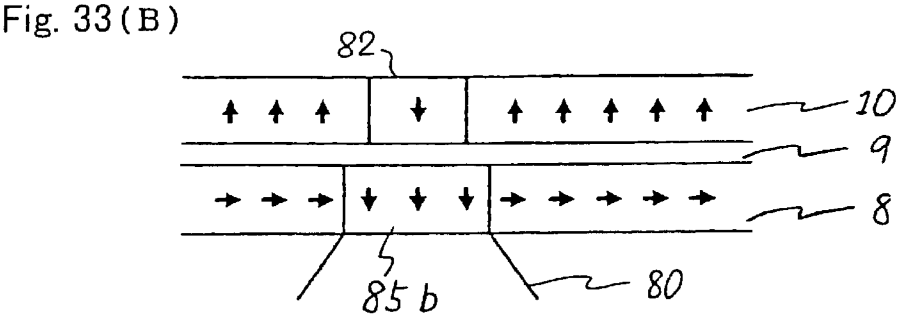

FIG. 33 shows a situation in which the signal waveform shown in FIG. 31C is obtained (reproducing light power Pr=1.9 mW), illustrating the relationship between the reproducing light spot 80 and the directions of magnetization of the auxiliary magnetic film 8 and the magneto-optical recording film 10 which are irradiated with there producing light spot 80. In this case, the reproducing light power is 1.9 mV which is relatively large. Therefore, as shown in FIG. 33A, an entire area 85*a* within the spot in the auxiliary magnetic film 8 irradiated with the reproducing light spot 80 has a temperature raised to be not less than the critical temperature $T_{CR}$, and is perpendicularly magnetized. The magnetic domain in the magneto-optical recording film 10 is transferred to the area 85*b* by the aid of the magnetostatic coupling effected by the magneto-optical recording film 10. When the reproducing light spot 80 is subjected to scanning to locate the reproducing light spot 80 just under the recording magnetic domain 82 as shown in FIG. 33B, the magnetization of the recording magnetic domain 82 is transferred. In this case, the area 85*b* of the auxiliary magnetic film 8, which is heated to a temperature not less than the critical temperature $T_{CR}$, is wider than the recording magnetic domain 82. Accordingly, the recording magnetic domain 82 is transferred while magnified in the auxiliary magnetic film 8. The large signal waveform is obtained owing to the magnification of the magnetic domain. After the reproducing light spot 80 passes over the recording magnetic domain 82, the area 85*c* maintains the same state of magnetization as that of the area 85*b*. Therefore, the waveform in which the reproduced signal peaks are continuous as shown in FIG. 31C is obtained.

Figure 32C:
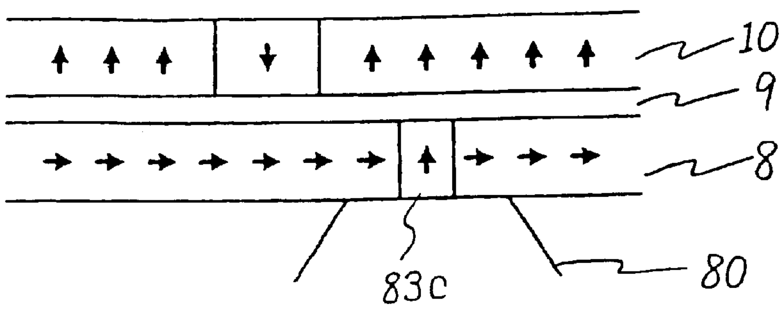
Figure 33C:
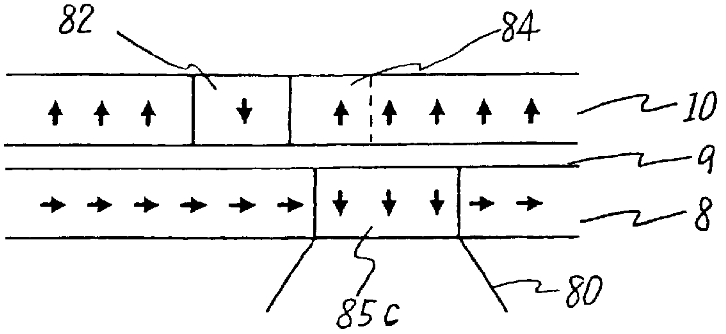

In the case of the situation shown in FIG. 33, the area 85*c* maintains the same state of magnetization as that of the area 85*b* after the reproducing light spot 80 passes over the recording magnetic domain 82. A phenomenon arises in which the light spot draws the recording magnetic domain transferred to the auxiliary magnetic layer 8 and subjected to the magnetic domain transfer and the magnetic domain magnification. The reason for this phenomenon is considered to be as follows. By being irradiated with the reproducing laser beam, the auxiliary magnetic layer 8 is heated to a temperature not less than the critical temperature, and converted into a perpendicularly magnetizable film having a perpendicular coercive force Hc. During the reproduction, an external magnetic field Hex (in the recording direction, i.e., downward in this embodiment) and a static magnetic field Hs are applied to the auxiliary magnetic film 8. The external magnetic field Hex is caused by the leakage magnetic field, for example, from the actuator of the optical head. The static magnetic field Hs is generated from the magnetization of the magneto-optical recording film 10 at or above the critical temperature of the auxiliary magnetic film 8. The magnitude of the applied magnetic fields is Hex+Hs (when the magnetization of the recording magnetic domain is downward) or Hex−Hs (when the magnetization of the recording magnetic domain is upward) depending on the direction of the magnetization of the magneto-optical recording film 10. If the absolute value of Hc is larger than the absolute value of (Hex+Hs) or the absolute value of (Hex−Hs) concerning the magnitude of the combined magnetic field of the external magnetic field Hex and the static magnetic field Hs and the magnitude of the coercive force Hc of the auxiliary magnetic film 8, the magnetization formed in the auxiliary magnetic film 8 is maintained as it is. In this case, as shown in FIG. 33C, the magnetic domain once transferred to the auxiliary magnetic film does not cause reinversion even when the reproducing spot proceeds to the area in which no recording magnetic domain exits in the magneto-optical recording film 10. Hc is the perpendicular coercive force obtained when the auxiliary magnetic film 8 is in the perpendicular state of magnetization. In the case of the situation shown in FIG. 32, Hc of the auxiliary magnetic film is lower than that in FIG. 33, because the temperature of the auxiliary magnetic layer subjected to transfer by the low reproducing power is relatively low. Accordingly, the magnetic domain transferred to the auxiliary magnetic film 8 causes reinversion when the reproducing spot proceeds to the area in which no recording magnetic domain exists in the magneto-optical recording film 10 (FIG. 32C).

Figure 34A:
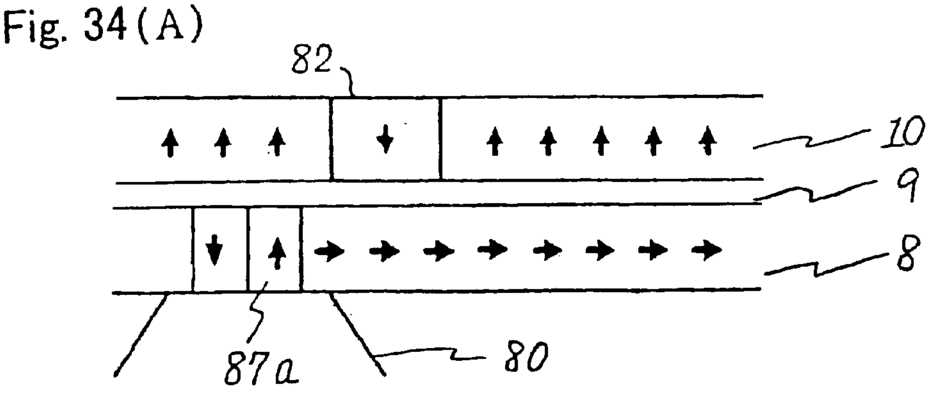
FIGS. 34(A) to 34(C) are conceptual views illustrating states of magnetization of layers of the magneto-optical recording medium from which the signal waveform shown in FIG. 31(E) is being obtained.
Figure 34B:
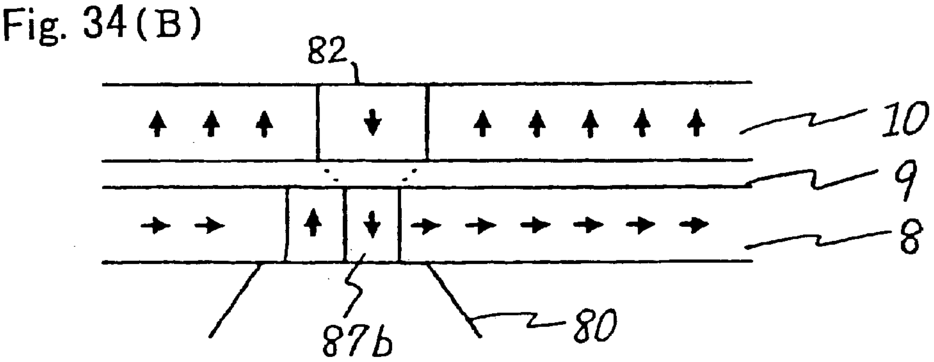
Figure 34C:
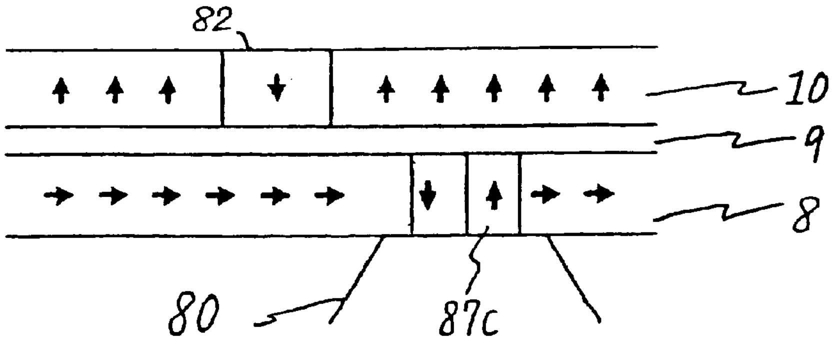

FIG. 34 shows a situation in which the signal waveform shown in FIG. 31E is obtained (reproducing light power Pr=2.1 mW), illustrating the relationship between the reproducing light spot 80 and the directions of magnetization of the auxiliary magnetic film 8 and the magneto-optical recording film 10 which are irradiated with the reproducing light spot 80. In this case, the reproducing light power is 2.1 mW which is relatively large. Therefore, a front area 87*a* within the spot in the auxiliary magnetic film 8 irradiated with the reproducing light spot 80 has a temperature raised to be not less than the critical temperature $T_{CR}$, giving perpendicular magnetization, and it is subjected to magnetic domain transfer of the magnetic recording layer 10 located just thereunder. However, the central and back areas within the spot are heated intensely as compared with the front area to exceed the compensation temperature Tcomp of the auxiliary magnetic film 8. Therefore, it is considered that the magnetization is inverted (detailed reason for inversion of magnetization will be described later on in the specified embodiment of the second reproducing method). Accordingly, as shown in FIG. 34A, only the front area 87*a* of the auxiliary magnetic film within the reproducing light spot 80 has the magnetization in the upward direction, and the central area and the back end area have the magnetization in the downward direction.

Subsequently, when the track is scanned with the reproducing light beam so that the spot 80 is located just under the recording magnetic domain 82, the magnetization of the recording magnetic domain 82 is transferred to only the area 87*b* having the relatively low temperature disposed at the front portion of the auxiliary magnetic film 8. Therefore, no magnetic domain magnification occurs, and it is impossible to obtain a signal as shown in FIG. 31C having large reproduced signal strength. When the reproducing light spot 80 passes over the recording magnetic domain 82, the transfer area 87*c* includes the magnetization having the same direction as that of the magnetic domain in the magneto-optical recording film 10 disposed just thereover and the inverted magnetic domain thereof in a mixed manner by the aid of the magnetostatic coupling effected by the magneto-optical recording film 10.

In the case of the situation shown in FIG. 33 (FIG. 31C), the reproduced signal strength is increased because the magnetic domain magnification occurs in the auxiliary magnetic film 8 as described above. The magnetic domain 85*b*, which is magnified from the recording magnetic domain 82, moves together with the reproducing light spot 80 while being magnified. However, in the situation shown in FIG. 33C, when the center of the reproducing light spot 80 is located just under a magnetic domain 84 adjacent to the recording magnetic domain 82, it is necessary to avoid the phenomenon in which the magnified magnetic domain is drawn by the light spot, in order to reproduce the magnetization of the magnetic domain 84 by the aid of the auxiliary magnetic layer 8. That is, it is necessary to erase the magnified magnetic domain 85*c* of the recording magnetic domain 82, transfer the magnetization of the magnetic domain 84 to the auxiliary magnetic layer 8 and then magnify the magnetic domain in the auxiliary magnetic layer 8.

On the other hand, as shown in FIG. 32 (corresponding to FIG. 31A) and FIG. 34 (corresponding to FIG. 31E) respectively, when the reproducing power Pr is relatively small (reproducing light power Pr=1.0 mW), and when the reproducing power Pr is relatively large (reproducing light power Pr=2.1 mW), the magnetic domain 83*b* (87*b*) transferred from the recording magnetic domain 82 is extinguished after the reproducing light spot 80 passes over the recording magnetic domain 82. That is, the phenomenon in which the magnified magnetic domain is drawn does not take plate. Therefore, if the reproducing light beam is pulsed light power-modulated at a reproducing clock period or a period which is an integral number of times as large as the reproduction clock period between the reproducing light power Pr=1.9 mW at which the magnetic domain magnification occurs and the reproducing light power Pr=2.1 mW (or 1.0 mW) at which the magnetic domain magnification does not occur, the magnetic domain can be magnified, and the magnified domain can be extinguished when the center of the reproducing light spot is moved from the recording magnetic domain in the magneto-optical recording film onto the adjacent recording magnetic domain.

According to the result of the preparatory experiment described above, if the reproducing laser beam is applied as pulsed light which is intensity-modulated between Pr=1.9 mW as shown in FIG. 31C and Pr=2.1 mW as shown in FIG. 31E, the reproduced signal is detected as a difference between the reproduced signal intensities obtained as shown in FIG. 31C and FIG. 31E. The difference is considered to correspond to $H_{plo}$=350 mV shown in FIG. 31D, suggesting that the reproduction can be performed with amplitude which is larger than the amplitudes obtained in FIGS. 31A and 31E. Therefore, in the following experiment in reproduction with reproducing light pulses, the high power Pr2 is set to be Pr2=2.1 mW, and the low power Pr1 is set to be Pr1=1.9 mW.

First Method of Reproduction From Magneto-Optical Recording Medium With Power-Modulated Pulsed Light After the magneto-optical recording medium 70 produced in this embodiment was initialized, optical modulation recording was performed on the track at a radius of 40 mm at a linear velocity of 5.0 m/s with a recording magnetic field of 500 Oe and a laser beam having a recording power of 6.3 mW modulated with a period of 320 ns and a pulse width of 53.3 ns. This is equivalent to a condition in which recording marks of about 1.6 μm were continuously recorded at a pitch of 3.2 μm.

Figure 35:
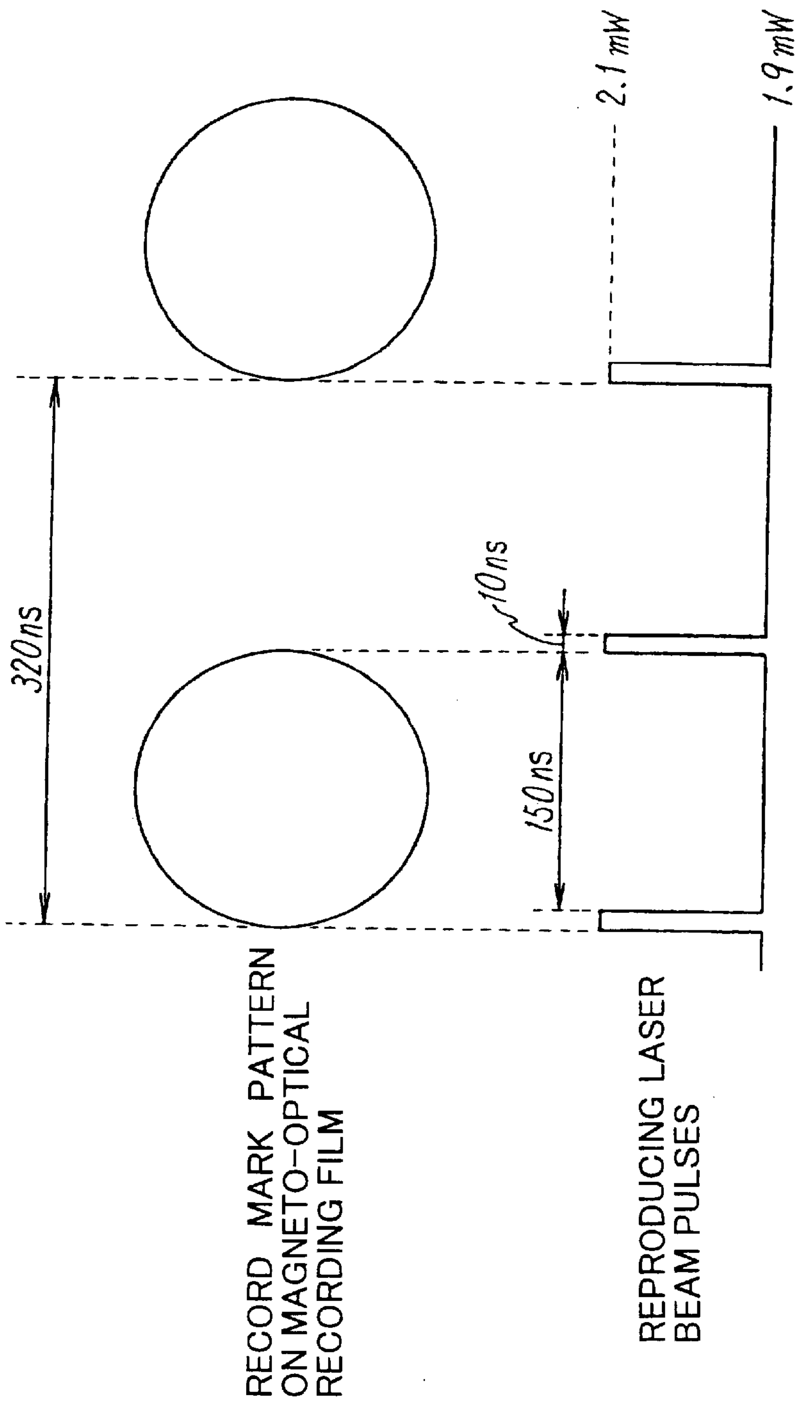
FIG. 35 shows the timing of radiation with respect to record marks of reproducing pulsed light modulated with reproducing powers Pr1 and Pr2 determined by preliminary experiments in Embodiment B2.

The recording track of the magneto-optical recording medium 70 thus subjected to the recording is irradiated with the power-modulated pulse laser having the reproducing light laser powers of Pr2=2.1 mW and Pr1=1.9 mW as determined by the preparatory experiment so that reproduction is performed. As shown in FIG. 35, the reproducing laser pulses were adjusted to give Pr2=2.1 mW in a pulse width of 10 ns starting from the front end of a recording mark and Pr1=1.9 mW in a pulse width of 150 ns following thereafter. No magnetic field was actively applied during the reproduction. However, a leakage magnetic field (about 80 Oe) was generated in the recording direction from the actuator of the optical head.

Figure 36:
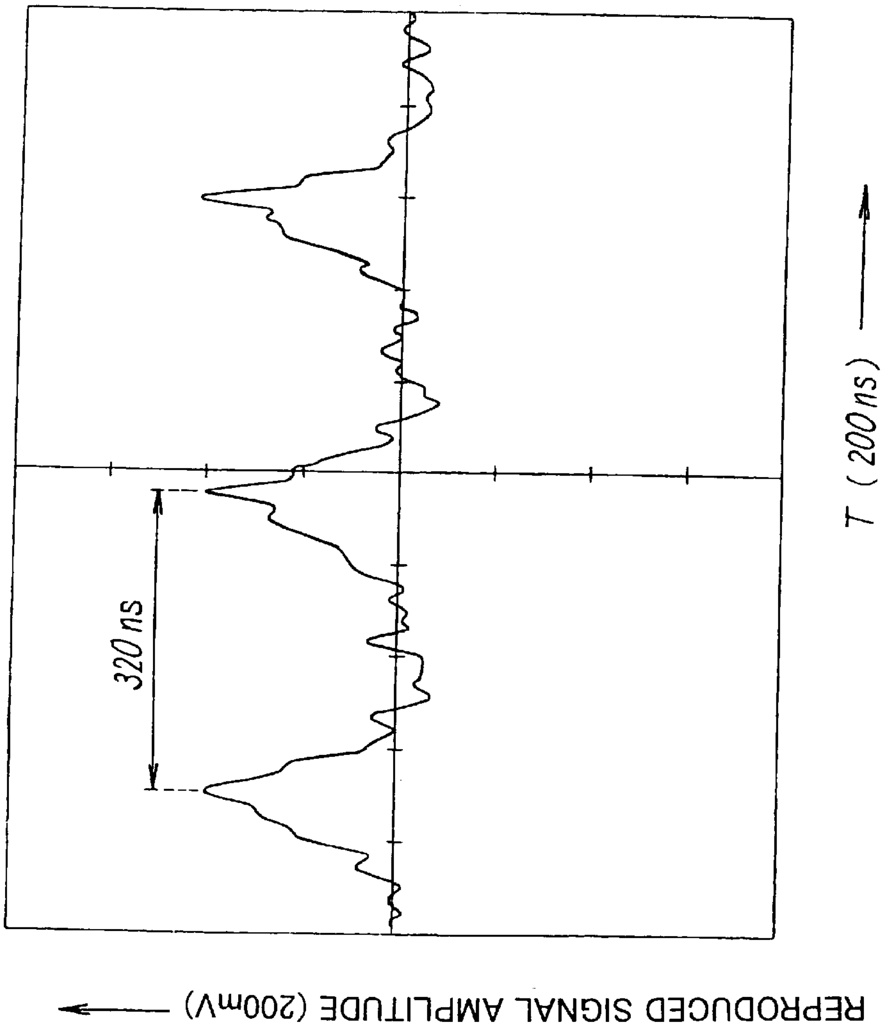
FIG. 36 is a graph showing a reproduced signal waveform obtained by reproduction with the reproducing pulsed light shown in FIG. 35.

An obtained reproduced signal waveform is shown in FIG. 36. The obtained reproduced signal had an amplitude of about 220 mV corresponding to the recording marks. When a mark pattern recorded under the same condition was subjected to reproduction with continuous light having constant reproducing powers of Pr=1.0 mW and Pr=2.1 mW, the amplitudes were 100 mV and 170 mV respectively. According to these results, it is understood that the reproduction with the reproducing light beam which is power-modulated in pulsed form makes it possible to magnify and transfer a recording magnetic domain in a form synchronized with a reproducing clock and extinguish the magnetic domain immediately thereafter, and the reproduction can be performed with higher C/N when the magnetic domain is magnified.

In this embodiment, the pulse laser intensities, i.e., the high power Pr2=2.1 mW and the low power Pr1=1.9 mW were selected. The low power pulses were used to generate magnified magnetic domains, and the high power pulses were used to extinguish magnified magnetic domains. However, the high power pulses may be Pr2=1.9 mW to generate magnified magnetic domains, and the low power pulses may be Pr1=1.0 mW to extinguish magnified magnetic domains. The illustrative case shown in FIG. 30 used to explain the principle is representative of the latter case. The pulse width ratio between the high and low power pulses, i.e., the duty is not limited to those shown in FIGS. 30 and 35. The duty may be appropriately changed in order to obtain an enhanced reproduced signal.

The magneto-optical recording medium produced in this Embodiment B2 may comprise a heat control layer having an appropriate heat conductivity disposed on its protective film in order to give a desired shape for the temperature profile of the medium obtained when the reproducing light beam is radiated, or in order to decrease the linear velocity dependency of the temperature profile. Further, in order to obtain a better reproducing CN ratio, it is also allowable to add, between the dielectric film 3 and the auxiliary magnetic film 8, a reproducing magnetic film which is a perpendicularly magnetizable film at or above room temperature in which the Kerr rotation angle θk is not less than θk of the auxiliary magnetic film at the maximum arrival temperature of the medium when the reproducing light beam is radiated.

Embodiment B3

Second Method of Reproduction From Magneto-Optical Recording Medium With Power-Modulated Pulsed Light In the foregoing embodiment of the reproducing method, the leakage magnetic field generated from the magnetic head is applied to the magneto-optical recording medium during reproduction. In this embodiment, reproduction is performed while actively applying a DC magnetic field in the same direction as the direction of magnetization of a recording magnetic domain. In this embodiment as well, reproduction was performed by modulating the laser beam intensity in order to realize magnification and extinguishment of transferred magnetic domains.

Figure 37:
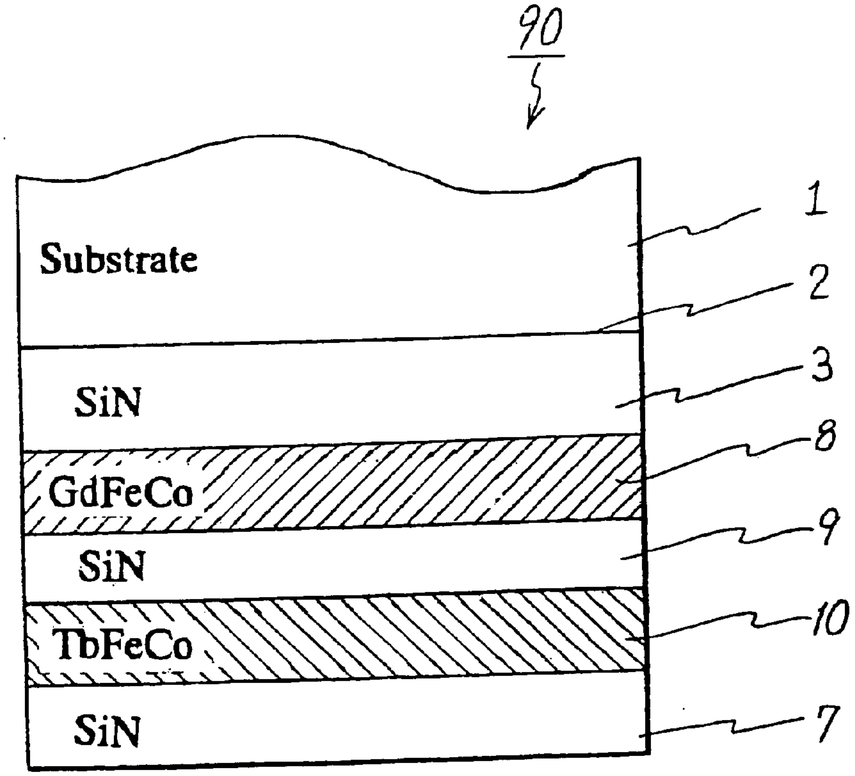
FIG. 37 is a view conceptually showing the laminated structure of a magneto-optical recording medium for use with a second reproducing method according to the present invention.

At first, explanation will be made for a magneto-optical disk used in this embodiment. As shown in FIG. 37, the magneto-optical disk 90 comprises, on a polycarbonate substrate 1 in a stacked manner, a dielectric layer 3 composed of SiN, a reproducing layer (auxiliary magnetic film) 8 composed of a GdFeCo alloy, a non-magnetic layer 9 composed of SiN, a recording layer (magneto-optical recording film) 10 composed of a TbFeCo alloy, and a protective layer 7 composed of SiN. The TbFeCo recording layer 10 and the GdFeCo reproducing layer 8 are coupled magnetostatically with the non-magnetic layer 9 interposed therebetween. The GdFeCo reproducing layer 8 is a magnetic film which is an in-plane magnetizable film at room temperature and which is changed into a perpendicularly magnetizable film above a critical temperature Tcr. The GdFeCo reproducing layer 8 used in this embodiment has a critical temperature Tcr of 175° C. and a Curie temperature Tc of 340° C. The GdFeCo reproducing layer 8 has a compensation temperature Tcomp=240° C. between the critical temperature Tcr and the Curie temperature Tc. The TbFeCo recording layer 10 has its Curie temperature Tco of 270 ° C. and its compensation temperature Tcomp' equal to or lower than room temperature. That is, there is given the relationship of Troom<Tcr<Tcomp<Tco<Tc. The relationship concerning the temperatures has been explained with reference to FIG. 39.

When a recording signal recorded in the recording layer 10 of the magneto-optical recording medium 90 is reproduced, the reproducing power is modulated to have two powers in synchronization with a reproducing clock or the integral multiple thereof (a recording clock or the integral multiple thereof), as explained concerning the principle of the foregoing reproducing method. The reduction and the extinguishment of a magnified magnetic domain may occur at any one of the low power and the high power as described above. However, in this embodiment, the reproducing light beam for transferring and magnifying a magnetic domain was modulated to have the low power, and the reproducing light beam for reducing or extinguishing a magnified magnetic domain was modulated to have the high power. The power levels are applied while the magneto-optical disk is irradiated with a reproducing light beam scanning a recording track.

An optical head having a wavelength of 680 nm and a numerical aperture of the lens of 0.55 was used as a light source for recording and reproduction. Recording was performed on the magneto-optical disk 90 shown in FIG. 37 by using the light pulse intensity modulation method. The recording was performed under a condition of a linear velocity of 5 m/s, a recording period of 320 ns, a recording laser power of 7.5 mW, a pulse width of 53.3 ns, and a recording magnetic field of 500 Oe. Recording magnetic domains of 0.8 $\mu$m were recorded at intervals of 0.8 $\mu$m corresponding to data including, for example, 1 and 0. The recorded magnetic domains are shown in FIG. 38(*a*) together with the recording signal.

The recording magnetic domains were subjected to reproduction under the following reproducing condition. The linear velocity was 5.0 m/s. The reproducing laser power was modulated to have two power levels of 1.5 mW as the low power Pr1 for magnifying a magnetic domain and 3.5 mW as the high power Pr2 for reducing (or extinguishing) a magnetic domain. A timing signal for the reproducing light power is shown in FIG. 38(*b*). The modulation period for the reproducing power was 160 ns. Radiation was performed for 150 ns at the low power Pr1, and radiation was performed for 10 ns at the high power Pr2. A constant direct current magnetic field was used as the reproducing magnetic field, which was applied at about 80 Oe in the recording direction. This magnetic field may be replaced with the leakage magnetic field from the objective lens actuator as in the first reproducing method (Embodiment B2).

Figure 38:
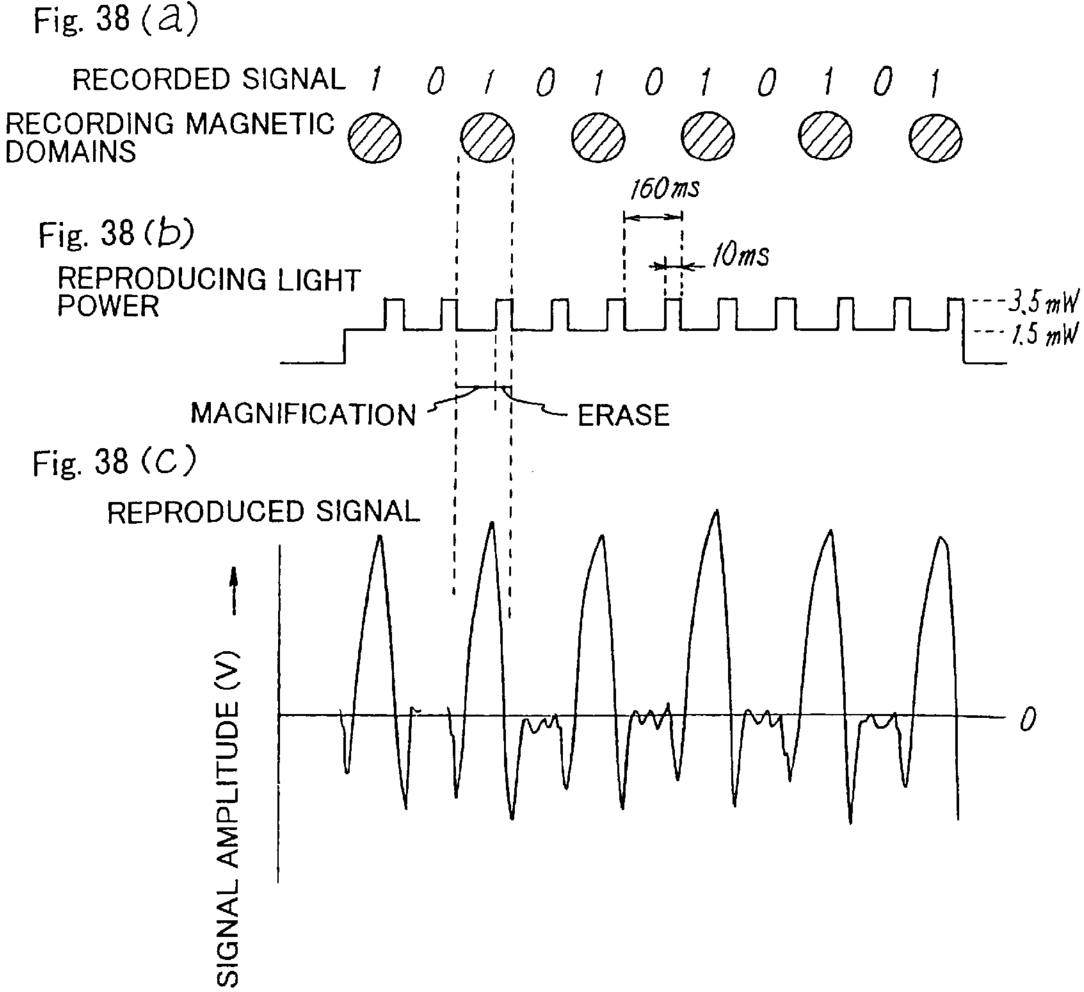
FIGS. 38(*a*)–(*c*) is a timing chart illustrating the principle of a reproducing method for a magneto-optical recording medium.

FIG. 38(*c*) shows the obtained reproduced signal waveform, from which it is understood that the signal is enhanced only at portions where the recording magnetic domains exist, and the signal is not enhanced at portions where the recording magnetic domains do not exist. This fact means that, only when the reproducing light beam scans a portion of the track at which a recording magnetic domain exists, the recording magnetic domain is transferred and magnified in the reproducing layer. The reproduced signal was obtained in accordance with the magnetically induced super resolution mode. That is, the reproduced signal was amplified to have the magnitude which was about 1.5 times the reproduced signal obtained by reproduction without magnifying the magnetic domain subjected to the magnetic domain transfer. The amplifying effect on the reproduced signal was remarkably effective for further minute recording magnetic domains. Even when minute magnetic domains of not more than 0.4 $\mu$m were subjected to recording, it was possible to obtain a reproduced signal output of 80% (ratio to the saturated amplitude) with respect to the saturated amplitude (difference between the reproduced signal obtained when all magnetization in the reproducing layer was in the downward direction and the reproduced signal obtained when all magnetization in the reproducing layer was in the upward direction).

Figure 39:
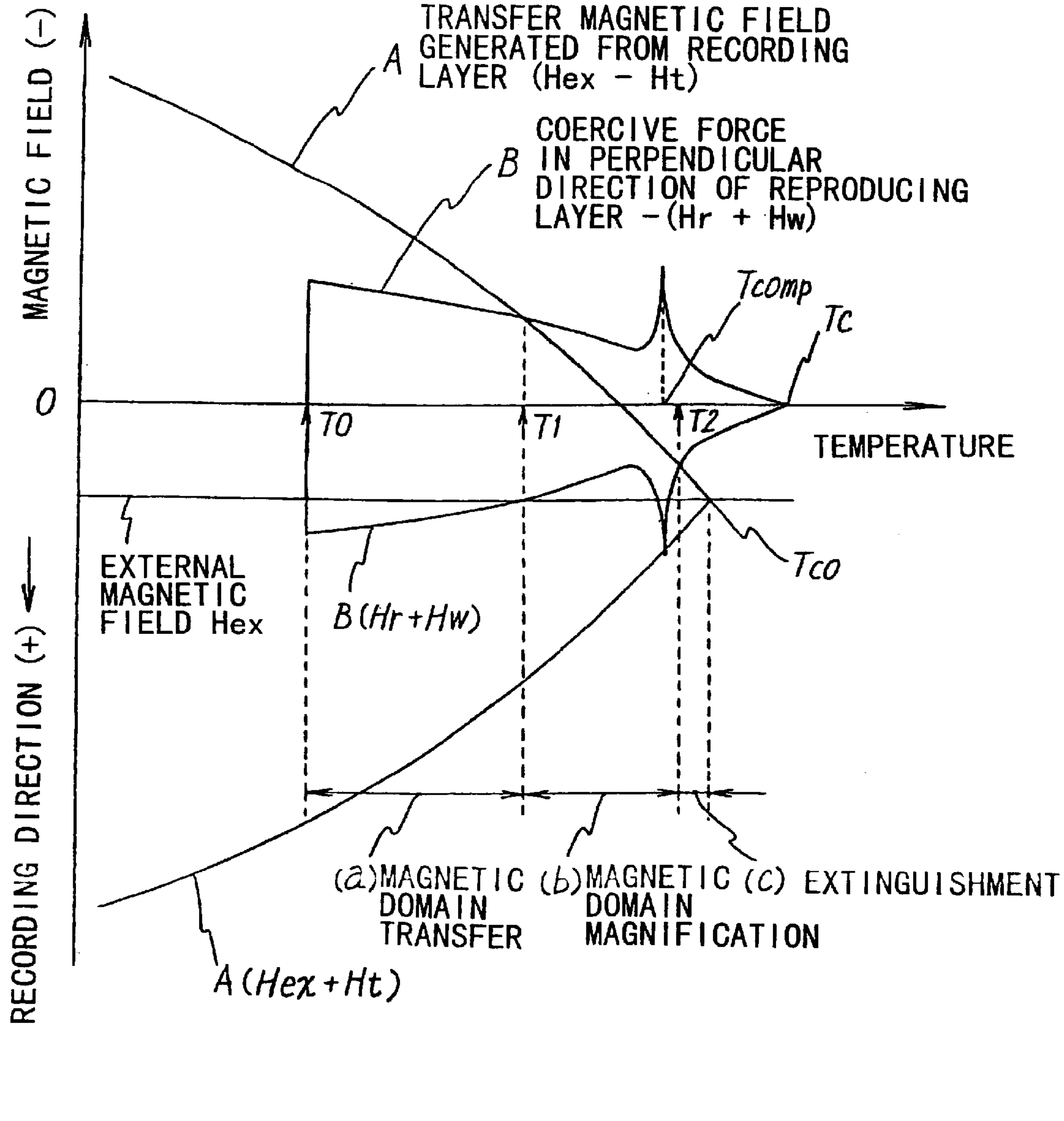
FIG. 39 shows the magnetic temperature characteristics of the magneto-optical recording and reproducing layers of a magneto-optical recording medium.
Figures 40A, 40B:
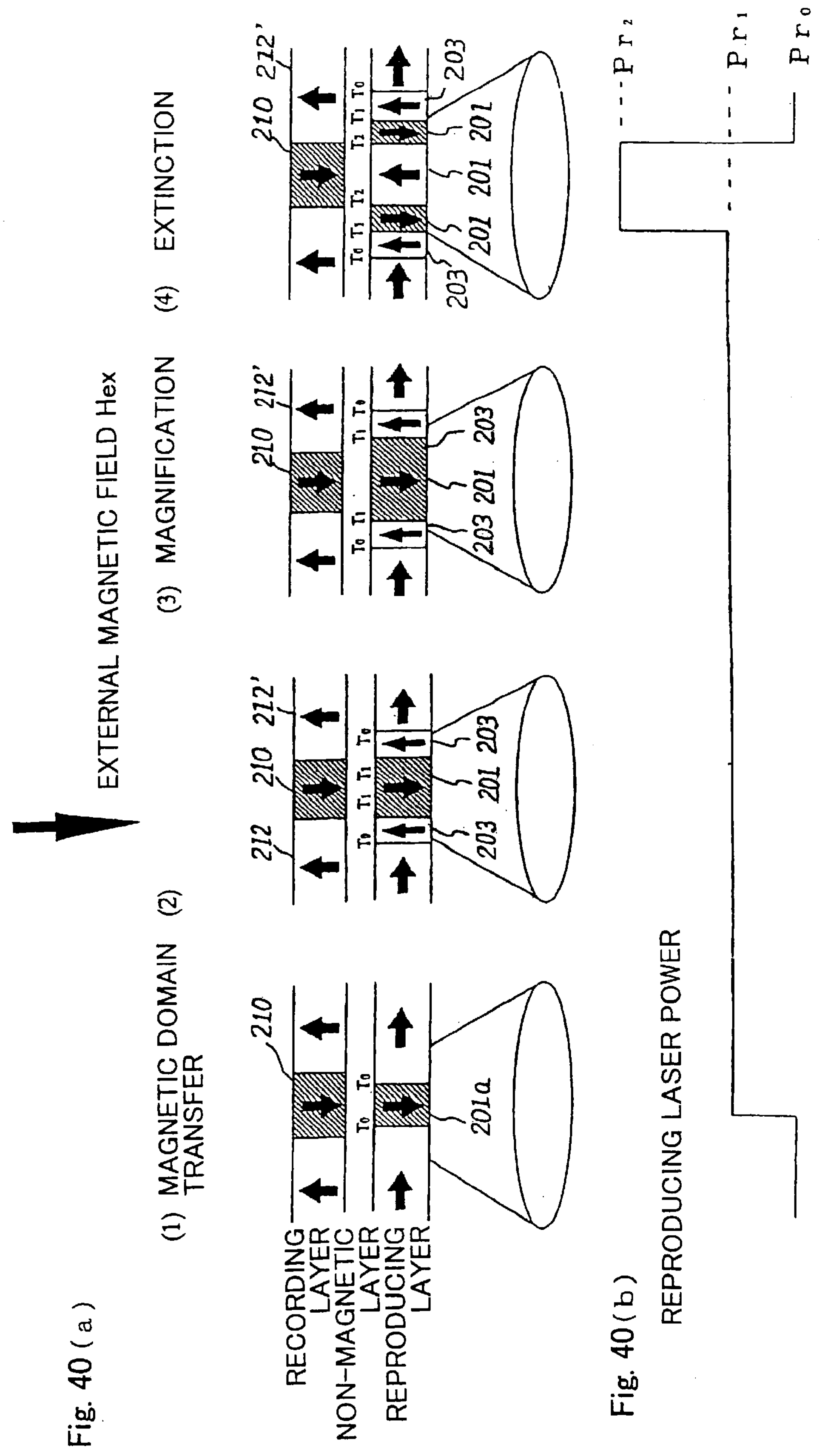
FIG. 40 is shows a process for reproducing a recording magnetic domain of the magneto-optical recording layer of a magneto-optical recording medium from the magneto-optical reproducing layer of this medium by irradiating the medium with an optically modulated reproducing light beam.
Figure 41A:
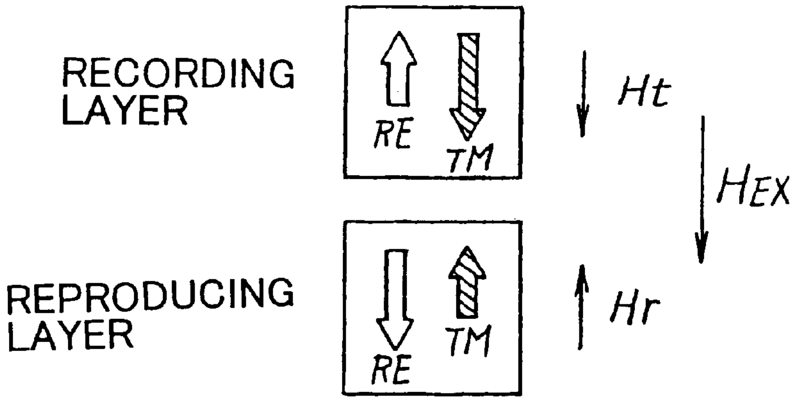
FIG. 41 is views showing the principle of extinguishment of a magnetic domain.
Figure 41B:
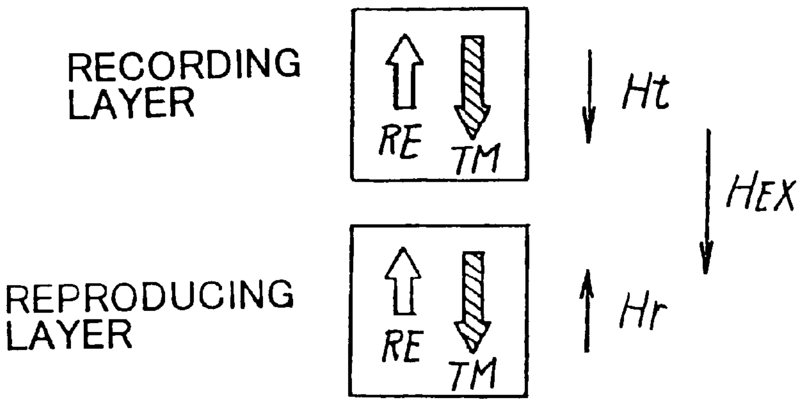

The reproducing condition in this embodiment may be explained as follows in relation to FIG. 39 used to explain the foregoing principle. That is, the reproducing layer is heated by the low power Pr1 of the power-modulated reproducing light beam to be in the temperature areas (areas (a) and (b)) shown in FIG. 39 where magnetic domain transfer and magnification are caused, i.e., up to Tcr=175° C. to Tcomp=240° C. The recording layer is heated by the high power Pr2 to be in the temperature area (area (c)) shown in FIG. 39 where magnetic domain extinguishment is caused, i.e., from a temperature exceeding Tcomp (240° C.) to Tco=270° C. The direct current magnetic field of about 80 Oe applied in the recording direction allows the magnetic temperature curves A and B to be disposed to have a relationship as shown in FIG. 39. That is, the relationship between the direct current magnetic field applied and the magnetic temperature characteristic of the magneto-optical disk used in this embodiment satisfies the following requirements (3) and (4). The requirements necessary for the reproducing method described in this embodiment will be enumerated below. The magnetic characteristics of the reproducing and recording layers of the magneto-optical recording medium used in this embodiment satisfy the following requirements (1) and (2) as described above.

(1) The reproducing layer, which is magnetized in the film surface direction at least at room temperature, has the compensation temperature Tcomp between the Curie temperature Tco and the critical temperature Tcr, at which magnetization in the perpendicular direction is caused.

(2) The Curie temperature Tco of the recording layer exists between the compensation temperature Tcomp of the reproducing layer and the Curie temperature Tco of the reproducing layer.

(3) The magnetic temperature curves A and B intersect at a temperature (T1) between room temperature and the compensation temperature Tcomp of the reproducing layer under the condition in which the external magnetic field Hex is applied in the recording direction.

(4) The magnetic temperature curves A and B intersect at a temperature (T2) between the compensation temperature Tcomp of the reproducing layer and the Curie temperature Tco of the recording layer.

In this embodiment, the foregoing requirements (1) to (4) are satisfied by constructing the magneto-optical disk with the specified materials shown in FIG. 37, and applying the DC magnetic field=80 Oe in the recording direction. However, arbitrary combinations may be used provided that the magneto-optical recording medium comprising the materials and the laminated structure and the magnitude of the external magnetic field applied during the reproduction can satisfy the requirements (1) to (4). The direction of the DC magnetic field applied during the reproduction is not limited to the recording direction, but may also be the erasing direction.

In this reproducing method, the process of (a) magnetic domain transfer, (b) magnetic domain magnification, and (c) extinguishment of a transferred magnetic domain is executed by modulating the reproducing light power intensity under the DC magnetic field. The period of time for which the process is carried out depends not only on the magnetic characteristics of the recording and reproducing layers but also on the temperature rising velocity of the recording layer, the reproducing layer, the non-magnetic layer, the dielectric layer, the protective layer, and other stackable magnetic layers, non-magnetic layers and substrates, and the heat transfer velocity between the layers. The velocities can be controlled by appropriately changing, for example, the stacked structure, the thickness and the thermal conductivity of the materials for constructing the layers. Accordingly, it is possible to respond to a desired reproducing access velocity.

It is preferable that the dielectric layer and the non-magnetic layer, which adjoin the reproducing layer (auxiliary magnetic layer), have appropriate thermal insulation properties, the degrees of which can be appropriately adjusted in relation to the thermal characteristics obtained by combining the access velocities upon recording and reproduction, the magnitude of the linear velocities upon recording and reproduction on the recording medium, and the thermal conductivity of the reproducing and recording layers.

The foregoing embodiment is illustrative of the structure in which the reproducing layer (auxiliary magnetic layer) of the magneto-optical recording medium is interposed between the dielectric layer and the non-magnetic layer. However, a magnetic member having magnetic anisotropy in the in-plane direction may be stacked in contact with the reproducing layer (auxiliary magnetic layer). It is desirable that the magnetic anisotropy in the in-plane direction be dominant in the magnetic member up to its Curie temperature, and that the Curie temperature of this member be approximately equal to the Curie temperature of the reproducing layer. By stacking such a magnetic member in contact with the reproducing layer, it is possible to suppress occurrence of the Bloch line in a transferred magnetic domain during the reproduction, and it is possible to reduce the noise during the reproduction owing to its suppressing action. Those usable as materials for such a magnetic member include, for example, Pt—Co alloys such as Pt—Co alloys containing 25 atomic % of Co and GdFeCo alloys. Such a magnetic member may be stacked in contact with any one of the upper and lower sides of the reproducing layer.

In Embodiment B1, recording was performed by using the optical magnetic field modulation system in which the polarity of the applied magnetic field was modulated in conformity with the recording signal while the pulsed light was radiated. In Embodiments B2 and B3, recording was performed by using the optical modulation system in which the light intensity was modulated in conformity with the recording signal while the DC magnetic field was applied. However, it is allowable to use any one of the magnetic field modulation recording system, the optical modulation recording system and the optical magnetic field modulation system based on the use of ordinary DC light.

Embodiment B4

Third Method of Reproduction From Magneto-Optical Recording Medium With Power-Modulated Pulsed Light In this embodiment, reproduction is performed while a DC magnetic field is applied actively in the same direction as the direction of magnetization of the recording magnetic domains in the same manner as in Embodiment B3. Reproduction was performed in this embodiment by modulating the laser beam intensity as well in order to realize magnification and extinguishment of transferred magnetic domains.

Figure 42:
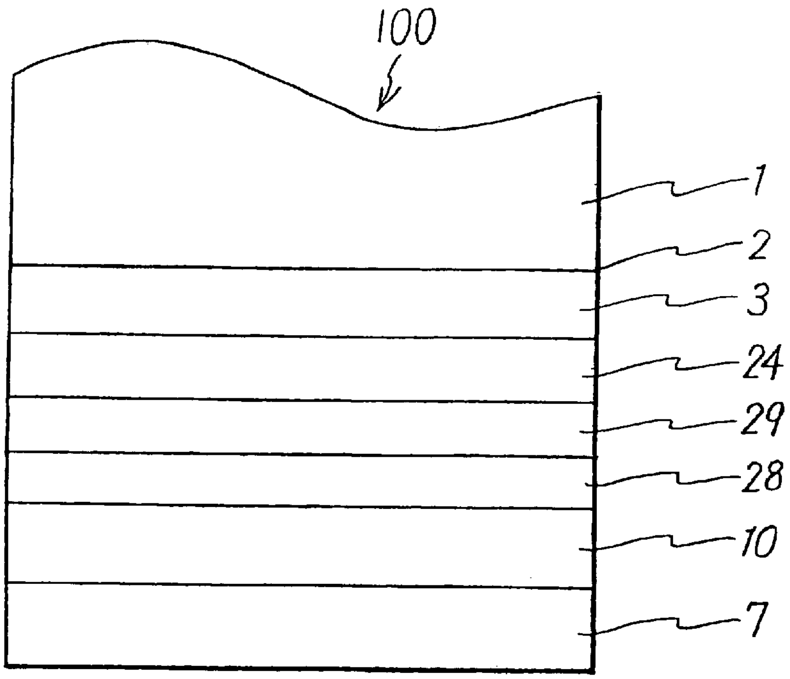
FIG. 42 is a view showing the laminated structure of a magneto-optical recording medium produced in Embodiment B4.

At first, explanation will be made for the magneto-optical disk used in this embodiment. As shown in FIG. 42, the magneto-optical disk 100 comprises, in a stacked manner on that surface of a polycarbonate substrate 1 which is formed with a preformat pattern 2, a dielectric layer 3 composed of SiN, a reproducing layer (second auxiliary magnetic film) 24 composed of a GdFeCo alloy, a non-magnetic layer 29 composed of SiN, a magnetic layer (first auxiliary magnetic film) 28 composed of a GdFeCo alloy, a recording layer (magneto-optical recording film) 10 composed of a TbFeCo alloy, and a protective layer 7 composed of SiN. The TbFeCo recording layer 10 and the GdFeCo reproducing layer 24 are magnetostatically coupled to one another through the non-magnetic layer 29 and the magnetic layer (first auxiliary magnetic film) 28 composed of the GdFeCo alloy.

The reproducing layer (second auxiliary magnetic layer) 24 composed of the GdFeCo alloy is a magnetic film which exhibits in-plane magnetization at room temperature and which causes transition to a perpendicularly magnetizable film above a critical temperature $Tcr_{12}$ higher than room temperature. In this embodiment, $Gd_{28}Fe_{56Co16}$ is used as the reproducing layer 24, which is an in-plane magnetizable film at room temperature and which is changed into a perpendicularly magnetizable film above the critical temperature $Tcr_{12}$=175° C. The Curie temperature $Tc_2$ of the reproducing layer 24 is 340° C.

The magnetic layer (first auxiliary magnetic layer) 28 composed of the GdFeCo alloy is a magnetic film which exhibits perpendicular magnetization at room temperature and which causes transition to an in-plane magnetizable film above a critical temperature $Tcr_{11}$ higher than room temperature. In this embodiment, $Gd_{21}Fe_{64}Co_{15}$ is used as the magnetic layer 28 composed of the GdFeCo alloy, which is a perpendicularly magnetizable film at room temperature and which is changed into an in-plane magnetizable film above the critical temperature $Tcr_{11}$=200° C. The Curie temperature $Tc_1$ of the magnetic layer 28 was 350° C.

Figure 43:
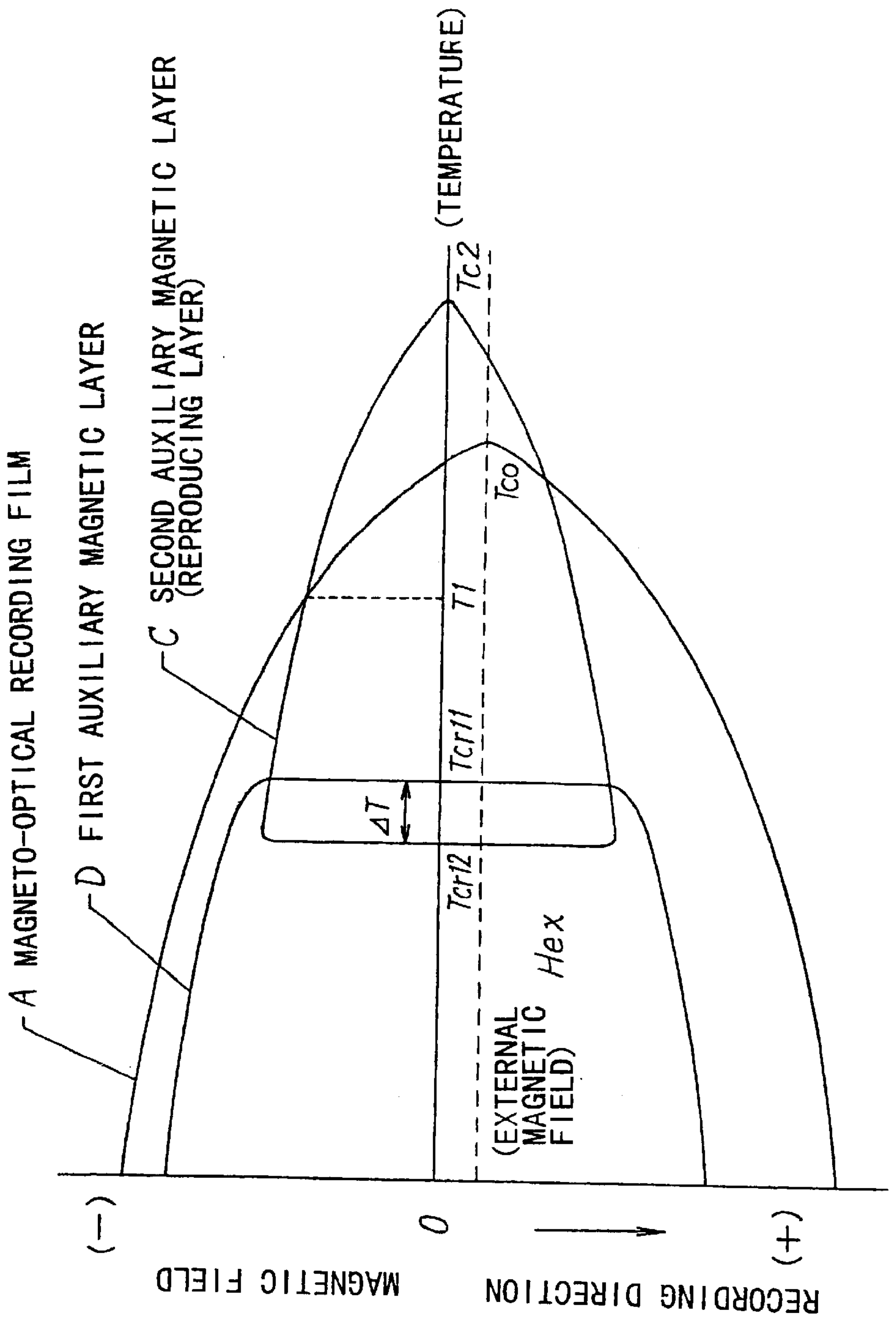
FIG. 43 shows the magnetization characteristics of the magneto-optical recording layer, the first auxiliary magnetic layer and the second auxiliary magnetic layer of the magneto-optical recording medium of Embodiment B4.

The recording layer 10 is based on the use of the TbFeCo alloy having its Curie temperature Tco of 270° C. and its compensation temperature equal to or lower than room temperature. That is, the relationship of room temperature<$Tcr_{12}$<$Tcr_{11}$<Tc, $Tc_1$, $Tc_2$ holds concerning the Curie Temperature Tco of the recording layer 10, the Curie temperature $Tc_2$ and the critical temperature $Tcr_{12}$ of the reproducing layer 24, and the Curie temperature $Tc_1$ and the critical temperature $Tcr_{11}$ of the magnetic layer 28 (first auxiliary magnetic film). The temperature relationship is shown in FIG. 43. In the same manner as FIG. 39, FIG. 43 shows the magnetic characteristics of the recording layer 10, the reproducing layer 24 and the magnetic layer 28 (first auxiliary magnetic film) of the magneto-optical recording medium 100 in a state in which a constant DC magnetic field Hex is applied in the recording direction to the magneto-optical recording medium 100. As shown, the temperature ranges where the reproducing layer 24 and the magnetic layer 28 (first auxiliary magnetic film) exhibit perpendicular magnetization overlap in a relatively narrow temperature range (arrow in the figure). In this temperature range, the recording layer 10, the magnetic layer 28, and the reproducing layer 24 can be magnetically coupled.

Figure 44:
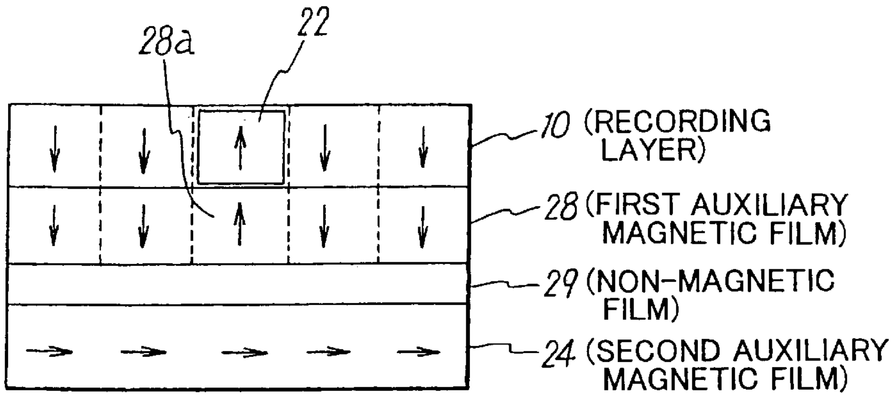
FIG. 44 is views showing the principle of reproduction from the magneto-optical recording medium of Embodiment B4.
Figure 44:
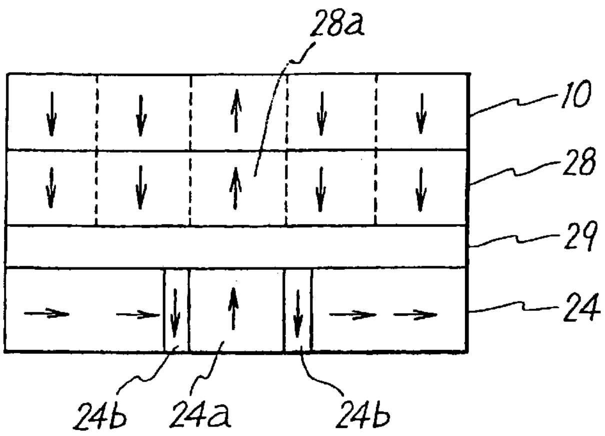
Figure 44:
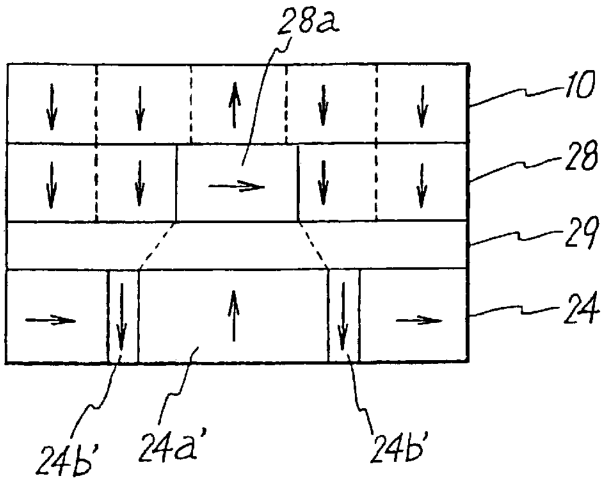
Figure 45:
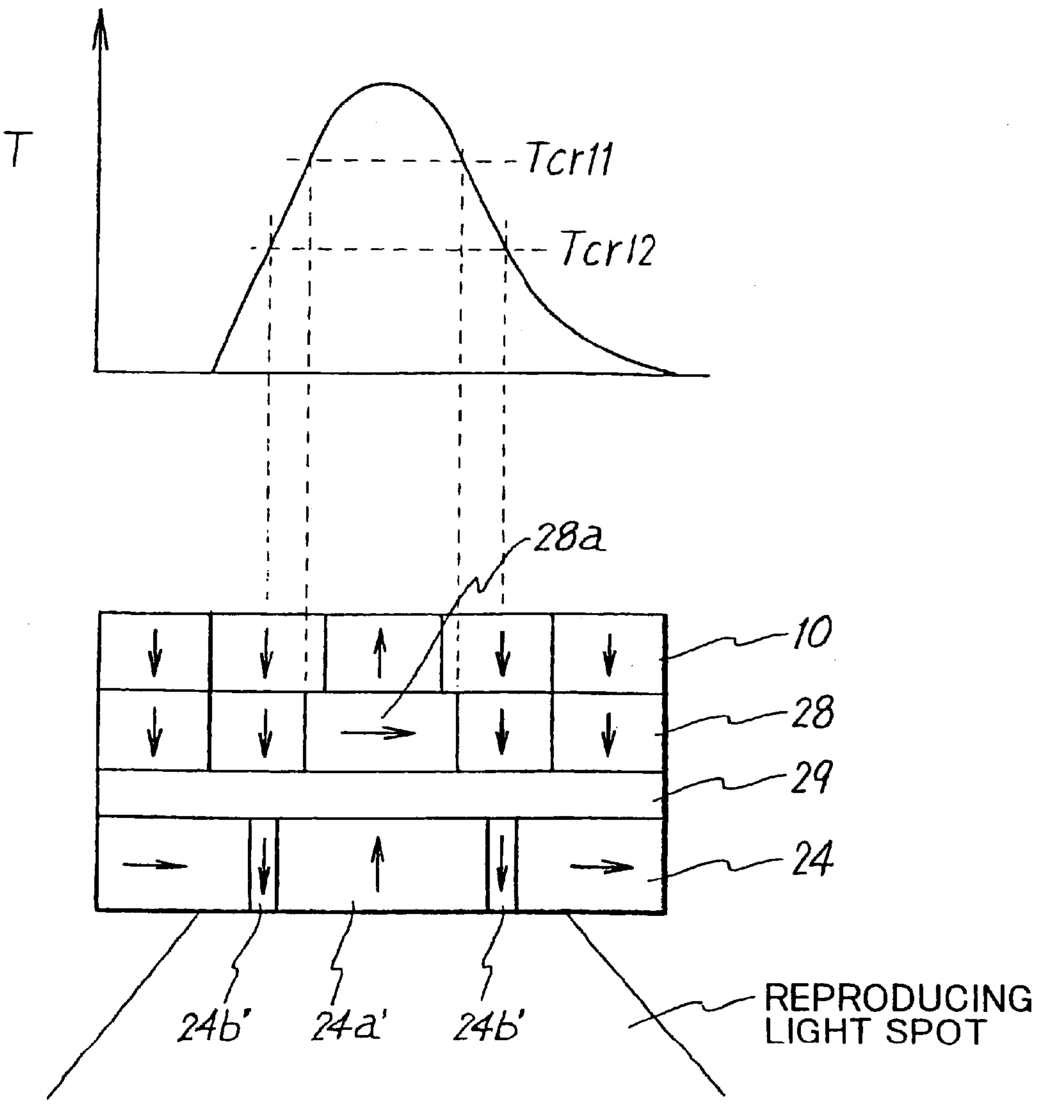
FIG. 45 shows a relationship between the temperature distribution and the states of magnetization of the medium shown in FIG. 44(*c*).

The principle of reproduction from the magneto-optical disk 100 shown in FIG. 42 is the same as that explained with reference to FIG. 44. Specifically, the reproducing layer 24 of the magneto-optical disk 100 is irradiated with the reproducing light beam, and the temperature of the reproducing layer 24 is raised. The area in which the temperature exceeds the critical temperature $Tcr_{12}$ causes transition from in-plane magnetization to perpendicular magnetization, simultaneously with which the magnetization in the recording layer 10 is transferred to the reproducing layer 24 by the aid of the magnetostatic coupling force. The reproducing light power and $Tcr_{12}$ are adjusted so that the area in which the temperature exceeds the critical temperature $Tcr_{12}$ is larger than the magnetic domain in which the magnetization information of the recording layer 10 is recorded. Therefore, the portion of the reproducing layer 24 having the perpendicular magnetization is magnified to be larger than the magnetic domain in the recording layer 10 as the transfer source (see FIG. 44(*c*)). On the other hand, the perpendicular magnetization in the magnetic layer 28 undergoes transition to in-plane magnetization in the area in which the temperature exceeds the critical temperature $Tcr_{11}$ existing inside the area in which the temperature exceeds the critical temperature $Tcr_{12}$ in accordance with the temperature distribution of the magneto-optical disk 100. The in-plane magnetization area in the magnetic layer 28 intercepts the leakage magnetic field directed from the recording layer 10 to the reproducing layer 24, especially in the non-recording direction. Accordingly, the magnification in the reproducing layer 24 is facilitated, simultaneously with which C/N of the reproduced signal obtained from the reproducing layer 24 is improved. In the foregoing reproducing method, it is required to satisfy $Tcr_{12}$<$Tcr_{11}$. However, it is preferable that the difference in temperature $\Delta T$ between $Tcr_{12}$ and $Tcr_{11}$ be selected so that C/N of the reproduced signal is optimized, and the reproduced signal strength brought about by the magnetic domain magnification is maximized.

When the recording signal recorded on the recording layer 10 of the magneto-optical disk 100 is reproduced, the reproducing power is modulated to have the two powers in synchronization with the reproducing clock or the integral multiple thereof (recording clock or a cycle created by the multiplication of an integer and the reproducing clock), as explained in the principle of the foregoing reproducing method. The reduction and the extinguishment of the magnified magnetic domain may be caused by using any one of the low power and the high power as described above. However, in this embodiment, the reproducing light beam for transferring and magnifying the magnetic domain was modulated to have the low power, and the reproducing light beam for reducing or extinguishing the magnified magnetic domain was modulated to have the high power. The power levels are applied during the period in which the recording track is scanned by irradiating the magneto-optical disk with the reproducing light beam.

A heat diffusion layer may be formed between the non-magnetic layer 29 and the first auxiliary magnetic layer 28 of the magneto-optical disk 100 shown in FIG. 42. The heat diffusion layer serves to facilitate the magnification of the magnetic domain by diffusing, in the in-plane direction of the film, the heat accumulated between the non-magnetic layer 26 and the first auxiliary magnetic layer 28. Those usable as the heat diffusion layer include materials having high thermal conductivity, such as Al, AlTi, AlCr, Ag, Au, and Cu.

Embodiment C

Figure 47:
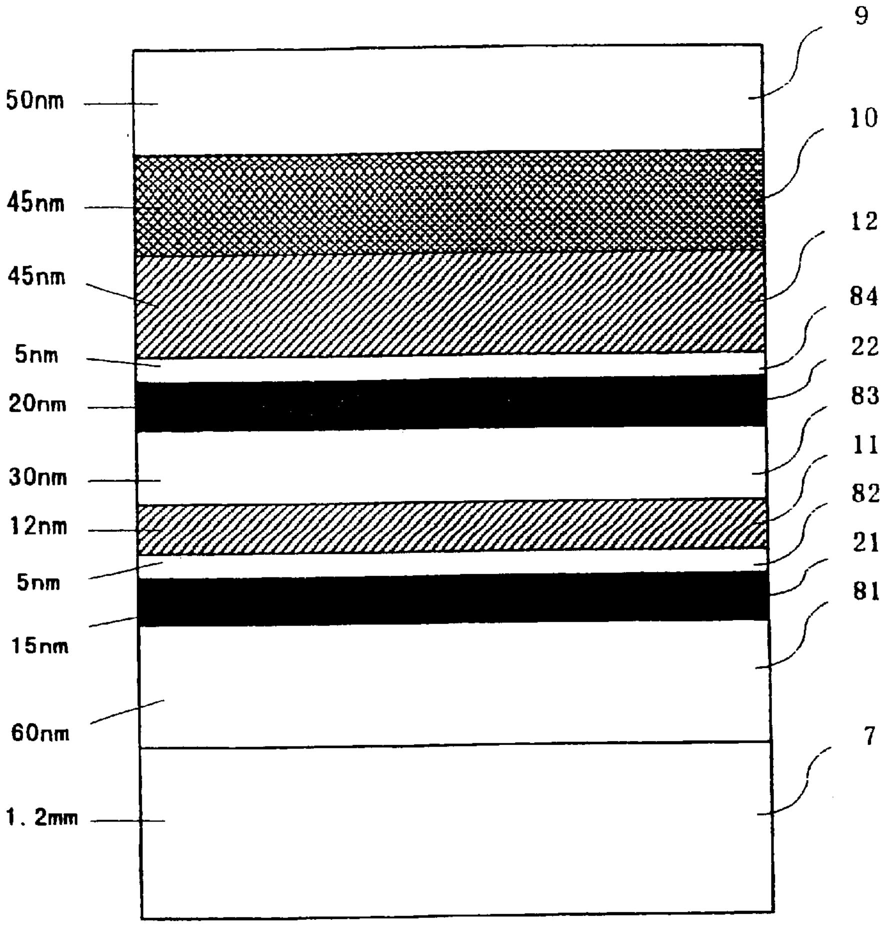
FIG. 47 is a cross section of a magneto-optical recording medium produced in an embodiment of the present invention.

Another embodiment of the present invention will be described below. FIG. 47 is a cross section showing the laminated structure of a magneto-optical recording medium according to an embodiment of the present invention. First, an interference film of SiN having a thickness of 60 nm is laid on a transparent substrate of polycarbonate. Next, a first reproducing layer of GdFeCo is laid. Then, a first recording layer of TbFeCo is laid with a layer of SiN interposed. Laid on the first recording layer is a barrier layer of SiN. Then, a second reproducing layer of GdFeCo is laid. Then, a second recording layer of TbFeCo is laid with a layer of SiN interposed. Laid on the second recording layer is a recording auxiliary layer of PtCo. Last, a protective film of SiN is laid.

Such structure makes it possible to record information independently on the first and second recording layers of the magneto-optical recording medium. By radiating two reproducing laser beams having different wavelengths, it is possible to reproduce the information recorded on the recording layers at a high S/N.

Figure 48:
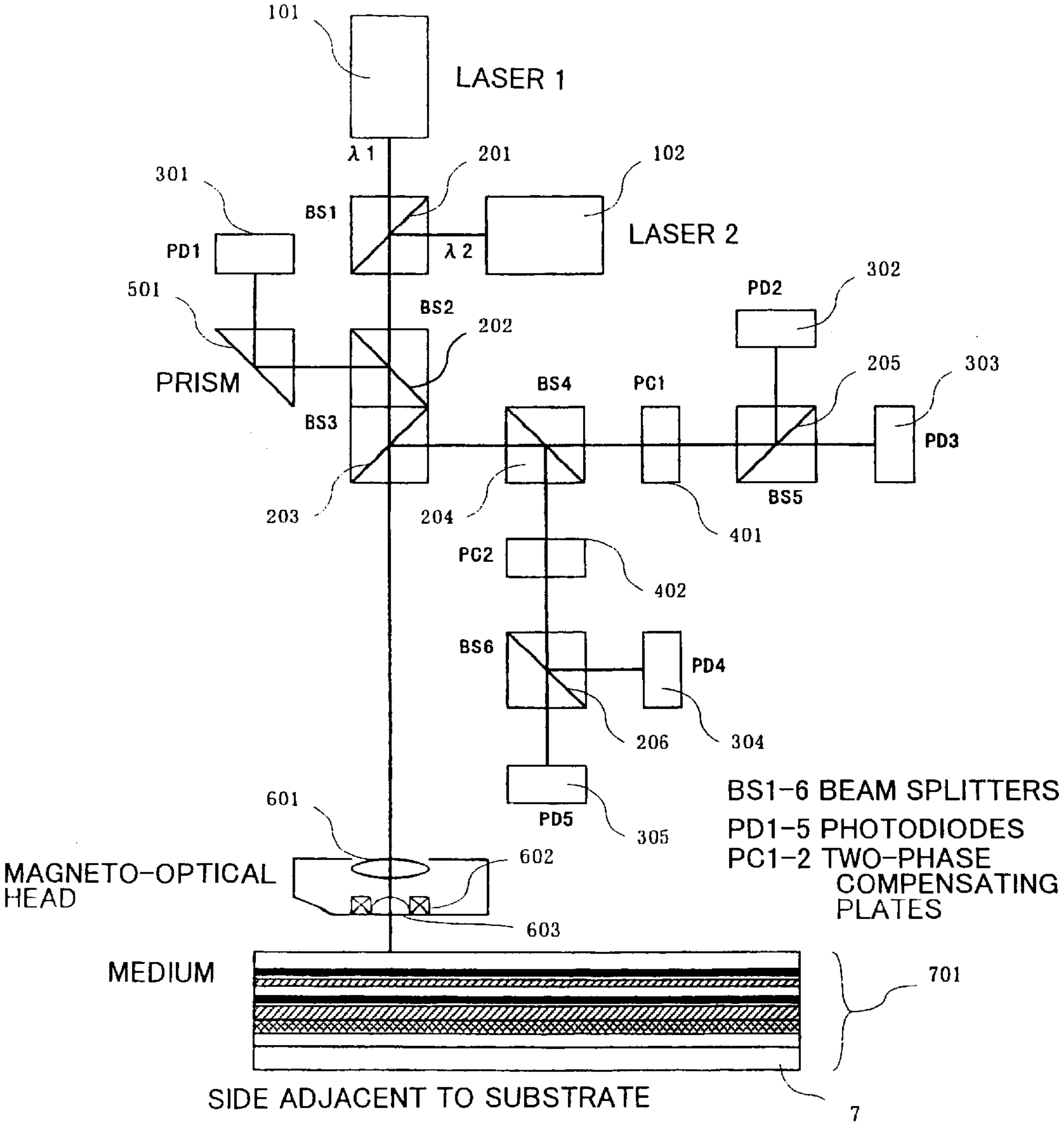
FIG. 48 is a schematic diagram of the optical system of an apparatus for reproduction from the magneto-optical recording medium shown in FIG. 47.

FIG. 48 is a diagram of an apparatus for recording information on and reproducing information from a magneto-optical recording medium according to the present invention. This apparatus is fitted with an optical head using a laser 101 for a wavelength of 635 nm and a laser 102 for a wavelength of 410 nm. Two beams are collected by a beam splitter BS2 into one beam, which is radiated through an objective lens 601 onto a magneto-optical recording medium 701. The beam may be incident on the recording medium 701 through the transparent substrate or directly on a surface of the lamination. The beam reflected by a surface of the recording medium is split again into two components having different wavelengths, which are detected individually.

First, a recording method employing the apparatus shown in FIG. 48 will be described. In this embodiment, recording was performed on the magnetic field modulation system. First, information for recording on the first and second recording layers is converted into a four-valued code. While the laser beam of 635 nm is radiated, the information is recorded independently on the recording layers with a magnetic field applied which is modulated into four levels in conformity with the four-valued code. The information was recorded by the foregoing optical magnetic filed multi-valued recording method. The recording layers of the magneto-optical recording medium shown in FIG. 47 have such structure that information can be recorded on them in different ranges of magnetic field strength in response to an external magnetic field. Specifically, the magnetic characteristics of the recording layers are so adjusted that the first recording layer is a single layer and consequently magnetized in conformity with plus and minus states of the external magnetic field, and that because the auxiliary magnetic layer is laid on the second recording layer, this recording layer has a recording range different from that of the first recording layer. Therefore, the four-level magnetic field modulation makes it possible to independently record multi-valued information as combinations of states of magnetization in the magnetic layers. Either of the recording laser beams may be used, or both of them may be radiated at the same time. The laser beams may be radiated continuously or intermittently. Recording may be performed with the laser beams modulated in different patterns.

A method for reproducing the multi-valued information thus recorded on the magneto-optical recording medium will be described. As this reproducing method, as described below, the foregoing multi-wavelength magneto-optical reproducing method and the MAMMOS were used at the same time. First, for reproduction, the recording medium is irradiated with first and second reproducing laser beams having different wavelengths. The first laser beam ($\lambda_1$=410 nm) is to reproduce mainly the information on the first recording layer. The second laser beam ($\lambda_2$=635 nm) is to reproduce mainly the information on the second recording layer. In accordance with the MAMMOS, a reproducing magnetic field is applied at the same time that the reproducing beams are radiated. This external magnetic field is an alternating magnetic field modulated with a frequency which is an integral number of times as high as a recording clock (a reproducing clock). The modulation of the reproducing magnetic field and the radiation of the laser beams transfer to the first reproducing layer the minute recording magnetic domains recorded on the first recording layer. The external magnetic field magnifies the transferred domains. Likewise, the minute recording magnetic domains recorded on the second recording layer are transferred to the second reproducing layer, where they are magnified. This principle makes it possible to reproduce signals amplified doubly or more largely. By slicing at suitable values the signal waveforms reproduced with the wavelengths $\lambda_1$ and $\lambda_2$, it is possible to obtain at least two-valued reproduced signals. By performing a logical operation for the obtained signals, which have been reproduced with the different wavelengths, it is possible to reproduce the recorded multi-valued information. The MAMMOS may be replaced with the foregoing optical modulation domain magnifying and reproducing method as a method for magnifying and reproducing the magnetic domains transferred to the reproducing layer.

Figure 55A:
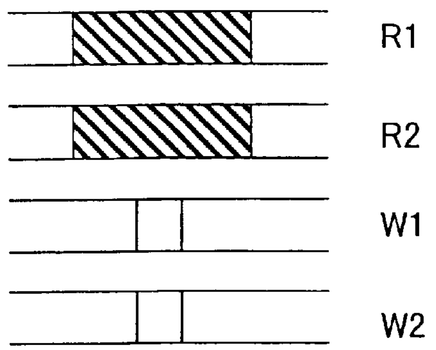
FIGS. 55(A) to (E) conceptually show the laminated structures of magneto-optical recording media having various arrangements of two recording layers W1 and W2 and reproducing layers R1 and R2, to which the magnetization information in the recording layers W1 and W2, respectively, can be transferred.

FIG. 47 shows a laminated structure suitable for recording information on two recording layers by the optical magnetic field multi-valued recording method, and for independently magnifying and reproducing the magnetization information in each recording layer by the multi-wavelength reproducing method and the MAMMOS. It is, however, possible to use these recording and reproducing methods for not only a laminated structure as shown in FIG. 47 but also various laminated structures as shown in FIG. 55. FIG. 55 conceptually shows the laminated structures of magneto-optical recording media having various arrangements of two recording layers W1, W2, and two reproducing layers R1 and R2. The magnetization information recorded on the recording layers W1 and W2 is transferred to the reproducing layers R1 and R2, respectively. In each laminated structure shown in FIG. 55, it is illustrated how, as stated above, the radiation of the beams having the wavelengths of $\lambda_1$ and $\lambda_2$ has transferred recording magnetic domains in the recording layer W1 to the reproducing layer R1 and recording magnetic domains in the recording layer W2 to the reproducing layer R2, and magnified the magnetic domains transferred to the reproducing layers. The magnified magnetic domains, which are hatched, in the reproducing layers R1 and R2 are reproduced independently with the reproducing beams having the wavelengths of Al and A2, respectively. The directions of incidence of the beams are not limited in particular. In a case as shown in FIG. 55(D), for example, the beams having the wavelengths of $\lambda_1$ and $\lambda_2$ may be incident from the sides adjacent to the reproducing layers R1 and R2, respectively. FIG. 55(E) is equivalent or corresponds to a conceptual view of the structure shown in FIG. 47.

Figure 46:
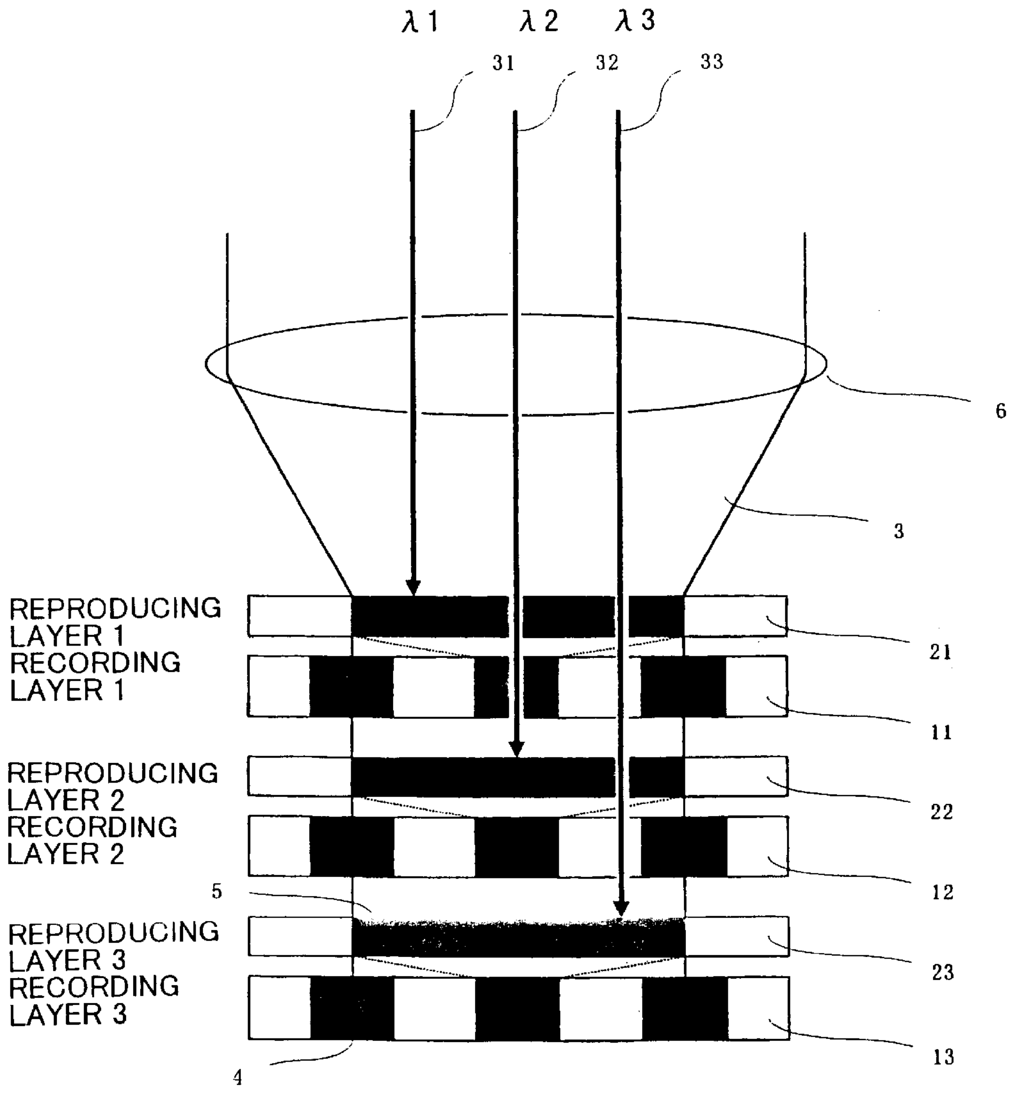
FIG. 46 is a conceptual view of a magneto-optical recording medium including a third recording layer according to the present invention.

FIG. 55 merely illustrates laying orders of two recording layers and two reproducing layers, which may be laid in other order. As shown in FIG. 46, there may be three or more recording layers and three or more reproducing layers each associated with one of the recording layers.

Embodiment D

An embodiment will be described below of which the laminated structure includes two recording layers and two reproducing layers. The information recorded on the recording layers can be reproduced independently with a reproducing light beam of single wavelength.

Figure 55B:
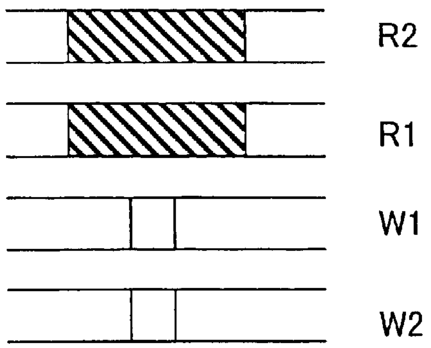
Figure 55C:
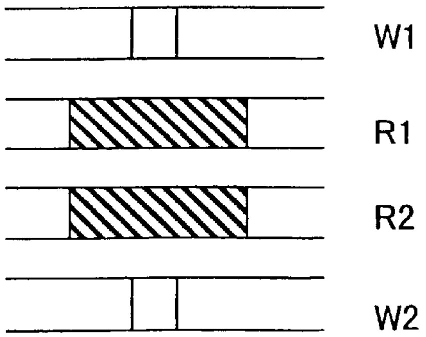
Figure 55:
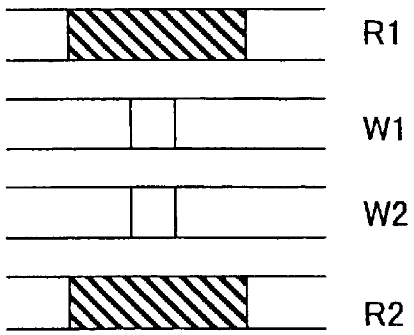
Figure 55E:
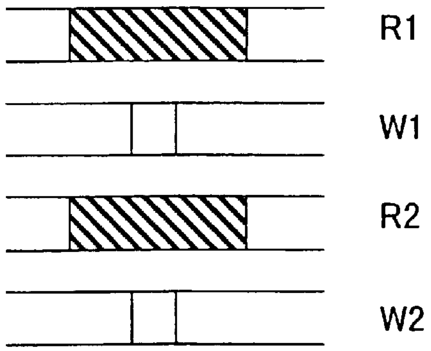
Figure 56A:
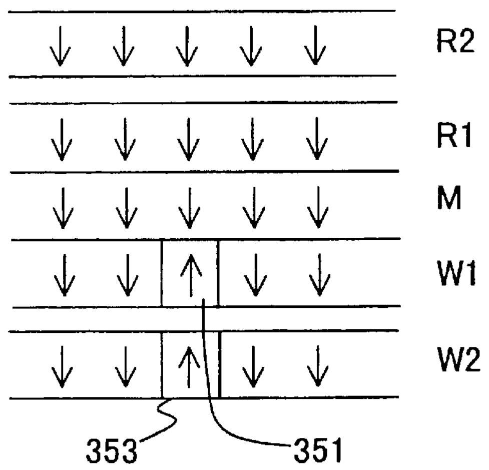
FIG. 56(A) shows the laminated structure.

FIG. 56(A) shows an example of the laminated structure shown in FIG. 55(B). The example includes a second recording layer W2, a first recording layer W1, an intermediate layer M, a first reproducing layer R1 and a second reproducing layer R2, which are laid in that order. Without using the multi-wavelength magneto-optical reproducing method, it is possible to reproduce the information from the recording layers W1 and W2 by using the MAMMOS with two reproducing light beams PH and PL having a high power and a low power, respectively. In the laminated structure shown in FIG. 56(A), it is assumed that magnetic domains 351 and 353 magnetized upward (↑) are recorded on the recording layers W1 and W2, respectively, while the reproducing layers R1 and R2 are magnetized in the initialized direction, which is downward (↓). It is also assumed that the Curie temperature of the intermediate layer M is higher than the temperature of the recording medium heated when the low power laser beam PL is radiated, but lower than the temperature of the medium heated when the high power laser beam PH is radiated. The Curie temperatures of the recording layers W1 and W2 are set at values sufficiently higher than the temperature of the recording medium heated when the high power laser beam PH is radiated. For example, the Curie temperature of the intermediate layer M may be 160° C., and the transferring and magnifying temperatures of the reproducing layers R1 and R2 may be 170° C. and 120° C., respectively. The transferring and magnifying temperatures are the temperatures at which the magnetic domains are transferred from the recording layers to the reproducing layers and magnified. These temperatures depend on the Ms of the recording and reproducing layers, the thickness of the intermediate layer, the coercive forces of the reproducing layers, etc. It is further assumed that, during reproduction, an external magnetic field HE is applied in the recording direction, which is upward.

Figure 56B:
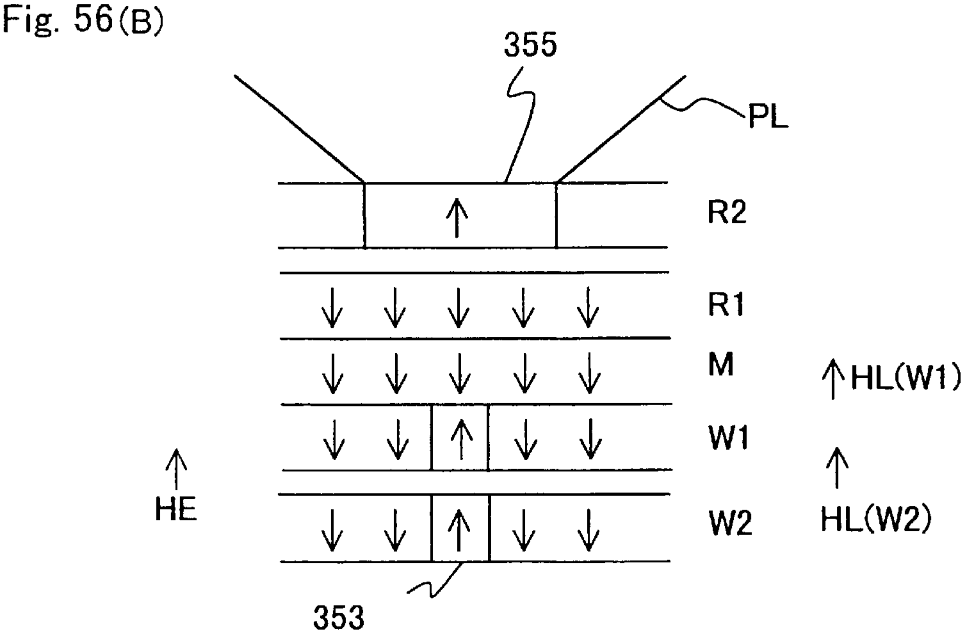
FIG. 56(B) shows states of magnetization in various layers during radiation of the low power reproducing beam PL.

As shown in FIG. 56(B), the low power reproducing beam PL is radiated first during reproduction. The radiation of the reproducing beam PL reduces the coercive force of the second reproducing layer R2. In the meantime, the leakage magnetic field HL(W2) from the second recording layer W2, the external magnetic field HE, and the leakage magnetic field HL(W1) from the first recording layer W1 transfer the magnetization of the magnetic domain 353 to the second reproducing layer R2. The magnetic domain transferred to the second reproducing layer R2 is magnified into a magnetic domain 355 up to the size of the beam spot under the external magnetic field HE according to the principle of the MAMMOS. An amplified signal is reproduced from the magnified domain 355. In other words, the low power reproducing beam PL causes the information recorded on the second recording layer R2 to be reproduced independently with increased signal strength.

Figure 56C:
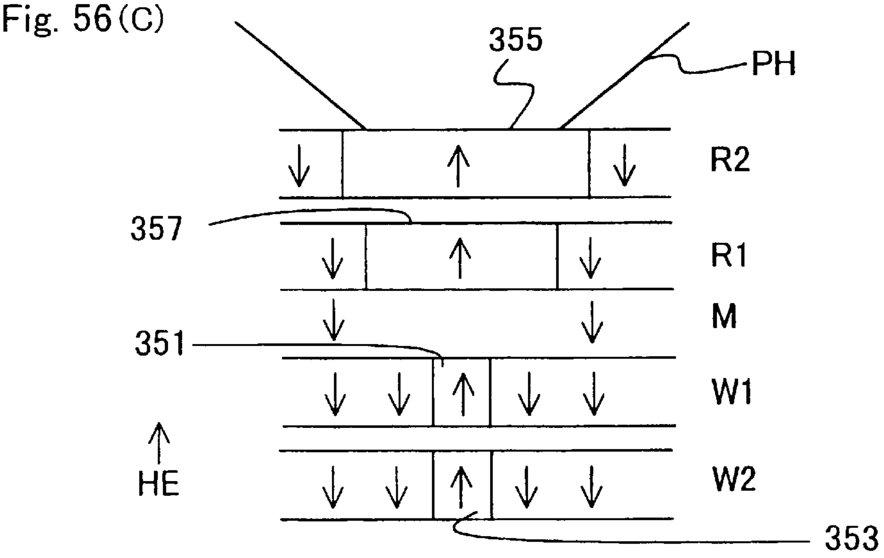
FIG. 56(C) shows states of magnetization in the layers during radiation of the high power reproducing beam PH.
Figure 57:
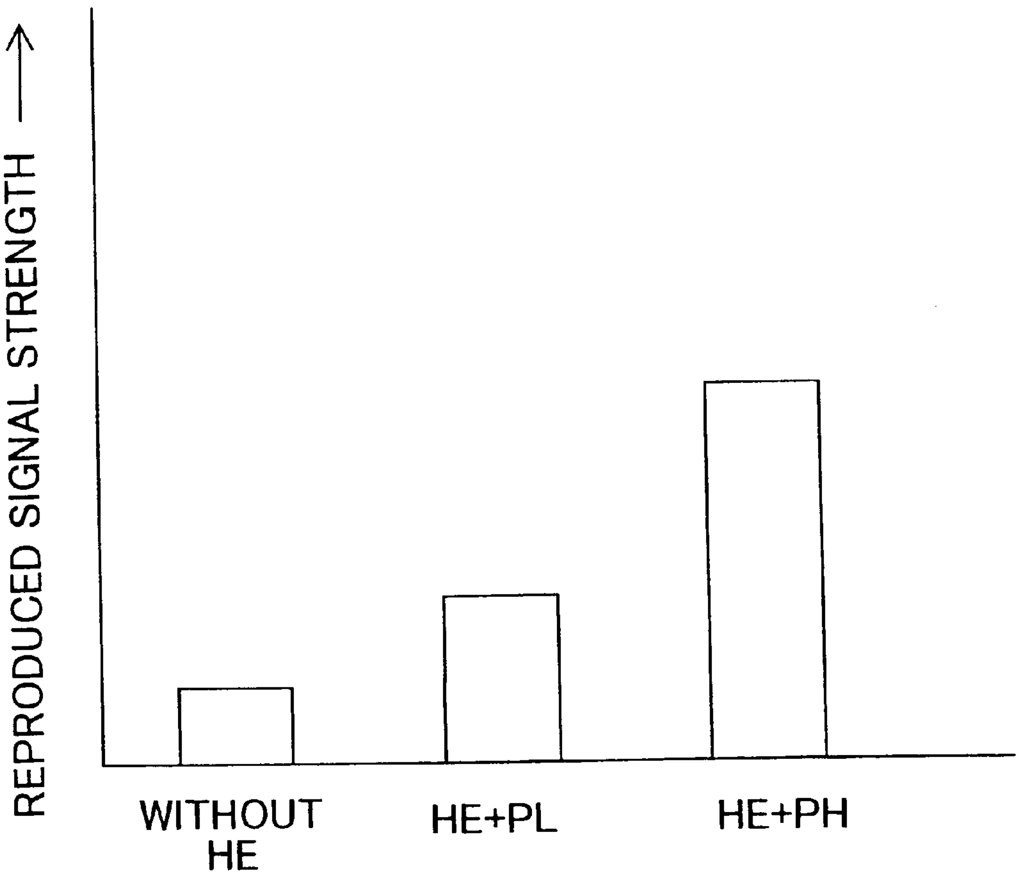
FIG. 57 is a graph showing the strength of signals reproduced with a low power reproducing beam PL and a high power reproducing beam PH radiated under an external magnetic field HE in Embodiment D, in comparison with the strength of a signal reproduced without the external magnetic field HE applied.

Next, when the high power reproducing beam PH is radiated, the coercive force of the intermediate layer M is reduced and this layer becomes non-magnetic. The leakage magnetic field from the magnetic domain 353 in the first recording layer W1 reaches or extends to the first reproducing layer R1, the coercive force of which has decreased. Magnetostatic coupling of the first recording layer W1 and the first reproducing layer R1 transfers the magnetic domain 351 in the first recording layer W1 to the first reproducing layer R1. As shown in FIG. 56(C), the external magnetic field HE causes the magnetic domain transferred to the first reproducing layer R1 to be magnified into a magnetic domain 357 up to the spot size of the reproducing beam PH. Similarly to the case with the low power beam radiation, the magnetic domain 353 in the second recording layer W2 has been transferred to the second reproducing layer R2 and magnified to the beam spot size. Accordingly, in the case of the high power beam PH being radiated, because not only the magnetic domain transferred to the second reproducing layer R2 but also the magnetic domain transferred to the first reproducing layer R1 are magnified, the reproduced signal strength is twice as high as that in the case of the low power beam being radiated. Therefore, it is found that upward magnetized domains existed in both recording layers W1 and W2, and the information recorded on each recording layer is reproduced independently. FIG. 57 shows the strength of signals reproduced with the low power reproducing beam PL and the high power reproducing beam PH radiated under the external magnetic field HE, in comparison with the strength of a signal reproduced without the external magnetic field HE applied (no MAMMOS reproduction).

Even if the magnetic domain 351 in the first recording layer W1 of the laminated structure shown in FIG. 56 were magnetized downward, the magnetization information recorded on both recording layers W1 and W2 could be found as follows. When the low power reproducing beam PL is radiated, similarly to the case shown in FIG. 55(B), the magnetization of the magnetic domain 353 would be transferred to the second reproducing layer R2, where it would be magnified up to the size of the reproducing beam spot under the external magnetic field HE, forming a magnetic domain 355. An amplified signal would be reproduced from the magnetic domain 355. When the high power reproducing beam PH is radiated, the magnetic domain 353 in the first recording layer W1 would not be transferred to the first reproducing layer R1 nor magnified because it is magnetized downward. This would result in the detection of a signal at the same level as with the low power reproducing beam radiated. In this case, because the information recorded on the second recording layer W2 is found already from the signal reproduced with the low power reproducing beam, the addition of it and the strength of the signal detected with the high power reproducing beam PH would cause the information recorded on the first recording layer W1 as well to be found. Even if the magnetic domain 353 in the second recording layer W2 were magnetized downward while the magnetic domain 351 in the first recording layer W1 is magnetized upward, the information recorded on both layers could be reproduced according to a principle similar to the foregoing one. It is thus found that this embodiment makes it possible to reproduce information individually from a plurality of recording layers with reproducing light of single wavelength by radiating the reproducing light modulated in intensity.

The requirements for the magnetization characteristic of the reproducing layers R1 and R2 shown in FIG. 56 will be stated below. A nucleation magnetic field Hn(R1) of the first reproducing layer R1 needs to satisfy the following expression Di for the external magnetic field HE, the leakage magnetic field HL(W2) from the second recording layer W2 and the leakage magnetic field HL(W1) from the first recording layer W1 when the high power reproducing beam PH is radiated.

$$Hn(R1)<HE+HL(W2)+HL(W1) \ldots D1$$

where the magnetic field or fields polarized in the recording (upward) direction are positive. A nucleation magnetic field Hn(R2) of the second reproducing layer R2 needs to satisfy the following expression D2 for the external magnetic field HE, the leakage magnetic field HL(W2) from the second recording layer W2 and the leakage magnetic field HL(R1) from the first reproducing layer R1 when the low power reproducing beam PL is radiated.

$$Hn(R2)<HE+HL(W2)+HL(R1) \ldots D2$$

where the magnetic field or fields polarized in the recording (upward) direction are positive.

The foregoing reproducing method may, during reproduction, involve irradiating the magneto-optical recording medium with the low power reproducing beam PL and the high power reproducing beam PH separately, or at the same time in such a manner that the recording medium is scanned ahead with the low power reproducing beam PL and behind with the high power reproducing beam PH following the beam PL in the direction of rotation of the medium.

The principle that the first reproducing layer and the second magnetic layer are magnified is based on the foregoing MAMMOS, but the layers may be magnified according to the principle of DWDD (domain wall displacement detection). In other words, DWDD has the same structure (the laminated structure consisting of the first reproducing layer, the intermediate layer and the first recording layer) as shown in FIG. 56. However, if a front edge portion of the recording magnetic domain in the first reproducing layer R1 overlaps with that portion of the intermediate layer M which has a temperature equal to or higher than the Curie temperature within the beam spot, the exchange coupling between the recording layer W1 and the reproducing layer R1 is disconnected. Therefore, the front edge portion of the domain magnetically transferred to the reproducing layer moves toward the heat center in the beam spot (that is to say, the domain is magnified), thus increasing the reproduced signal. For DWDD, the Curie temperature of the intermediate layer M may be 200° C., and the transferring and magnifying temperature of the second reproducing layer R2 may be lower than 200° C.

Embodiment E

Figure 58:
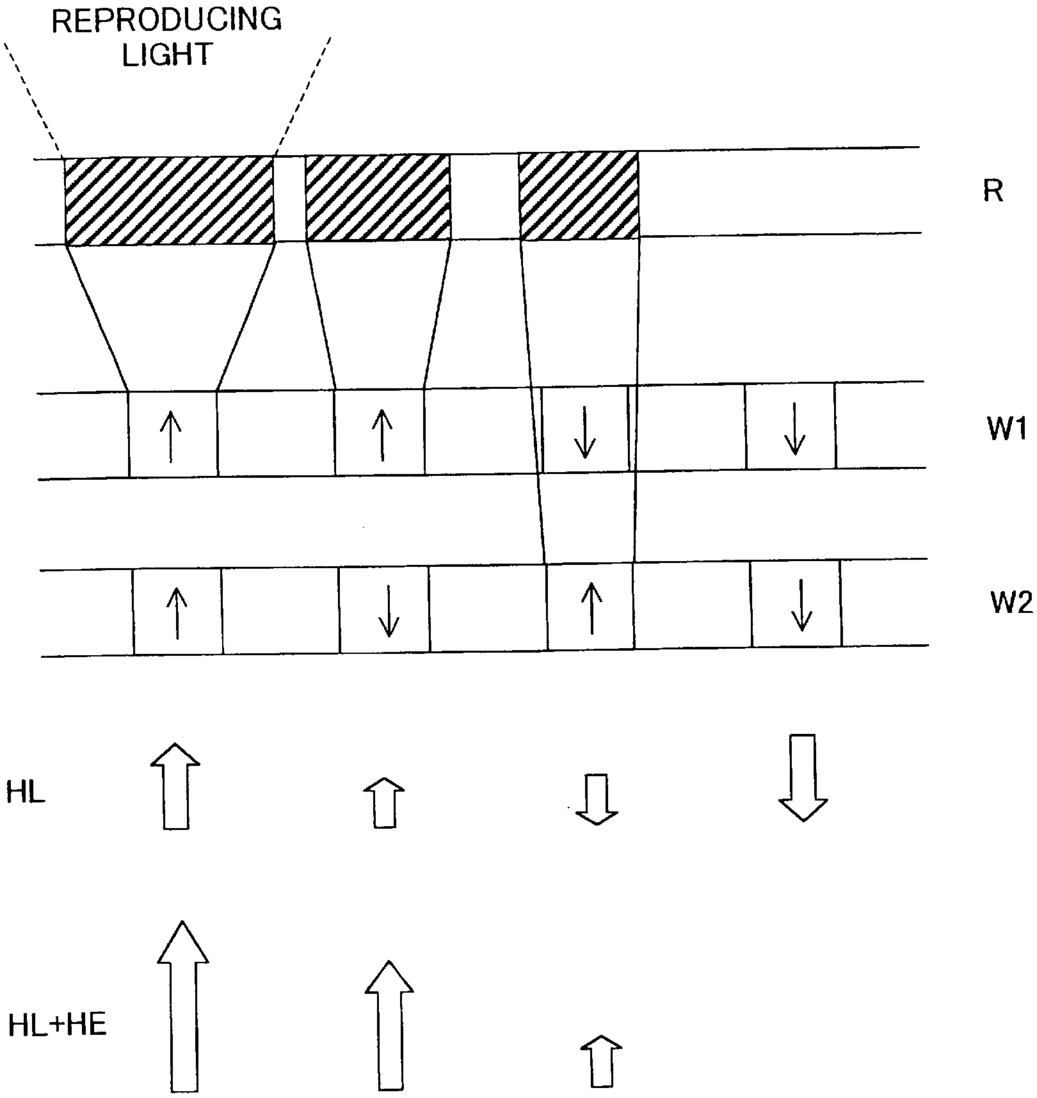
FIG. 58 is a conceptual view showing the principle of a method for the MAMMOS reproduction of recorded four-valued information in two recording layers with reproducing light of single wavelength in Embodiment E.

This embodiment is an embodiment for MAMMOS reproduction, with reproducing light of single wavelength, of the multi-valued information recorded on two recording layers. As shown conceptually in FIG. 58, a magneto-optical recording medium includes a reproducing layer R, a first recording layer W1 and a second recording layer W2 in that order. It is assumed that the recording layers W1 and W2 have four-valued information recorded in the form of combinations of directions of magnetization. Each of the combinations is one of (↑↑), (↑↓), (↓↑) and (↑↑). This information can be recorded by the foregoing magneto-optical multi-valued recording method. With attention given to the strength of the leakage magnetic field HL applied in the recording direction to the reproducing layer R, the two combinations of magnetization (↑↑) and (↑↓) generate leakage magnetic fields in the recording direction, while the other two combinations (↓↑) and (↓↓) generate leakage magnetic fields in the erasing direction. During information reproduction, when a reproducing beam is radiated from the side adjacent to the reproducing layer while an external magnetic field HE is applied in the recording direction, the sum in the recording direction of the leakage magnetic field HL and the external magnetic field HE decreases in order of (↑↓), (↑↓) and (↓↑), and is zero at (↓↓). Accordingly, as shown, the magnetic domains transferred to the reproducing layer R by the leakage magnetic field HL and the external magnetic field HE are each magnified within the reproducing beam spot in proportion to the magnitude of the composite magnetic field. By adjusting the magnitude of the composite magnetic field HL+HE, it is possible to magnify the transferred magnetic domains to 100%, about 75% and about 50% of the reproducing beam spot size with the combinations of states of magnetization (↑↑), (↑↓and (↓↑), respectively. The strength of each of the signals reproduced with the reproducing beam depends on the size of the associated magnified domain. By detecting and distinguishing this signal strength, it is possible to reproduce the recorded four-valued information.

The method according to this embodiment makes it possible to reproduce a multi-valued signal with a single wavelength. The method also makes it possible to improve the C/N because all of the magnetic domains transferred to the reproducing layer are magnified to be larger than the magnetic domains in the recording layers in FIG. 58, the first and second recording layers W1 and W2 are magnetostatically coupled by an intermediate layer. Alternatively, the recording layers might be exchange-coupled without an intermediate layer interposed between them.

Embodiment F

Figure 59A:
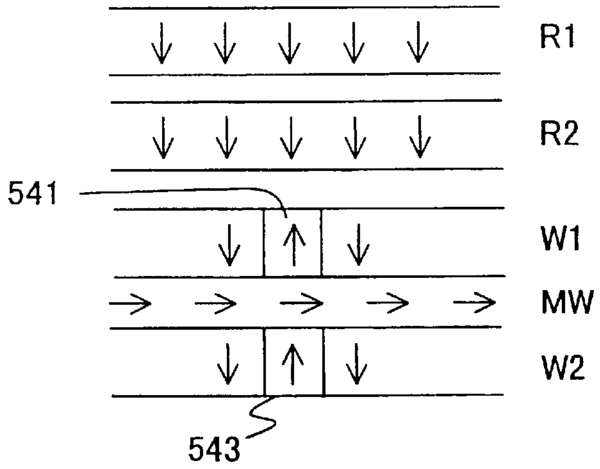
FIG. 59(A) shows the laminated structure of a magneto-optical recording medium including, between the first and second recording layers, an intermediate layer MW in which a direction of magnetization changes from an in-plane direction to a perpendicular direction at a predetermined critical temperature.

FIG. 59 shows an embodiment for reproducing, with reproducing light having a single wavelength and two degrees of intensity, the information recorded on two or more recording layers. As shown in FIG. 59(A), a recording medium includes a first reproducing layer R1, a second reproducing layer R2, a first recording layer W1 and a second recording layer W2 in that order from its side where the reproducing light is radiated. Interposed between the recording layers W1 and W2 is an intermediate layer MW, in which the direction of magnetization changes from an in-plane direction to a perpendicular direction at a predetermined critical temperature. The coercive force of the second reproducing layer R2 is higher than that of the first reproducing layer R1. In the laminated structure shown in FIG. 59(A), it is assumed that magnetic domains 543 and 541 magnetized upward (↑) have been recorded on the recording layers W2 and W1, respectively, while both of the reproducing layers R1 and R2 have been magnetized in the initializing direction, which is downward (↓). In other words, multi-valued (four-valued) information (↓↑) has been recorded on the two recording layers W1 and W2. This multi-valued recording can be performed by the foregoing magneto-optical multi-valued recording method.

Figure 59B:
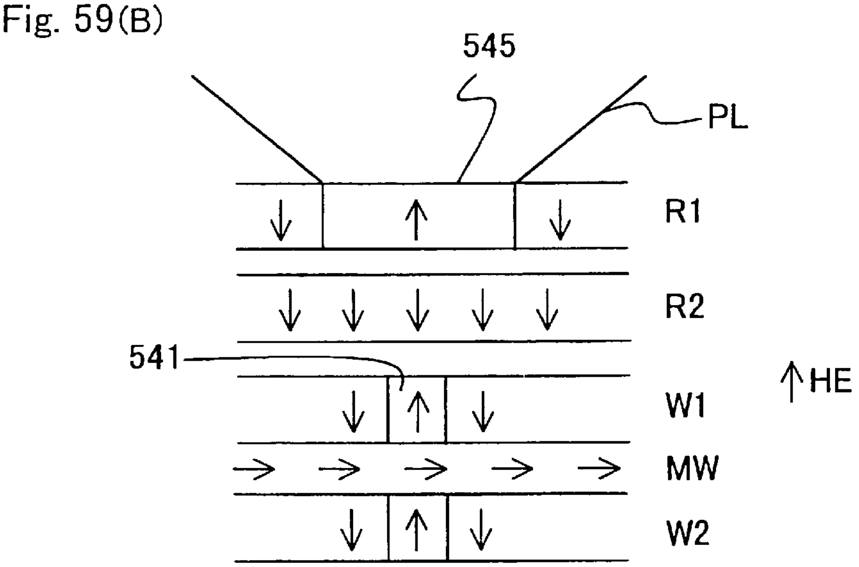
FIG. 59(B) shows states of magnetization in the layers of the recording medium irradiated with a low power reproducing beam PL.
Figure 59C:
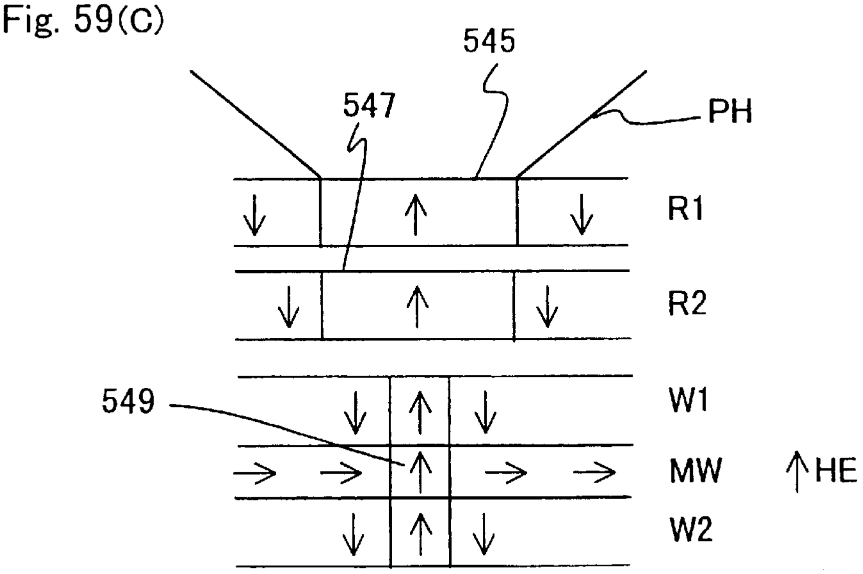
FIG. 59(C) shows states of magnetization in the layers of the recording medium irradiated with a high power reproducing beam PH.

The Curie temperatures of both recording layers W1 and W2 are set to be sufficiently higher than the temperature of the medium heated when irradiated with a high power laser beam PH. The critical temperature of the intermediate layer MW is adjusted to be lower than the temperature of the medium heated when irradiated with the high power laser beam PH, but higher than the temperature of the medium heated when irradiated with a low power laser beam PL. During reproduction, an external magnetic field HE is applied in the recording direction, which is upward. FIGS. 59(B) and 59(C) show states of magnetization during reproduction.

First, as shown in FIG. 59(B), when the low power reproducing beam PL is radiated, the intermediate layer MW does not reach the critical temperature and therefore keeps magnetized in the in-plane direction. Consequently, the magnetization of the second recording layer W2 is blocked by the intermediate layer MW, not magnetically affecting the reproducing layers R1 and R2. Only the leakage magnetic field of the first recording layer W1 affects the first reproducing layer R1, which is relatively low in coercive force, transferring the magnetization (↑) of the magnetic domain 541 in the first recording layer W1 to the first reproducing layer R1. The transferred magnetic domain 545 in the first reproducing layer R1 is magnified to the size of the reproducing beam spot under the external magnetic field HE. Therefore, by reading out a reproduced signal from the magnified magnetic domain 545, it is possible to reproduce the associated information in the first recording layer W1 with amplified signal strength in distinction from the information recorded on the second recording layer W2. It is preferable that the reproduced information of the first recording layer W1 be stored once in a memory or the like for processing as described later.

Next, when the high power reproducing beam PH is radiated, as shown in FIG. 59(C), the intermediate layer MW is heated to a temperature above its critical temperature. Consequently, the direction of magnetization of the magnetic domain 549 changes from the in-plane direction to the perpendicular direction. This enables the leakage magnetic field of the second recording layer W2 to affect the reproducing layers lying over this recording layer. Because both magnetic domains 541 and 543 in the recording layers W1 and W2, respectively, are magnetized upward (↑), a large leakage magnetic field is generated, inverting the magnetization of not only the magnetic domain 545 in the first reproducing layer R1 but also the magnetic domain 547 in the second reproducing layer R2, which is relatively great in coercive force. In other words, the magnetization of the magnetic domain 543 in the second recording layer W2 is transferred to the first reproducing layer R1 and the second reproducing layer R2. The magnetic domains 545 and 547 transferred to the reproducing layers R1 and R2, respectively, are magnified to the size of the reproducing beam spot under the external magnetic field HE. It is therefore possible to obtain amplified reproduced signal strength from the reproducing layers R1 and R2, which have the magnified magnetic domains 545 and 547, respectively. This signal strength is about double the strength of the signal reproduced with the low power reproducing beam PL. As stated above, the information recorded on the first recording layer W1 is known already from the reproduction with the low power reproducing beam PL. Accordingly, from the amplified reproduced signal strength, it is found that upward magnetization information has been recorded on the second recording layer. Thus, the information recorded on each of the recording layers W1 and W2 can be reproduced with amplified signal strength.

There may be a case where the initially recorded information differs from that in FIG. 59 in such a manner that the magnetic domain 541 in the first recording layer W1 is magnetized downward (↓) and the magnetic domain 543 in the second recording layer W2 is magnetized upward (↑), or vice versa. In this case, when the high power reproducing beam PH is radiated, the magnetic leakage field is weaker than in that case. This causes transfer to only the first reproducing layer R1, and it is therefore possible to reproduce a signal having a middle degree of strength. When the low power beam is radiated, the direction of magnetization of the magnetic domain 541 in the first recording layer W1 is already known. Therefore, in view of the magnetization information in the first recording layer W1, it is possible to determine the direction of magnetization of the magnetic domain 543 in the second recording layer W2 from the strength of the signal reproduced with the high power reproducing beam.

During reproduction, the magneto-optical recording medium may be irradiated with the low power reproducing beam PL and the high power reproducing beam PH separately, or at the same time in such a manner that the recording medium is scanned ahead with the low power reproducing beam PL and behind with the high power reproducing beam PH following the beam PL in the direction of rotation of the medium. The laminated structure of the magneto-optical recording medium according to this embodiment belongs to the structure shown in FIG. 55(A), but demonstrates that it is possible to reproduce the data in two or more recording layers even with reproducing light of single wavelength by modulating the reproducing light intensity without using the multi-wavelength reproducing method.

Embodiment G

Figure 60:
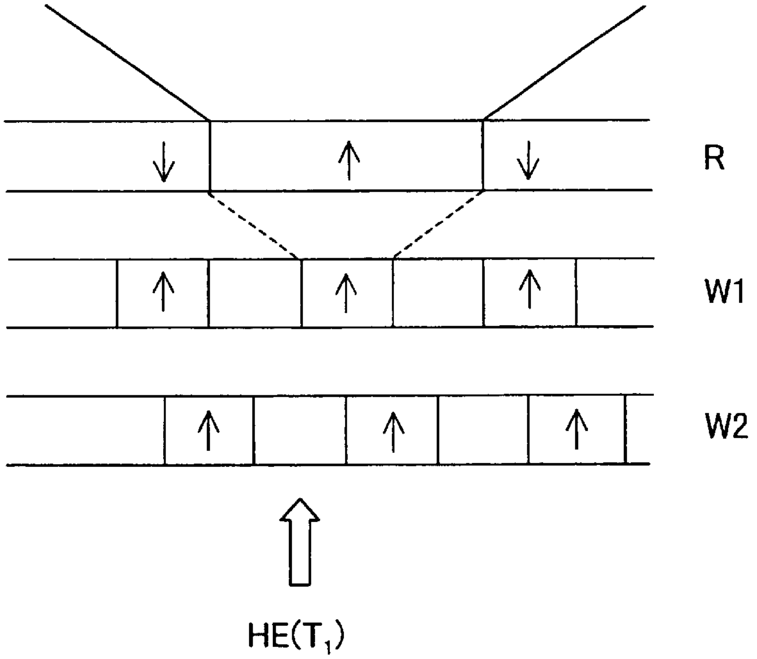
FIG. 60 shows a method for distinguishing and reproducing, with reproducing light of single wavelength, the information recorded on a plurality of recording layers in Embodiment G.
Figure 60:
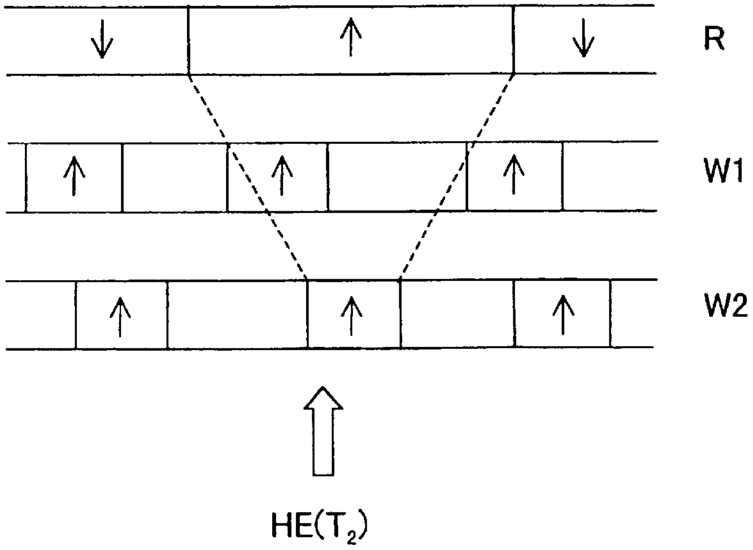

This embodiment is a method for distinguishing and reproducing, with reproducing light of single wavelength, the data recorded on two or more recording layers. The MAMMOS requires that the recording magnetic domains in the recording layer being reproduced be synchronous exactly with the applied reproducing external magnetic field. In other words, only when the magnifying external magnetic field is applied at the predetermined timing with respect to the positions of recording magnetic domains along a track, the transferred magnetic domains are magnified and reduced. This embodiment harnesses the phenomenon of the MAMMOS positively or actively. As shown in FIG. 60(A), a magneto-optical recording medium is provided which includes a reproducing layer R, a first recording layer W1 and a second recording layer W2 in that order from its side where reproducing light is radiated. Information is recorded on the first recording layer W1 and the second recording layer W2 at timing T1 and timing T2, respectively, which differ from each other. The timing T1 may be generated on the basis of the clock pits formed previously in the substrate of the recording medium. The timing T2 may be generated out of phase with the timing T1 by a predetermined time. During reproduction, as shown in FIGS. 60(A) and 60(B), reproducing external magnetic fields are applied with the recording timing T1 and the recording timing T2 used as reproducing clocks. This enables the magnetization information recorded on the recording layer W1 at the timing T1 to be reproduced by being transferred to the reproducing layer and magnified, and the magnetization information recorded on the recording layer W2 at the timing T2 to be reproduced by being transferred to the reproducing layer and magnified.

As described in Embodiment F, an intermediate layer may be interposed between the recording layers W1 and W2 of this embodiment. The intermediate layer blocks the leakage magnetic field of the recording layer W1 at a predetermined critical temperature. In order to magnify and reproduce information in the first recording layer W1 at the timing T2, it is possible to reproduce only the information in the first recording layer through the reproducing layer while blocking the leakage magnetic field from the second recording layer W2 with a low power reproducing beam. For reproduction of information in the second recording layer W2, a high power reproducing beam may be radiated to extinguish the intermediate layer's effect of blocking the leakage magnetic field from the second recording layer W2 so that the leakage magnetic fields from the first and second recording layers may cause magnetic domain transfer to the reproducing layer R, magnification and reproduction. In this case, as stated in Embodiment F, the recorded information in the first recording layer which has been detected with the low power reproducing beam is known. Therefore, from both of the known information and the result of the detection with the high power reproducing beam, it is possible to find out the magnetization information in the second recording layer as well.

For this embodiment as well, the method for magnifying the magnetic domains transferred to the reproducing layer is not limited to the MAMMOS, but may be the foregoing optical modulation domain magnifying and reproducing method. The reproducing layer of this embodiment is a single layer. As shown in the foregoing embodiment, however, two reproducing layers might each be associated with one of the two recording layers.

Embodiment H

Figure 61:
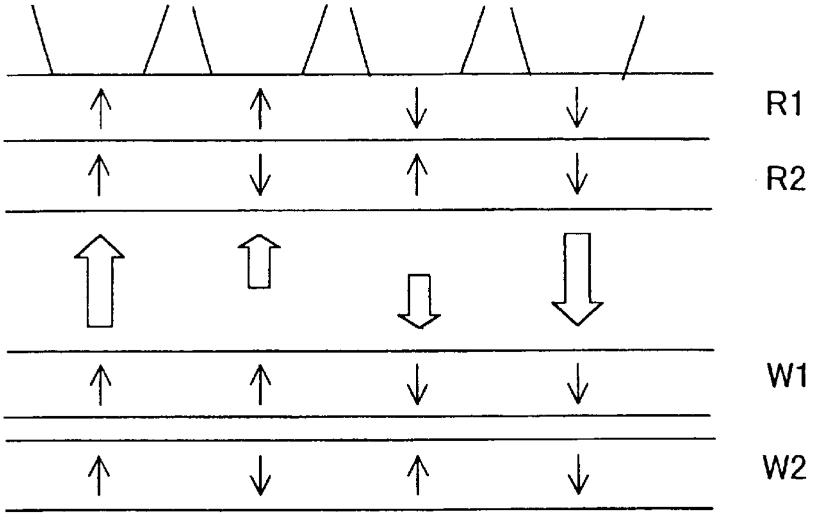
FIG. 61 shows a method for distinguishing and reproducing the information recorded on a plurality of recording layers in Embodiment H.

FIG. 61 shows another embodiment in which a recording medium includes two recording layers and two reproducing layers. This embodiment involves reproducing multi-valued information recorded on the recording layers. As shown in FIG. 61, four combinations of states of magnetization are recorded on the first recording layer W1 and the second recording layer W2 by the foregoing magneto-optical multi-valued recording method. The first reproducing layer R1 is a TM-rich rare-earth transition-metal magnetic layer. The second reproducing layer R2 is an RE-rich rare-earth transition-metal magnetic layer. The reproducing layers are exchange-coupled to each other. Therefore, when reproducing light is radiated, as shown in FIG. 61, the leakage magnetic fields (represented by the thick white arrows in the figure) from the recording layers W1 and W2 transfer the magnetization information as it is in the first and second recording layers to the first and second reproducing layers, respectively. The reproducing light causes reproduced signal strength of four levels to be obtained from the exchange-coupled reproducing layers, depending on the magnitude of magnetization in these layers. This makes it possible to reproduce the four-valued information.

The exchange-coupled reproducing layers have made it possible to overcome or solve the limitation that, for reproduction of the information recorded on two recording layers by the conventional multi-valued magneto-optical recording method, the recording layer adjacent to reproducing light must be thin. The magnetic domains transferred to the reproducing layers can be magnified and reproduced by the MAMMOS or the optical modulation domain magnifying and reproducing method described above. This makes it possible to reproduce multi-valued information with amplified signal intensity.

Embodiment I

Figure 62A:
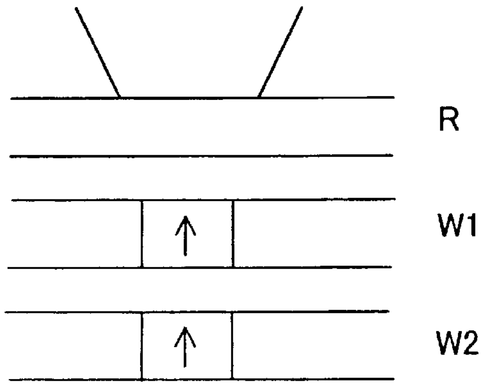
FIG. 62(A) shows the laminated structure of a magneto-optical recording medium.
Figure 62B:
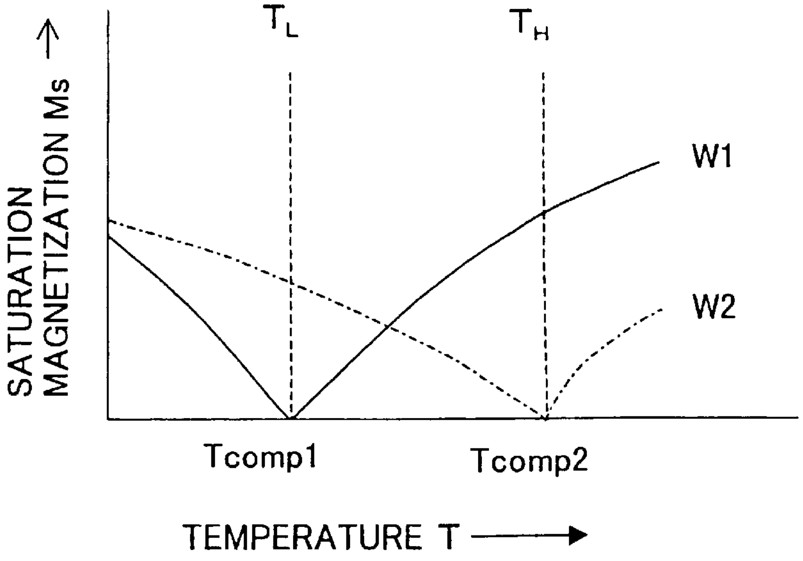
FIG. 62(B) shows the magnetic characteristics of the first recording layer W1 and the second recording layer W2.

This embodiment is another method for distinguishing and reproducing, with a high power reproducing beam PH and a low power reproducing beam PL, the information recorded on two or more recording layers. FIG. 62(A) shows the laminated structure of a magneto-optical recording medium for use with this embodiment. The recording medium includes a reproducing layer R, a first recording layer W1 and a second recording layer W2 in that order from its side where the reproducing light is radiated. The magnetic material for or the composition of the recording layers W1 and W2 is adjusted in advance for such magnetic characteristics as shown in FIG. 62(B). Specifically, the first recording layer W1 should be made of such magnetic material as has a compensation temperature Tcomp1 which is the temperature TL of the medium heated by being irradiated with the low power reproducing beam PL, while the second recording layer W2 should be made of such magnetic material as has a compensation temperature Tcomp2 which is the temperature TH of the medium heated by being irradiated with the high power reproducing beam PH. The magnetic material may be suitable composition of TbFeCo, GdFeCo, etc. By thus adjusting the two recording layers and the reproducing light power, it is possible to transfer recorded magnetic domains in the second recording layer W2 to the reproducing layer R while distinguishing the leakage magnetic field from the first recording layer W1 when the low power reproducing beam PL is radiated, and it is possible to transfer recorded magnetic domains in the first recording layer W1 to the reproducing layer R while distinguishing the leakage magnetic field from the second recording layer W2 when the high power reproducing beam PH is radiated. It is therefore possible to magnify and reproduce the recorded information in each of the recording layers W1 and W2 independently through the reproducing layer R. The information may be magnified and reproduced by the foregoing optical modulation domain magnifying and reproducing method or MAMMOS.

INDUSTRIAL APPLICABILITY

By using each of the magneto-optical recording media according to the present invention and the reproducing method therefor, it is possible to independently reproduce even a recording mark which is minute in comparison with the spot diameter of a reproducing beam, and which has been recorded on one of the recording layers. This makes it possible to remarkably improve the recording density of the recording medium. The use of the domain magnifying and reproducing method makes it possible to amplify the reproduced signals and therefore greatly improve their C/N. Accordingly, the magneto-optical recording media according to the present invention are very useful as future high density recording media. In particular, the combination of the MAMMOS and the multi-wavelength magneto-optical reproducing method, the combination of the MAMMOS and a method of reproduction with a plurality of reproducing light powers, and the combination of the optical modulation domain magnifying and reproducing method and the multi-wavelength magneto-optical reproducing method are very effective in reproducing, with high resolution and at high C/N, the information recorded densely on the recording layers. The reproducing apparatus according to the present invention are very useful for the magneto-optical recording media according to the invention and the reproducing methods for the media.

What is claimed is:

1. A method for reproducing data recorded on a plurality of recording layers of a magneto-optical recording medium by radiating a plurality of different reproducing beams, each reproducing beam corresponding to a different one of the plurality of recording layers, to transfer the recorded data to a reproducing layers of the recording medium.

2. The reproducing method defined in claim 1, wherein the reproducing beams differ in wavelength.

3. The reproducing method according to claim 2, wherein the recording layers are irradiated with the reproducing beams, which differ in wavelength, so that the data recorded on each recording layer is reproduced independent of the other recording layers at different wavelengths.

4. The reproducing method defined in claim 1, wherein the reproducing beams differ in power.

5. The reproducing method defined in claim 4, wherein the data recorded on at least one of the recording layers is reproduced independently of the recording beams with at least one of the reproducing beams, which differ in power.

6. The reproducing method defined in claim 1, wherein magnetic domains transferred from the recording layers to the reproducing layer are magnified under an external field.

7. The reproducing method defined in claim 6, wherein the external field uses an external magnetic field, a light intensity-modulated reproducing beam, or a combination thereof.

8. The reproducing method defined in claim 1, wherein multi-valued data is recorded on the recording layers by a magneto-optical multi-valued recording method.

9. A reproducing apparatus for reproducing data recorded on a plurality of recording layers of a magneto-optical recording medium, comprising:

a light source which radiates a plurality of different reproducing beams, each reproducing beam corresponding to a different one of the plurality of recording layers, to transfer the recorded data to a plurality of reproducing layers of the recording medium; and a head which receives the reproducing beams from the magneto-optical recording medium, wherein the reproducing beams differ in wavelength.

10. A reproducing apparatus for reproducing data recorded on a plurality of recording layers of a magneto-optical recording medium, comprising:

a light source which radiates a plurality of different reproducing beams, each reproducing beam corresponding to a different one of the plurality of recording layers, to transfer the recorded data to a reproducing layers of the recording medium; and a head which receives the reproducing beams from the magneto-optical recording medium, wherein the reproducing beams differ in power.

* * * * *

UNITED STATES PATENT AND TRADEMARK OFFICE
CERTIFICATE OF CORRECTION

PATENT NO. : 6,633,514 B1
DATED : October 14, 2003
INVENTOR(S) : Hiroyuki Awano et al.

It is certified that error appears in the above-identified patent and that said Letters Patent is hereby corrected as shown below:

Column 70,
Lines 6, and 7-8, "a reproducing layers" should read -- a reproducing layer --

Signed and Sealed this

Third Day of February, 2004

JON W. DUDAS
*Acting Director of the United States Patent and Trademark Office*